(12) United States Patent
Takakura

(10) Patent No.: US 11,375,568 B2
(45) Date of Patent: Jun. 28, 2022

(54) UE AND COMMUNICATION CONTROL METHOD

(71) Applicants: SHARP KABUSHIKI KAISHA, Sakai (JP); FG Innovation Company Limited, New Territories (HK)

(72) Inventor: Tsuyoshi Takakura, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/294,333

(22) PCT Filed: Nov. 7, 2019

(86) PCT No.: PCT/JP2019/043716
§ 371 (c)(1),
(2) Date: May 14, 2021

(87) PCT Pub. No.: WO2020/100718
PCT Pub. Date: May 22, 2020

(65) Prior Publication Data
US 2021/0360723 A1 Nov. 18, 2021

(30) Foreign Application Priority Data
Nov. 16, 2018 (JP) .............................. JP2018-215877

(51) Int. Cl.
*H04W 76/18* (2018.01)
(52) U.S. Cl.
CPC .................................. *H04W 76/18* (2018.02)

(58) Field of Classification Search
CPC ..................................................... H04W 76/18
See application file for complete search history.

(56) References Cited

U.S. PATENT DOCUMENTS

| | | | |
|---|---|---|---|
| 10,575,318 B2* | 2/2020 | Park | H04W 74/0875 |
| 10,812,629 B2* | 10/2020 | Park | H04L 69/22 |
| 11,160,007 B2* | 10/2021 | Kim | H04W 76/27 |
| 11,190,930 B2* | 11/2021 | Kawasaki | H04L 69/322 |
| 2019/0053148 A1* | 2/2019 | Lee | H04W 8/12 |
| 2019/0124561 A1* | 4/2019 | Faccin | H04W 8/02 |

(Continued)

OTHER PUBLICATIONS

3GPP TS 23.501 V15.0.0 (Dec. 2017); 3rd Generation Partnership Project; Technical Specification Group Services and System Aspects; System Architecture for the 5G System; Stage 2 (Release 15).

(Continued)

*Primary Examiner* — Parth Patel
(74) *Attorney, Agent, or Firm* — ScienBiziP, P.C.

(57) ABSTRACT

Provided is a User Equipment (UE, terminal apparatus) including a transmission and/or reception unit, wherein in a case that a timer for a combination of Single Network Slice Selection Assistance information (S-NSSAI) and no Data Network Name (DNN) is running, the transmission and/or reception unit is capable of initiating an EPS Session Management (ESM) procedure without using an Access Point Name (APN) in an EPS, and the transmission and/or reception unit receives a value of the timer included in a PDU session establishment reject message.

2 Claims, 13 Drawing Sheets

(56) References Cited

U.S. PATENT DOCUMENTS

| | | | |
|---|---|---|---|
| 2019/0200285 A1* | 6/2019 | Velev | H04W 48/18 |
| 2019/0223093 A1* | 7/2019 | Watfa | H04W 48/18 |
| 2019/0261185 A1* | 8/2019 | Velev | H04W 48/18 |
| 2019/0313276 A1* | 10/2019 | Huang-Fu | H04W 28/0273 |
| 2019/0342821 A1* | 11/2019 | Kim | H04W 76/10 |
| 2019/0350035 A1* | 11/2019 | Kim | H04L 47/745 |
| 2019/0357129 A1* | 11/2019 | Park | H04W 48/18 |
| 2019/0357130 A1* | 11/2019 | Garcia Azorero | H04W 48/18 |
| 2020/0037203 A1* | 1/2020 | Ianev | H04W 28/06 |
| 2020/0037386 A1* | 1/2020 | Park | H04W 76/18 |
| 2020/0137675 A1* | 4/2020 | Park | H04W 60/00 |
| 2020/0389830 A1* | 12/2020 | Park | H04W 28/0289 |
| 2020/0404734 A1* | 12/2020 | Watfa | H04W 76/30 |
| 2021/0022099 A1* | 1/2021 | Kumar | H04W 76/12 |
| 2021/0029628 A1* | 1/2021 | Kim | H04W 76/19 |
| 2021/0194634 A1* | 6/2021 | Sedlacek | H04L 1/14 |
| 2021/0368383 A1* | 11/2021 | Jangid | H04W 28/0289 |

OTHER PUBLICATIONS

3GPP TS 23.502 V15.0.0 (Dec. 2017); 3rd Generation Partnership Project; Technical Specification Group Services and System Aspects; Procedures for the 5G System; Stage 2 (Release 15).

3GPP TS 24.501 V15.1.0 (Sep. 2018); 3rd Generation Partnership Project; Technical Specification Group Core Network and Terminals; Non-Access-Stratum (NAS) protocol for 5G System (5GS);Stage 3 (Release 15).

LG Electronics: "Update to NAS level congestion control", C1-180341, 3GPP TSG-CT WG1 Meeting #108, Gothenburg (Sweden), Jan. 22-26, 2018.

Qualcomm Incorporated, "Clarification of SM congestion control", S2-182102, 3GPP TSG-SA WG2 Meeting #126, Montreal, Canada, Feb. 26-Mar. 2, 2018.

"3rd Generation Partnership Project; Technical Specification Group Core Network and Terminals; Non-Access-Stratum (NAS) protocol for Evolved Packet System (EPS); Stage 3(Release 15)", 3GPP TS 24.301 V15.4.0 (Sep. 2018).

* cited by examiner

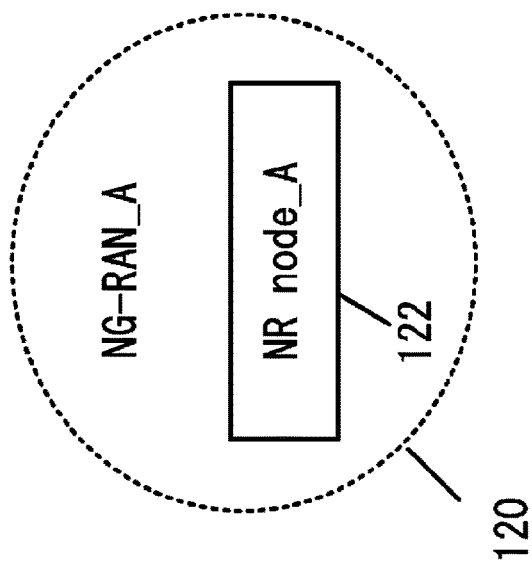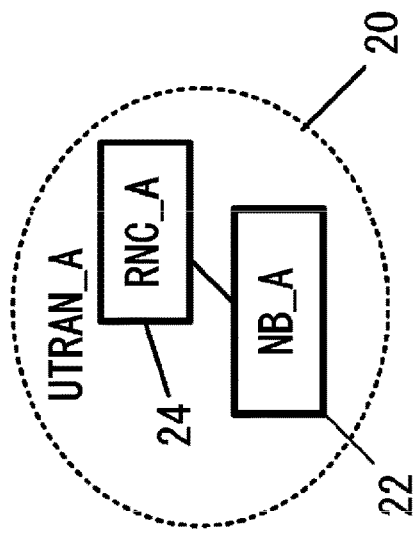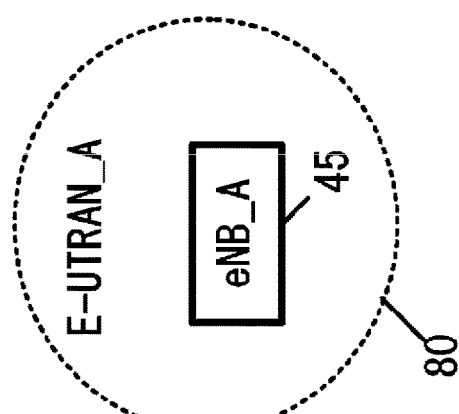
FIG. 2

UE AND COMMUNICATION CONTROL METHOD

TECHNICAL FIELD

The present invention relates to a UE and a communication control method. This application claims priority based on JP 2018-215877 filed on Nov. 16, 2018, the contents of which are incorporated herein by reference.

BACKGROUND ART

The 3rd Generation Partnership Project (3GPP), which undertakes activities for standardizing recent mobile communication systems, has studied System Architecture Evolution (SAE) which is a system architecture of Long Term Evolution (LTE). The 3GPP is in the process of standardizing Evolved Packet System (EPS) as a communication system for realizing an all-Internet Protocol (IP) architecture. Note that a core network constituting the EPS is called an Evolved Packet Core (EPC).

Additionally, the 3GPP recently has been studying a next-generation communication technology and a system architecture for 5th Generation (5G) mobile communication system which is a next-generation mobile communication system. Especially, as a system for achieving the 5G mobile communication system, the 3GPP is in a process of standardizing 5G System (5GS) (see NPL 1 and NPL 2). In the 5GS, technical problems attributable to connection of various terminals to a cellular network are extracted to standardize solutions.

For example, requirement conditions include optimization and diversification of a communication procedure for supporting a continual mobile communication service depending on a terminal supporting various access networks, optimization of a system architecture suitable for the optimization and diversification of the communication procedure, and the like.

CITATION LIST

Non Patent Literature

Non Patent Literature 1: 3GPP TS 23.501 v15.0.0; 3rd Generation Partnership Project; Technical Specification Group Services and System Aspects; System Architecture for the 5G system; Stage 2 (Release 15)

Non Patent Literature 2: 3GPP TS 23.502 v15.0.0; 3rd Generation Partnership Project; Technical Specification Group Services and System Aspects; Procedures for the 5G system; Stage 2 (Release 15)

Non Patent Literature 3: 3GPP TS 24.501 v15.1.0; 3rd Generation Partnership Project; Technical Specification Group Core Network and Terminals; Non-Access-Stratum (NAS) protocol for 5G System (5GS); Stage 3 (Release 15)

SUMMARY OF INVENTION

Technical Problem

In 5GS, in addition to a mechanism that provides a function corresponding to congestion management, control signal management based on causes other than congestion management has been further studied (see NPL 1, NPL 2, and NPL 3).

However, processing is not clear in a case that the UE changes the system in the state in which congestion management is being applied.

One aspect of the present invention has been made in view of such circumstances, and an object of the present invention is to provide a mechanism and a communication control method for implementing a control signal management process based on a cause for congestion management in a case of changing the system.

Solution to Problem

A UE according to an aspect of the present invention is a User Equipment (UE, terminal apparatus) including a transmission and/or reception unit, wherein in a case that a timer for a combination of Single Network Slice Selection Assistance information (S-NSSAI) and no Data Network Name (DNN) combination is running, the transmission and/or reception unit is capable of initiating an EPS Session Management (ESM) procedure without using an Access Point Name (APN) in an EPS, and the transmission and/or reception unit receives a value of the timer included in a PDU session establishment reject message.

A communication control method according to an aspect of the present invention is a communication control method of a User Equipment (UE, terminal apparatus), wherein in a case that a timer for a combination of Single Network Slice Selection Assistance information (S-NSSAI) and no Data Network Name (DNN) combination is running, the UE is capable of initiating an EPS Session Management (ESM) procedure without using an Access Point Name (APN) in an EPS, and the UE receives a value of the timer included in a PDU session establishment reject message.

Advantageous Effects of Invention

According to one aspect of the present invention, terminal apparatuses constituting 5GS and apparatuses in a core network perform management processing, such as congestion management, for different systems, for each terminal apparatus initiated network slice and/or DNN or APN.

BRIEF DESCRIPTION OF DRAWINGS

FIG. 2 is a diagram illustrating an example of a configuration and the like of access networks in the mobile communication system.

DESCRIPTION OF EMBODIMENTS

A preferred embodiment for carrying out the present invention will be described below with reference to the drawings. Note that, as an example, an embodiment of a mobile communication system to which the present invention is applied will be described in the present embodiment.

1. SYSTEM OVERVIEW

Figure 1:
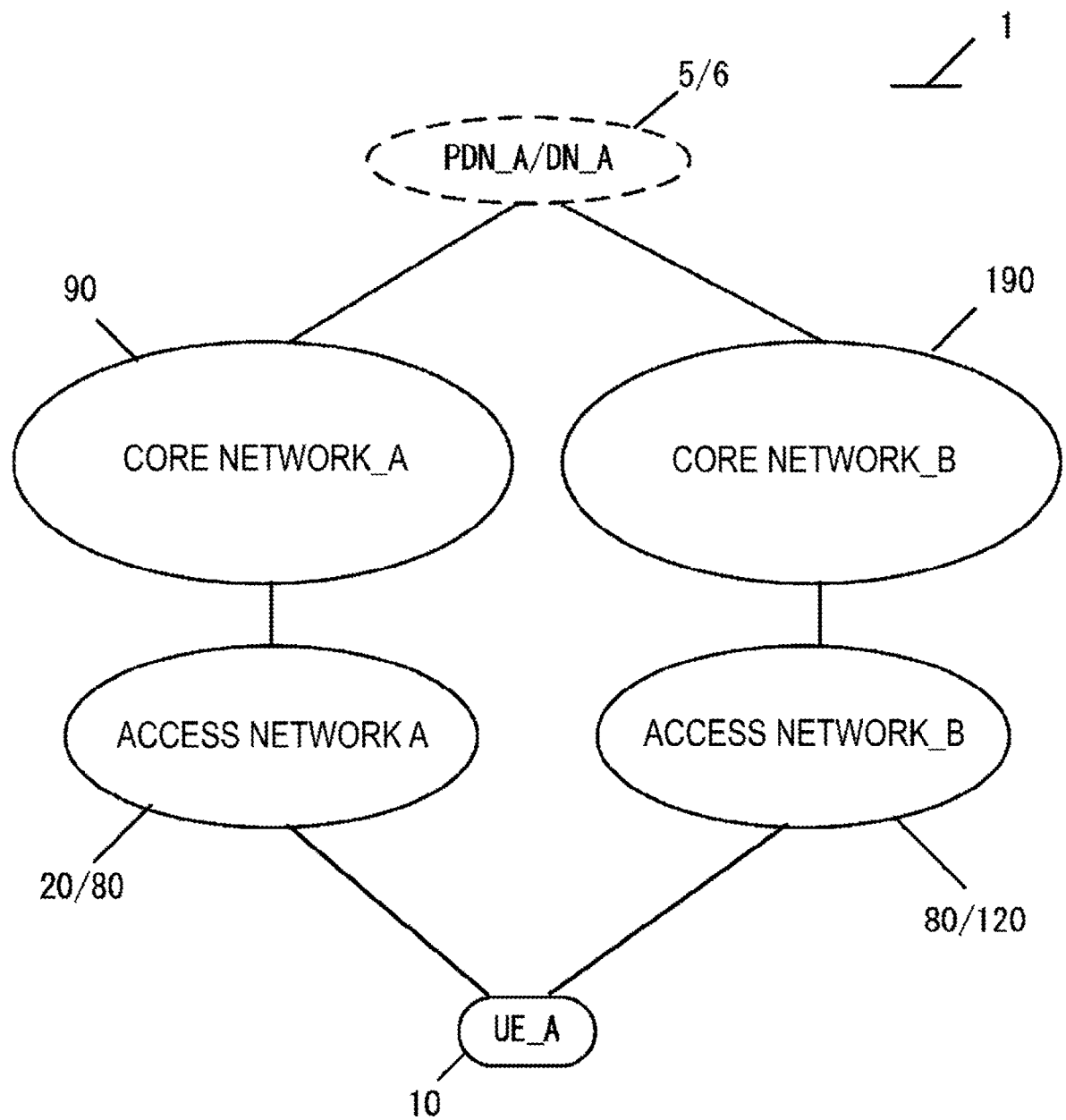
FIG. 1 is a diagram illustrating an overview of a mobile communication system.
Figure 3:
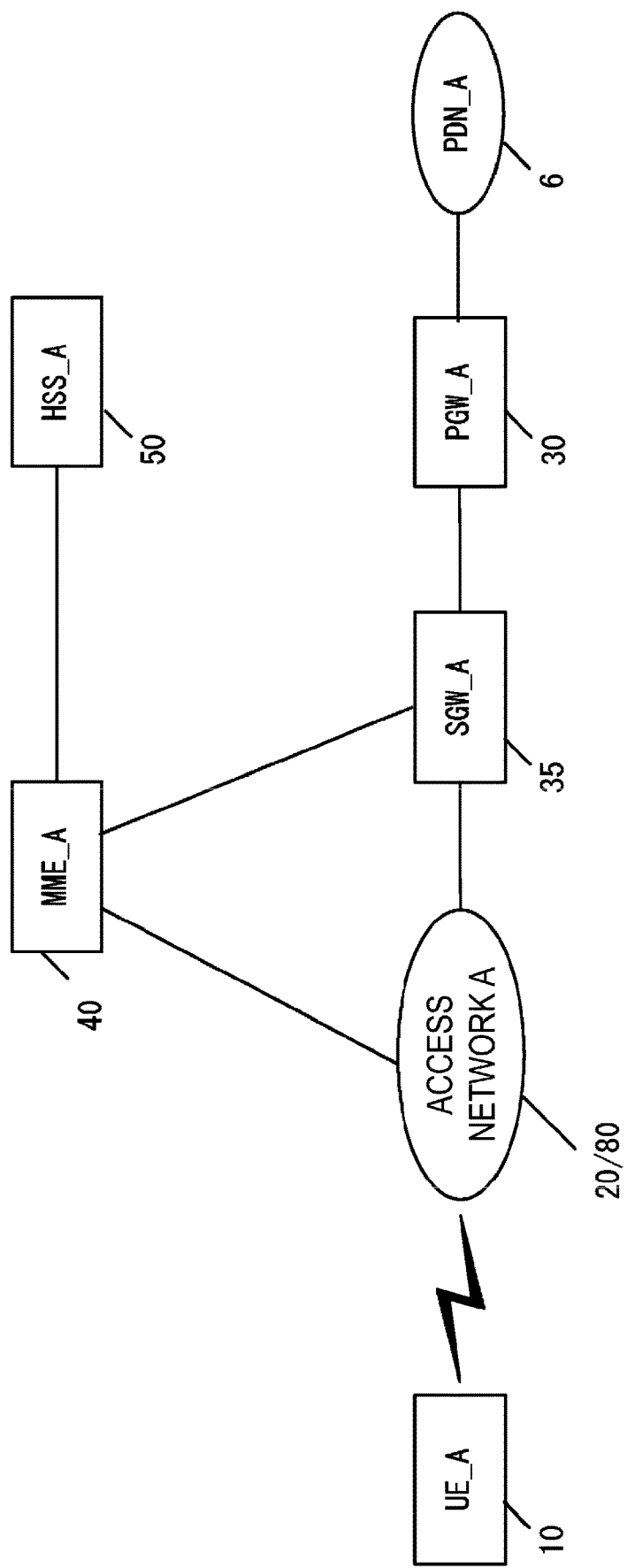
FIG. 3 is a diagram illustrating an example of a configuration and the like of a core network_A in the mobile communication system.
Figure 4:
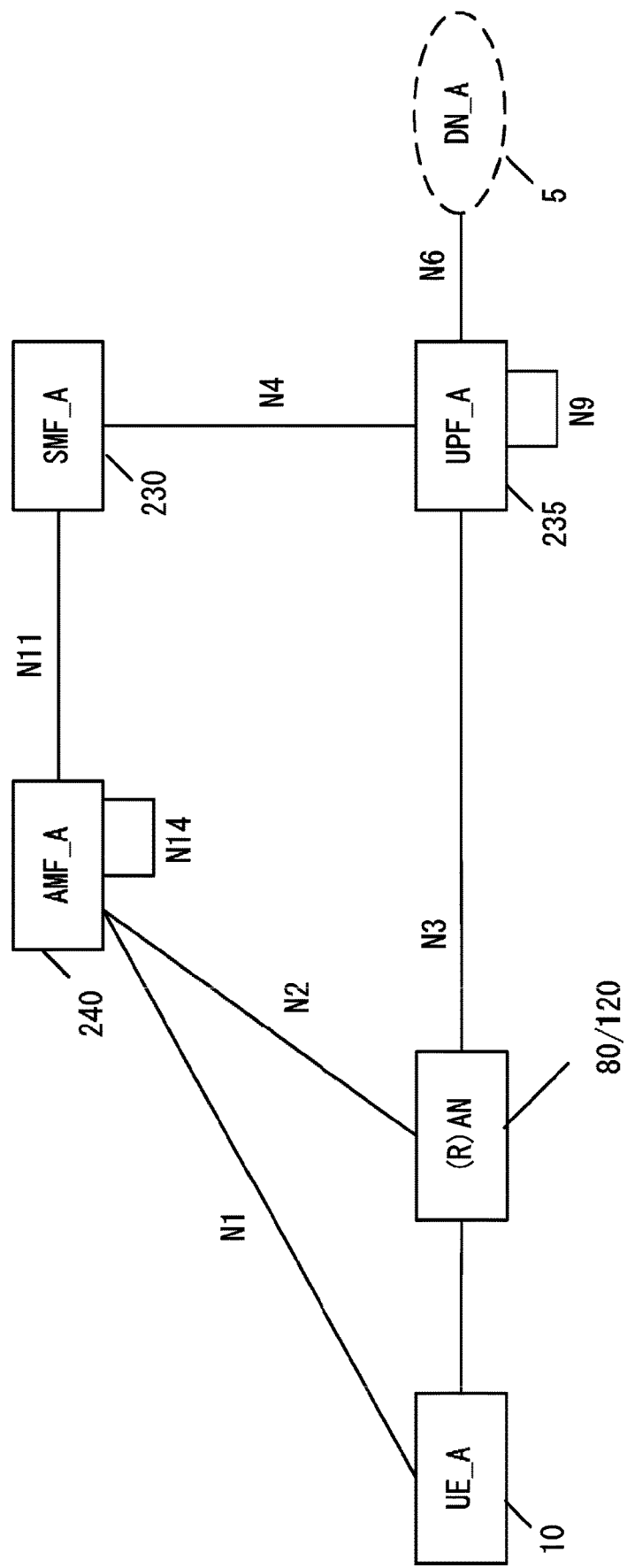
FIG. 4 is a diagram illustrating an example of a configuration and the like of a core network_B in the mobile communication system.

An overview of a mobile communication system according to the present embodiment will be described with reference to FIG. 1, FIG. 2, FIG. 3, and FIG. 4. FIG. 2 is a diagram for detailing access networks of the mobile communication system of FIG. 1. FIG. 3 is a diagram mainly illustrating details of a core network_A 90 in the mobile communication system of FIG. 1. FIG. 4 is a diagram mainly illustrating details of a core network_B 190 in the mobile communication system of FIG. 1. As illustrated in FIG. 1, the mobile communication system 1 according to the present embodiment includes a terminal apparatus (which is also referred to as a user equipment or a mobile terminal apparatus), User Equipment (UE)_A 10, an Access Network (AN)_A, an access network_B, and a Core Network (CN)_A 90, a core network_B 190, a Packet Data Network (PDN)_A 6, and a Data Network (DN)_A 5. Note that the combination of the access network_A and the core network_A 90 may be referred to as an Evolved Packet System (EPS or 4G mobile communication system), and the combination of the access network_B, the core network_B 190, and the UE_A 10 may be referred to as (5G System (5GS) or 5G mobile communication system), and the configurations of 5GS and EPS may not be limited thereto. Note that, for the sake of simplicity, the core network_A 90, the core network_B, or a combination thereof may also be referred to as a core network, and the access network_A, the access network_B, or a combination thereof may also be referred to as an access network or a radio access network, and the DN_A 5, the PDN_A 6, or a combination thereof may also be referred to as a DN.

Here, the UE_A 10 may be an apparatus that can connect to a network service via 3GPP access (also referred to as 3GPP access or a 3GPP access network) and/or non-3GPP access (also referred to as non-3GPP access or a non-3GPP access network). The UE_A 10 may also include a Universal Integrated Circuit Card (UICC) and an embedded UICC (eUICC). The UE_A 10 may be a wirelessly connectable terminal apparatus and may be Mobile Equipment (ME), a Mobile Station (MS), a cellular Internet of Things (CIoT) terminal (CIoT UE), or the like.

The UE_A 10 can be connected to an access network and/or core network. The UE_A 10 can be connected to the DN_A and/or the PDN_A via the access network and/or the core network. The UE_A 10 transmits and/or receives (communicates) the user data to and/or from the DN_A and/or the PDN_A by using a Protocol Data Unit or Packet Data Unit (PDU) session and/or a Packet Data Network (PDN) connection (also referred to as PDN connection). Furthermore, the communication of the user data is not limited to Internet Protocol (IP) communication (IPv4 or IPv6), but may be, for example, non-IP communication in EPS, or may be Ethernet (trade name) communication or Unstructured communication in 5GS.

Here, IP communication is data communication using IP, and is data communication achieved by transmitting and/or receiving an IP packet including an IP header. Note that a payload section constituting the IP packet may include the user data transmitted and/or received by the UE_A 10. Non-IP communication is data communication without using IP, and is data communication achieved by transmitting and/or receiving data without IP header. For example, the non-IP communication may be the data communication achieved through transmitting and/or receiving application data not given the IP address, or may transmit and/or receive the user data transmitted and/or received by the UE_A 10 to which another header such as a MAC header and an Ethernet (trade name) frame header is given.

Also, the PDU session is connectivity established between the UE_A 10 and the DN_A 5 to provide a PDU connection service. To be more specific, the PDU session may be connectivity established between the UE_A 10 and an external gateway. Here, the external gateway may be a UPF, a Packet Data Network Gateway (PGW), and the like. The PDU session may be a communication path established to transmit and/or receive the user data between the UE_A 10 and the core network and/or the DN, or a communication path established to transmit and/or receive the PDU. Furthermore, the PDU session may be a session established between the UE_A 10 and the core network and/or the DN, or may be a logical communication path including a transfer path such as one or more bearers and the like between apparatuses in the mobile communication system 1. To be more specific, the PDU session may be a connection established by the UE_A 10 between a core network_B 190 and/or the external gateway, or may be a connection established between the UE_A 10 and a UPF. The PDU session may be connectivity and/or a connection between the UE_A 10 and the UPF_A 235 via an NR node_A 122. Furthermore, the PDU session may be identified by a PDU session ID and/or an EPS bearer ID.

Note that the UE_A 10 can transmit and/or receive the user data to and/or from an apparatus, such as an application server, that is located in the DN_A 5 by using the PDU session. In other words, the PDU session can transfer the user data transmitted and/or received between the UE_A 10 and the apparatus, such as the application server, that is located in the DN_A 5. Furthermore, each apparatus (the UE_A 10, the apparatus in the access network, and/or the apparatus in the core network, and/or the apparatus in the data network) may correlate one or more pieces of identification information to the PDU session for management. Note that these pieces of identification information may include at least one of an Access Point Name (APN), a Traffic Flow Template (TFT), a session type, application identification information, identification information of the DN_A 5, Network Slice Instance (NSI) identification information, Dedicated Core Network (DCN) identification information, and access network identification information, or may further include other information. Furthermore, in a case that multiple PDU sessions are established, respective pieces of identification information correlated to the PDU sessions may be the same contents or may be different contents. Furthermore, the NSI identification information is information for identifying an NSI, and hereinafter may be an NSI ID or a Slice Instance ID.

The access network_A and the access network_B may be any of a Universal Terrestrial Radio Access Network (UTRAN)_A 20, an Evolved Universal Terrestrial Radio Access Network (E-UTRAN)_A 80, and an NG-RAN (5G-RAN)_A 120 as illustrated in FIG. 2. Note that hereinafter, the UTRAN_A 20 and/or the E-UTRAN_A 80 and/or the NG-RAN_A 120 may be referred to as a 3GPP access or a 3GPP access network, and a wireless LAN access network or non-3GPP AN may be referred to as a non-3GPP access or a non-3GPP access network. Each radio access network includes an apparatus to which the UE_A 10 is actually connected (e.g., a base station apparatus or an access point), and the like.

For example, the E-UTRAN_A 80 is an access network for Long Term Evolution (LTE) and configured to include one or more eNBs_A 45. The eNB_A 45 is a radio base station to which the UE_A 10 connects through Evolved Universal Terrestrial Radio Access (E-UTRA). In a case that multiple eNBs are present in the E-UTRAN_A 80, the multiple eNBs may be connected to each other.

The NG-RAN_A 120 is a 5G access network, may be an (R)AN described in FIG. 4, and is configured to include one or more New Radio Access Technology nodes (NR nodes) _A 122 and/or ng-eNBs. Note that the NR node_A 122 is a radio base station to which the UE_A 10 connects with 5G radio access, and is also referred to as a gNB. Note that the ng-eNB may be an eNB (E-UTRA) configuring 5G access network, may be connected to the core network_B 190 via the NR node_A, or may be directly connected to the core network_B 190. In a case that there are multiple NR nodes_A 122 and/or ng-eNBs in the NG-RAN_A 120, each of the multiple NR nodes_A 122 and/or ng-eNB may be connected to one another.

Note that the NG-RAN_A 120 may be an access network configured in the E-UTRA and/or the 5G Radio Access. In other words, the NG-RAN_A 120 may include the eNB_A 45, the NR node_A 122, or both the eNB_A 45 and the NR node_A 122. In this case, the eNB_A 45 and the NR node_A 122 may be similar apparatuses. Therefore, the NR node_A 122 can be substituted with the eNB_A 45.

The UTRAN_A 20 is an access network of a 3G mobile communication system, and is configured to include a Radio Network Controller (RNC)_A 24 and a Node B (NB)_A 22. The NB_A 22 is a radio base station to which the UE_A 10 connects through Universal Terrestrial Radio Access (UTRA), and the UTRAN_A 20 may include one or multiple radio base stations. Furthermore, the RNC_A 24 is a controller for connecting the core network_A 90 and the NB_A 22, and the UTRAN_A 20 may be configured to include one or multiple RNCs. The RNC_A 24 may be connected to one or multiple NBs_A 22.

Note that, in the present specification, the expression "the UE_A 10 is connected to each radio access network" is equivalent to "the UE_A 10 is connected to a base station apparatus, an access point, or the like included in each radio access network," and is equivalent to "transmitted and/or received data, signals, and the like are also transferred through the base station apparatus and the access point." Note that control messages transmitted and/or received between the UE_A 10 and the core network_B 190 may be the same control message, regardless of a type of the access network. Therefore, the expression "the UE_A 10 and the core network_B 190 transmit and/or receive a message to and/or from each other via the NR node_A 122" may be equivalent to "the UE_A 10 and the core network_B 190 transmit a message to each other via the eNB_A 45.

Furthermore, the access network is a radio network connecting with the UE_A 10 and/or the core network. The access network may be a 3GPP access network, or a non-3GPP access network. Note that the 3GPP access network may be the UTRAN_A 20, the E-UTRAN_A 80, and the NG-Radio Access Network (RAN)_A 120, and the non-3GPP access network may be a wireless LAN access point (WLAN AN). Note that the UE_A 10 may connect to the access network or to the core network via the access network in order to connect to the core network.

The DN_A 5 and the PDN_A 6 are Data Networks that provide communication services to the UE_A 10, may be configured as packet data service networks, and may be configured for each service. Furthermore, the DN_A 5 may include a connected communication terminal. Therefore, connecting with the DN_A 5 may be connecting with the communication terminal or a server located in the DN_A 5. Furthermore, the transmission and/or reception of the user data to and/or from the DN_A 5 may be transmission and/or reception of the user data to and/or from the communication terminal or server located in the DN_A 5. Although the DN_A 5 is outside the core networks in FIG. 1, they may be within the core networks.

The core network_A 90 and/or the core network_B 190 may be configured as one or more apparatuses in a core network. Here, the apparatuses in the core network may be apparatuses that perform part or all of processing or functions of apparatuses included in the core network_A 90 and/or the core network_B 190. Note that the apparatuses in the core network may be referred to as core network apparatuses.

Furthermore, the core network is an IP mobile communication network, operated by a Mobile Network Operator (MNO), that connects to the access network and/or the DN. The core network may be a core network for a mobile communication operator that operates and manages the mobile communication system 1, or may be a core network for a virtual mobile communication operator such as a Mobile Virtual Network Operator (MVNO) and a Mobile Virtual Network Enabler (MVNE), or a virtual mobile communication service provider. Note that the core network_A 90 may be an Evolved Packet Core (EPC) constituting an Evolved Packet System (EPS), and the core network_B 190 may be a 5G Core Network (5GC) constituting a 5GS. Furthermore, the core network_B 190 may be a core network for a system providing the 5G communication service. Conversely, the EPC may be the core network_A 90, and the 5GC may be the core network_B 190. Note that the core network_A 90 and/or the core network_B 190 is not limited to the above, and may be a network for providing a mobile communication service.

Next, the core network_A 90 will be described. The core network_A 90 may include at least one of a Home Subscriber Server (HSS)_A 50, an Authentication Authorization Accounting (AAA), a Policy and Charging Rules Function (PCRF), the PGW_A 30, an ePDG, the SGW_A 35, the Mobility Management Entity (MME)_A 40, a Serving GPRS Support Node (SGSN), and an SCEF. Furthermore, these may also be configured as Network Functions (NFs). The NF may be a processing function included in a network. The core network_A 90 is capable of connecting to multiple radio access networks (the UTRAN_A 20 and the E-UTRAN_A 80).

Although only the HSS (HSS_A 50), the PGW (PGW_A 30), the SGW (SGW_A 35), and the MME (MME_A 40) among the network elements are described in FIG. 3 for simplicity, it does not mean that no other apparatuses and/or NFs are included therein. Note that the UE_A 10 will also be referred to as UE, the HSS_A 50 as an HSS, the PGW_A

30 as a PGW, the SGW_A 35 as an SGW, the MME_A 40 as an MME, and the DN_A 5 and/or the PDN_A 6 as a DN or PDN for simplicity.

The following briefly describes each apparatus included in the core network_A 90.

The PGW_A 30 is a relay apparatus that is connected to the DN, the SGW_A 35, the ePDG, the WLAN ANa 70, the PCRF, and the AAA, and transfers the user data as a gateway between the DN (the DN_A 5 and/or the PDN_A 6) and the core network_A 90. Note that the PGW_A 30 may serve as a gateway for the IP communication and/or non-IP communication. Furthermore, the PGW_A 30 may have a function to transfer the IP communication, or may have a function to perform conversion between the non-IP communication and the IP communication. Note that multiple gateways like this may be deployed in the core network_A 90. Furthermore, the multiple gateways deployed may serve as gateways for connecting the core network_A 90 with a single DN.

Note that a User Plane (U-Plane or UP) may be a communication path for transmitting and/or receiving user data, and may include multiple bearers. Furthermore, a Control Plane (C-Plane or CP) may be a communication path for transmitting and/or receiving a control message, and may include multiple bearers.

Further, the PGW_A 30 may be connected to an SGW, a DN, and a User plane function (UPF), and/or a Session Management Function (SMF) or may be connected to the UE_A 10 via the U-Plane. Furthermore, the PGW_A 30 may be configured integrally with the UPF_A 235 and/or the SMF_A 230.

The SGW_A 35 is a relay apparatus that is connected to the PGW_A 30, the MME_A 40, the E-UTRAN_A 80, the SGSN, and the UTRAN_A 20, and transfers the user data as a gateway between the core network_A 90 and the 3GPP access networks (the UTRAN_A 20, the GERAN, and the E-UTRAN_A 80).

The MME_A 40 is a control apparatus that is connected to the SGW_A 35, the access network, the HSS_A 50, and the SCEF, and performs location information management including mobility management of the UE_A 10 via the access network, and access control. Furthermore, the MME_A 40 may include a function as a session management apparatus to manage a session established by the UE_A 10. Multiple control apparatuses like this may be deployed in the core network_A 90, and, for example, a location management apparatus different from the MME_A 40 may be configured. Like the MME_A 40, the location management apparatus different from the MME_A 40 may be connected to the SGW_A 35, the access network, the SCEF, and the HSS_A 50. Furthermore, the MME_A 40 may be connected to an Access and Mobility Management Function (AMF).

In a case that multiple MMEs are included in the core network_A 90, the multiple MMEs may be connected to each other. With this configuration, a context of the UE_A 10 may be transmitted and/or received between the MMEs. In this way, the MME_A 40 is a management apparatus to transmit and/or receive the control information related to the mobility management and the session management to and/or from the UE_A 10. In other words, the MME_A 40 may be a control apparatus for a Control Plane (C-Plane; CP).

The example is described in which the MME_A 40 is configured to be included in the core network_A 90, but the MME_A 40 may be a management apparatus configured in one or multiple core networks, DCNs, or NSIs, or may be a management apparatus connected to one or multiple core networks, DCNs, or NSIs. Here, multiple DCNs or NSIs may be operated by a single network operator, or by different network operators respectively.

The MME_A 40 may be a relay apparatus for transferring the user data as a gateway between the core network_A 90 and the access network. Note that the user data transmitted and/or received by the MME_A 40 serving as a gateway may be small data.

Furthermore, the MME_A 40 may be an NF having a function of the mobility management of the UE_A 10 or the like, or an NF managing one or multiple NSIs. The MME_A 40 may be an NF having one or multiple of these functions. Note that the NF may be one or multiple apparatuses deployed in the core network_A 90, a CP function (hereinafter, also referred to as a Control Plane Function (CPF) or a Control Plane Network Function) for the control information and/or control message, or a common CP function shared between multiple network slices.

Here, the NF is a processing function included in a network. That is, the NF may be a function apparatus such as an MME, an SGW, a PGW, a CPF, an AMF, an SMF, or a UPF, or may be a function such as mobility management (MM) and session management (SM), or capability information. The NF may be a function apparatus to realize a single function, or a function apparatus to realize multiple functions. For example, an NF to realize the MM function and an NF to realize the SM function may be separately present, or an NF to realize both the MM function and the SM function may be present.

The HSS_A 50 is a managing node that is connected to the MME_A 40, the AAA, and the SCEF, and manages subscriber information. The subscriber information of the HSS_A 50 is referred to during the access control performed by the MME_A 40, for example. Furthermore, the HSS_A 50 may be connected to a location management apparatus different from the MME_A 40. For example, the HSS_A 50 may be connected to the CPF_A 140.

Furthermore, the HSS_A 50, a Unified Data Management (UDM)_A 245 may be configured as different apparatuses and/or NFs or the same apparatus and/or NF.

The AAA is connected to the PGW 30, the HSS_A 50, the PCRF, and the WLAN ANa 70 and performs access control for the UE_A 10 connected via the WLAN ANa 70.

The PCRF is connected to the PGW_A 30, the WLAN ANa 75, the AAA, the DN_A 5 and/or the PDN_A 6 and performs QoS management on data delivery. For example, the PCRF manages QoS of a communication path between the UE_A 10, the DN_A 5, and/or the PDN_A 6. Furthermore, the PCRF may be an apparatus to create and/or manage a Policy and Charging Control (PCC) rule and/or a routing rule used by each apparatus for transmitting and/or receiving user data.

The PCRF may be a PCF to create and/or manage a policy. More specifically, the PCRF may be connected to the UPF_A 235.

The ePDG is connected to the PGW 30 and the WLAN ANb 75 and delivers user data as a gateway between the core network_A 90 and the WLAN ANb 75.

The SGSN is a control apparatus, connected to the UTRAN_A 20, the GERAN, and the SGW_A 35, for performing location management between a 3G/2G access network (UTRAN/GERAN) and the LTE (4G) access network (E-UTRAN). In addition, the SGSN has functions of selecting the PGW and the SGW, managing a time zone of the UE_A 10, and selecting the MME_A 40 at the time of handover to the E-UTRAN.

The SCEF is a relay apparatus that is connected to the DN_A 5 and/or the PDN_A 6, the MME_A 40, and the HSS_A 50 and transfers the user data as a gateway for connecting the DN_A 5 and/or the PDN_A 6 with the core network_A 90. Note that the SCEF may serve as a gateway for non-IP communication. Furthermore, the SCEF may have a function to perform conversion between non-IP communication and IP communication. Multiple gateways like this may be deployed in the core network_A 90. Furthermore, multiple gateways connecting the core network_A 90 with a single DN_5 and/or PDN_A 6 and/or DN may be also deployed. Note that the SCEF may be outside or inside the core network.

Next, the core network_B 190 will be described. The core network_B 190 may include at least one of an Authentication Server Function (AUSF), an Access and Mobility Management Function (AMF)_A 240, an Unstructured Data Storage Function (UDSF), a Network Exposure Function (NEF), a Network Repository Function (NRF), a Policy Control Function (PCF), a Session Management Function (SMF)_A 230, a Unified Data Management (UDM), a User Plane Function (UPF)_A 235, an Application Function (AF), and a Non-3GPP Interworking Function (N3IWF). Furthermore, these may also be configured as Network Functions (NFs). The NF may be a processing function included in a network.

Although only the AMF (AMF_A 240), the SMF (SMF_A 230), and the UPF (UPF_A 235) are illustrated in FIG. 4 among the above elements for simplicity, it does not mean that no other elements (apparatuses and/or Network Functions (NFs)) are included therein. Note that the UE_A 10 will also be referred to as a UE, the AMF_A 240 as an AMF, the SMF_A 230 as an SMF, the UPF_A 235 as a UPF, and the DN_A 5 as a DN for simplicity.

FIG. 4 shows an N1 interface (hereinafter, also referred to as a reference point), an N2 interface, an N3 interface, an N4 interface, an N6 interface, an N9 interface, and an N11 interface. Here, the N1 interface is an interface between the UE and the AMF, the N2 interface is an interface between the (R) access network (AN) and the AMF, and the N3 interface is an interface between the (R) access network (AN) and the UPF, the N4 interface is an interface between the SMF and the UPF, the N6 interface is an interface between the UPF and the DN, the N9 interface is an interface between the UPF and the UPF, and the N11 interface is an interface between the AMF and the SMF. These interfaces can be used to perform communication between the apparatuses. Here, the (R) AN is hereinafter also referred to as an NG RAN.

The following briefly describes each apparatus included in the core network_B 190.

First, the AMF_A 240 is connected to another AMF, SMF (SMF_A 230), the access network (i.e., the UTRAN_A 20, the E-UTRAN_A 80, and the NG-RAN_A 120), the UDM, the AUSF, and the PCF. The AMF_A 240 may play roles of registration management, connection management, reachability management, mobility management of the UE_A 10 or the like, transfer of a Session Management (SM) message between the UE and the SMF, access authentication or access authorization, a Security Anchor Function (SEA), Security Context Management (SCM), support for the N2 interface for the N3IWF, support for transmission and/or reception of NAS signals to and/or from the UE via the N3IWF, authentication of the UE connected via the N3IWF, management of Registration Management (RM) states, management of Connection Management (CM) states, and the like. One or more AMF_A 240s may be deployed within the core network_B 190. The AMF_A 240 may be an NF that manages one or more Network Slice Instances (NSI). The AMF_A 240 may also be a Common Control Plane Network Function (Common CPNF, or CCNF) shared among multiple NSIs.

The RM state includes a deregistered state (RM-DEREGISTERED state) and a registered state (RM-REGISTERED state). In the RM-DEREGISTERED state, the UE is not registered in the network, and thus the AMF is not able to reach the UE because the UE context in the AMF does not have valid location information and routing information for the UE. In the RM-REGISTERED state, the UE is registered in the network, and thus the UE can receive services that requires registration with the network.

The CM state includes a disconnected state (CM-IDLE state) and a connected state (CM-CONNECTED state). In the CM-IDLE state, the UE is in the RM-REGISTERED state but does not have a NAS signaling connection established between the AMF and the UE via the N1 interface. In the CM-IDLE state, the UE does not have an N2 interface connection (N2 connection) and an N3 interface connection (N3 connection). Meanwhile, in the CM-CONNECTED state, the UE has the NAS signaling connection established between the AMF and the UE via the N1 interface. In the CM-CONNECTED state, the UE may have the N2 interface connection (N2 connection) and/or the N3 interface connection (N3 connection).

The SMF_A 230 may have a Session Management (SM) function of PDU session, or the like, IP address allocation for the UE and its management function, a UPF selection and control function, a UPF configuration function for routing traffic to an appropriate destination, a function of reporting arrival of downlink data (Downlink Data Notification), a function to provide SM information unique to the AN (for each AN) to be transmitted to the AN via the AMF and the N2 interface, a function of determining a Session and Service Continuity mode (SSC mode) for a session, a roaming function, and the like. The SMF_A 230 may be connected to the AMF_A 240, the UPF_A 235, the UDM, and the PCF.

The UPF_A 235 is connected to the DN_A 5, the SMF_A 230, another UPF, and the access network (i.e., the UTRAN_A 20, the E-UTRAN_A 80, and the NG-RAN_A 120). The UPF_A 235 may play roles of an anchor to intra-RAT mobility or inter-RAT mobility, packet routing & forwarding, an uplink classifier (UL CL) function to support routing of multiple traffic flows for one DN, a branching point function to support a multi-homed PDU session, QoS processing for a user plane, verification of uplink traffic, buffering of downlink packets, a function of triggering downlink data notification, and the like. The UPF_A 235 may be a relay apparatus that transfers the user data as a gateway between the DN_A 5 and the core network_B 190. Note that the UPF_A 235 may serve as a gateway for IP communication and/or non-IP communication. Furthermore, the UPF_A 235 may have a function of transferring IP communication or a function to perform conversion between non-IP communication and IP communication. The multiple gateways deployed may serve as gateways for connecting the core network_B 190 with a single DN. Note that the UPF_A 235 may have connectivity with another NF or may be connected to each apparatus via another NF.

Note that UPF_C 239 (also referred to as a branching point or an uplink classifier), which is a UPF different from the UPF_A 235, may be present between the UPF_A 235 and the access network, as an apparatus or NF. In a case that the UPF_C 239 is present, the PDU session between the UE_A 10 and the DN_A 5 is established via the access network, the UPF_C 239, and the UPF_A 235.

Additionally, the AUSF is connected to the UDM and the AMF_A 240. The AUSF functions as an authentication server.

The UDSF provides a function for all NFs to store or retrieve information as unstructured data.

The NEF provides a means to securely provide services and capabilities provided by the 3GPP network. The NEF stores information received from another NF as structured data.

In a case that a NF discovery request is received from a NF instance, the NRF provides the NF with information of found NF instances or holds information of available NF instances or services supported by the instances.

The PCF is connected to the SMF (SMF_A 230), the AF, and the AMF_A 240. The PCF provides a policy rule and the like.

The UDM is connected to the AMF_A 240, the SMF (SMF_A 230), the AUSF, and the PCF. The UDM includes a UDM FE (application front end) and a User Data Repository (UDR).

The UDM FE performs processing of authentication information (credentials), location management, subscriber management (subscription management), and the like. The UDR stores data necessary for the UDM FE for provision and the policy profile necessary for the PCF.

The AF is connected to the PCF. The AF affects traffic routing or is involved in the policy control.

The N3IWF provides functions of establishing an IPsec tunnel with the UE, relaying NAS (N1) signaling between the UE and the AMF, processing N2 signaling transmitted from the SMF and relayed by the AMF, establishing IPsec Security Association (IPsec SA), relaying user plane packets between the UE and the UPF, selecting the AMF, and the like.

The S1 mode is a UE mode capable of transmitting and/or receiving messages using the S1 interface. Note that the S1 interface may be configured with an S1-MME interface, an S1-U interface, and an X2 interface that connects between radio base stations.

For example, UEs in the S1 mode are capable of access to EPC via eNBs providing E-UTRA functionality or access to EPC via en-gNBs providing NR functionality.

Note that access to EPC via eNBs providing E-UTRA functionality and access to EPC via en-gNBs providing NR functionality are designated as the S1 mode, but each may be configured as separate, different modes.

The N1 mode is a UE mode in which the UE is capable of access to 5GC via a 5G access network. The N1 mode may be a UE mode capable of transmitting and/or receiving messages using the N1 interface. Note that the N1 interface may be configured with an N1 interface and an Xn interface that connects between radio base stations.

UEs in the N1 mode is, for example, capable of access to 5GC via ng-eNBs providing E-UTRA functionality or access to 5GC via gNBs providing NR functionality.

Note that access to 5GC via ng-eNBs providing E-UTRA functionality and access to 5GC via gNBs providing NR functionality are designated as the N1 mode, but each may be configured as separate, different modes.

1.2. Configuration of Each Apparatus

The configuration of each apparatus will be described below. Note that some or all of apparatuses to be described below and functions of units of the apparatuses may operate on physical hardware, or logical hardware which is virtually configured on general-purpose hardware.

1.2.1. Configuration of UE

Figure 5:
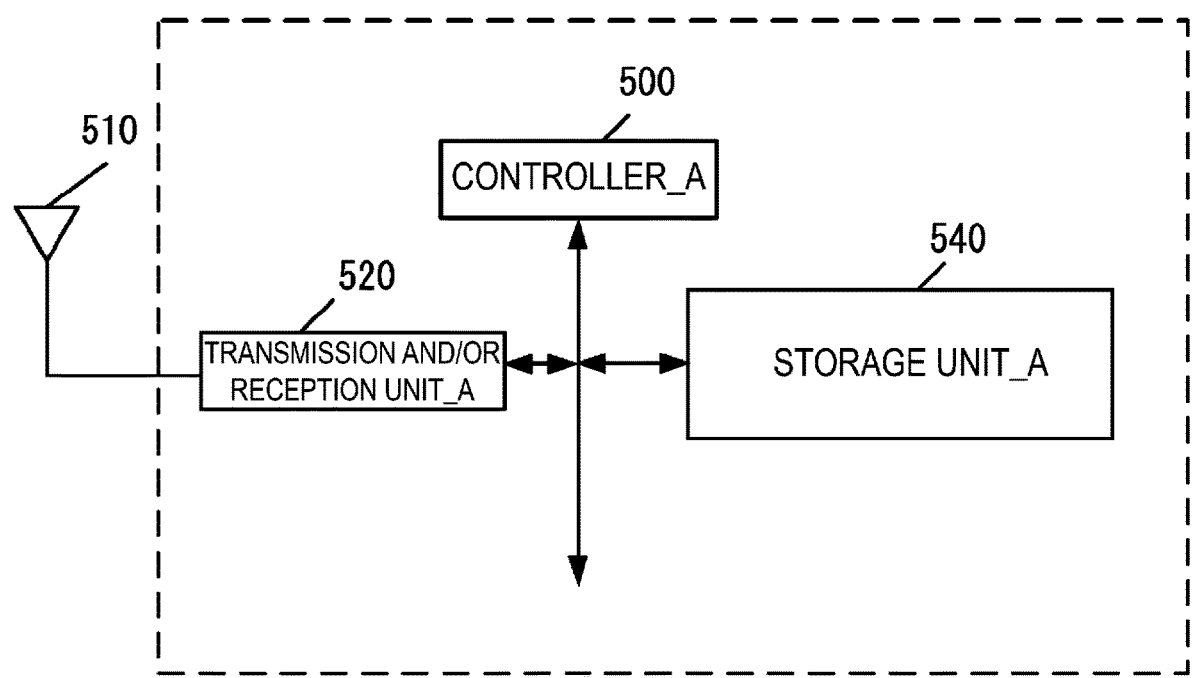
FIG. 5 is a diagram illustrating an apparatus configuration of a UE.

First, an example of an apparatus configuration of the UE_A 10 is illustrated in FIG. 5. As illustrated in FIG. 5, the UE_A 10 includes a controller_A 500, a transmission and/or reception unit_A 520, and a storage unit_A 540. The transmission and/or reception unit_A 520 and the storage unit_A 540 are connected to the controller_A 500 via a bus. An external antenna 410 is connected to the transmission and/or reception unit_A 520.

The controller_A 500 is a function unit for controlling the entire UE_A 10 and implements various processes of the entire UE_A 10 by reading out and performing various types of information and programs stored in the storage unit_A 540.

The transmission and/or reception unit_A 520 is a function unit through which the UE_A 10 connects to the base station (the UTRAN_A 20, the E-UTRAN_A 80, and the NG-RAN_A 120) and/or the wireless LAN access point (the WLAN AN) in the access network to connect to the access network. In other words, the UE_A 10 can connect to the base station and/or the access point in the access network via the external antenna 410 connected to the transmission and/or reception unit_A 520. To be specific, the UE_A 10 can transmit and/or receive user data and/or control information to and/or from the base station and/or the access point in the access network via the external antenna 410 connected to the transmission and/or reception unit_A 520.

The storage unit_A 540 is a function unit that stores programs, data, and the like necessary for each operation of the UE_A 10, and include, for example, a semiconductor memory, a Hard Disk Drive (HDD), a Solid State Drive (SSD), or the like. The storage unit_A 540 stores identification information, control information, a flag, a parameter, a rule, a policy, and the like included in a control message which is transmitted and/or received in the communication procedure described below.

1.2.2. eNB/NR Node

Figure 6:
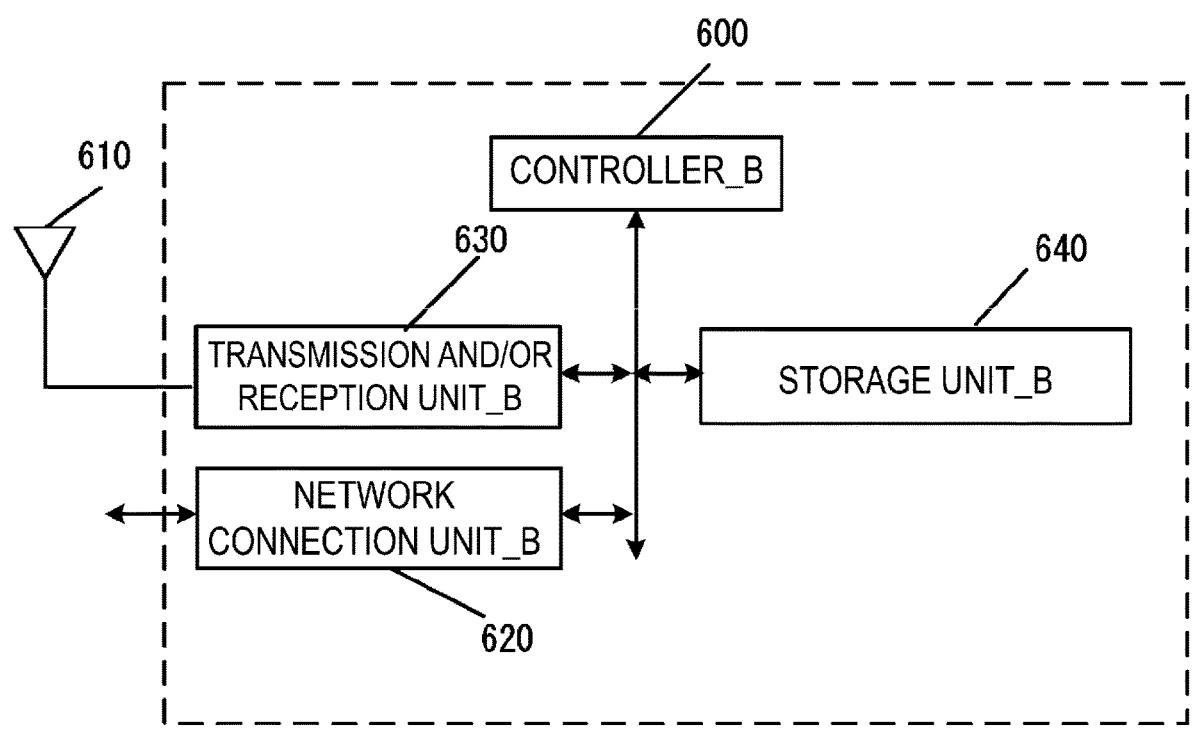
FIG. 6 is a diagram illustrating an apparatus configuration of an eNB/NR node.

Next, FIG. 6 illustrates an example of an apparatus configuration of the eNB_A 45 and the NR node_A 122. As illustrated in FIG. 6, the eNB_A 45 and the NR node_A 122 include a controller_B 600, a network connection unit_B 620, a transmission and/or reception unit_B 630, and a storage unit_B 640. The network connection unit_B 620, the transmission and/or reception unit_B 630, and the storage unit_B 640 are connected to the controller_B 600 via a bus. An external antenna 510 is connected to the transmission and/or reception unit_B 630.

The controller_B 600 is a function unit for controlling all of the eNB_A 45 and the NR node_A 122, and implements various processes of the eNB_A 45 and the NR node_A 122 by reading out and performing various types of information and programs stored in the storage unit_B 640.

The network connection unit_B 620 is a function unit through which the eNB_A 45 and the NR node_A 122 connect to the AMF_A 240 and the UPF_A 235 in the core network. In other words, the eNB_A 45 and the NR node_A 122 can be connected to the AMF_A 240 and the UPF_A 235 in the core network via the network connection unit_B 620. Specifically, the eNB_A 45 and the NR node_A 122 can transmit and/or receive user data and/or control information to and/or from the AMF_A 240 and/or the UPF_A 235 via the network connection unit_B 620.

The transmission and/or reception unit_B 630 is a function unit through which the eNB_A 45 and the NR node_A 122 connect to the UE_A 10. In other words, the eNB_A 45 and the NR node_A 122 can transmit and/or receive user data and/or control information to and/or from the UE_A 10 via the transmission and/or reception unit_B 630.

The storage unit_B 640 is a function unit for storing programs, data, and the like necessary for each operation of the eNB_A 45 and the NR node_A 122. The storage unit_B 640 includes, for example, a semiconductor memory, an HDD, an SSD, or the like. The storage unit_B 640 stores identification information, control information, a flag, a parameter, and the like included in a control message which is transmitted and/or received in the communication procedure described below. The storage unit_B 640 may store these pieces of information as the contexts for each UE_A 10.

1.2.3. Configuration of MME/AMF

Figure 7:
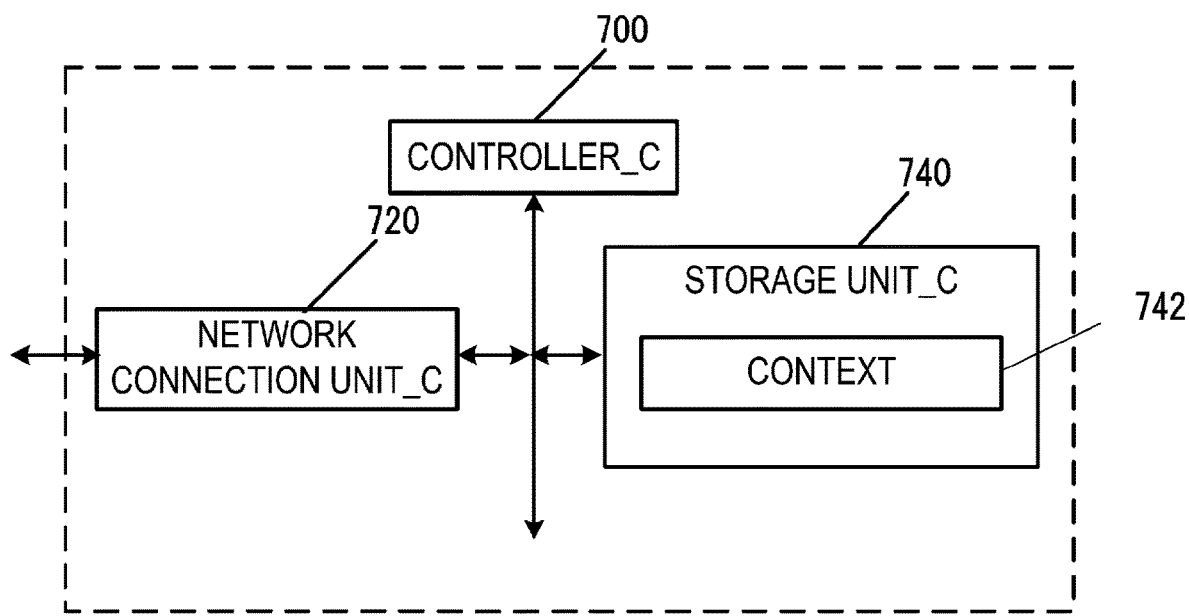
FIG. 7 is a diagram illustrating an apparatus configuration of an MME/AMF.

Next, FIG. 7 illustrates an example of an apparatus configuration of the MME_A 40 or the AMF_A 240. As illustrated in FIG. 7, the MME_A 40 or the AMF_A 240 include a controller_C 700, a network connection unit_C 720, and a storage unit_C 740. The network connection unit_C 720 and the storage unit_C 740 are connected to the controller_C 700 via a bus. The storage unit_C 740 stores a context 642.

The controller_C 700 is a function unit for controlling all of the MME_A 40 or the AMF_A 240, and implements various processes of all of the AMF_A 240 by reading out and performing various types of information and programs stored in the storage unit_C 740.

The network connection unit_C 720 is a function unit through which the MME_A 40 or the AMF_A 240 connect to another MME_A 40, AMF_240, SMF_A 230, a base station (the UTRAN_A 20, the E-UTRAN_A 80, and the NG-RAN_A 120) and/or a wireless LAN access point (the WLAN AN), the UDM, the AUSF, and the PCF in the access network. In other words, the MME_A 40 or the AMF_A 240 can transmit and/or receive user data and/or control information to and/or from the base station and/or access point, the UDM, the AUSF, and the PCF in the access network via the network connection unit_C 720.

The storage unit_C 740 is a function unit for storing programs, data, and the like necessary for each operation of the MME_A 40 or the AMF_A 240. The storage unit_C 740 includes, for example, a semiconductor memory, an HDD, an SSD, or the like. The storage unit_C 740 stores identification information, control information, a flag, a parameter, and the like included in a control message which is transmitted and/or received in the communication procedure described below. Examples of the context 642 stored in the storage unit_C 740 may include a context stored for each UE, a context stored for each PDU session, and a context stored for each bearer. The context stored for each UE may include an IMSI, an MSISDN, MM State, a GUTI, a ME Identity, a UE radio access capability, a UE network capability, an MS network capability, an access restriction, an MME F-TEID, an SGW F-TEID, an eNB address, an MME UE S1AP ID, an eNB UE S1AP ID, an NR node address, an NR node ID, a WAG address, and a WAG ID. The context stored for each PDU session may include an APN in Use, an assigned session type, IP address(es), a PGW F-TEID, an SCEF ID, and a default bearer. The context stored for each bearer may include an EPS bearer ID, a TI, a TFT, an SGW F-TEID, a PGW F-TEID, an MME F-TEID, an eNB address, an NR node address, a WAG address, an eNB ID, an NR node ID, and a WAG ID.

1.2.4. Configuration of SMF

Figure 8:
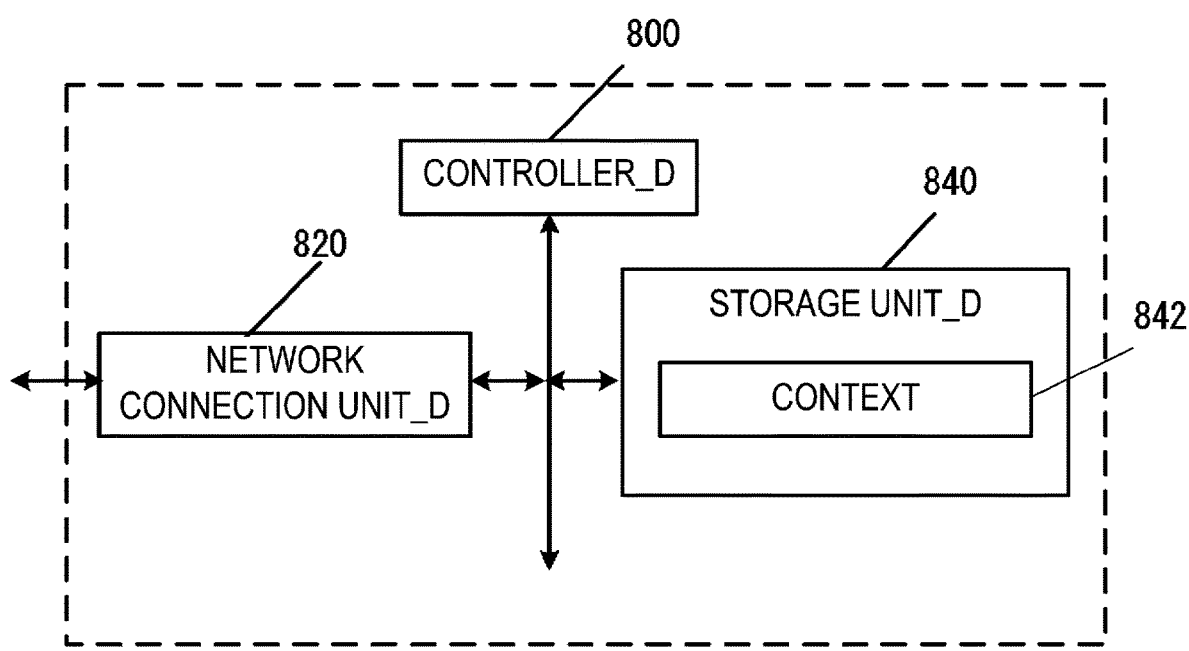
FIG. 8 is a diagram illustrating an apparatus configuration of an SMF/PGW/UPF.

Next, FIG. 8 illustrates an example of an apparatus configuration of the SMF_A 230. As illustrated in FIG. 8, the SMF_A 230 includes a controller_D 800, a network connection unit_D 820, and a storage unit_D 840. The network connection unit_D 820 and the storage unit_D 840 are connected to the controller_D 800 via a bus. The storage unit_D 840 stores a context 742.

The controller_D 800 of the SMF_A 230 is a function unit for controlling the entire SMF_A 230 and implements various processes of the entire SMF_A 230 by reading out and performing various types of information and programs stored in the storage unit_D 840.

The network connection unit_D 820 in the SMF_A 230 is a function unit for the SMF_A 230 to connect to the AMF_A 240, the UPF_A 235, the UDM, and the PCF. In other words, the SMF_A 230 can transmit and/or receive the user data and/or the control information to and/or from the AMF_A 240, the UPF_A 235, the UDM, and the PCF via the network connection unit_D 820.

The storage unit_D 840 of the SMF_A 230 is a function unit for storing programs, data, and the like necessary for each operation of the SMF_A 230. The storage unit_D 840 of the SMF_A 230 includes, for example, a semiconductor memory, an HDD, an SSD, or the like. The storage unit_D 840 of the SMF_A 230 stores identification information, control information, a flag, a parameter, and the like included in a control message which is transmitted and/or received in the communication procedure described below. In addition, examples of the context 742 stored in the storage unit_D 840 of the SMF_A 230 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.5. Configuration of PGW/UPF

Next, FIG. 8 illustrates an example of an apparatus configuration of the PGW_A 30 or the UPF_A 235. As illustrated in FIG. 8, each of the PGW_A 30 or the UPF_A 235 includes a controller_D 800, a network connection unit_D 820, and a storage unit_D 840. The network connection unit_D 820 and the storage unit_D 840 are connected to the controller_D 800 via a bus. The storage unit_D 840 stores a context 742.

The controller_D 800 of the PGW_A 30 or the UPF_A 235 is a function unit for controlling the entire PGW_A 30 or UPF_A 235, and implements various processes of all of the PGW_A 30 or the UPF_A 235 by reading out and performing various types of information and programs stored in the storage unit_D 840.

The network connection unit_D 820 in the PGW_A 30 or the UPF_A 235 is a function unit for the PGW_A 30 or the UPF_A 235 to connect to the DN (that is, the DN_A 5), the SMF_A 230, another UPF_A 235, and the access network (that is, the UTRAN_A 20, the E-UTRAN_A 80, and the NG-RAN_A 120). In other words, the UPF_A 235 can transmit and/or receive the user data and/or the control information to and/or from the DN (that is, the DN_A 5), the SMF_A 230, another UPF_A 235, and the access network (that is, the UTRAN_A 20, the E-UTRAN_A 80, and NG-RAN_A 120) via the network connection unit_D 820.

The storage unit_D 840 in the UPF_A 235 is a function unit for storing programs, data, and the like necessary for each operation by the UPF_A 235. The storage unit_D 840 in the UPF_A 235 includes, for example, a semiconductor memory, an HDD, an SSD, or the like. The storage unit_D 840 in the UPF_A 235 stores identification information, control information, a flag, a parameter, and the like included in the control message transmitted and/or received in a communication procedure described later. In addition, examples of the context 742 stored in the storage unit_D 840 of the UPF_A 235 may include a context stored for each UE, a context stored for each APN, a context stored for each PDU session, and a context stored for each bearer. The context stored for each UE may include an IMSI, an ME Identity, an MSISDN, and a RAT type. The context stored for each APN may include an APN in use. Note that the context stored for each APN may be stored for each data network identifier. The context stored for each PDU session may include Assigned Session Type, IP Address(es), SGW F-TEID, PGW F-TEID, and Default Bearer. The context stored for each bearer may include an EPS bearer ID, a TFT, an SGW F-TEID, and a PGW F-TEID.

1.2.6. Information Stored in Storage Unit of Each Apparatus

Next, each piece of information stored in the storage unit of each of the above-described apparatuses will be described.

An International Mobile Subscriber Identity (IMSI) is permanent identification information of a subscriber (user), and is identification information assigned to a user using the UE. The IMSI stored by the UE_A 10, the MME_A 40/CPF_A 140/AMF_A 2400, and the SGW_A 35 may be the same as the IMSI stored by an HSS_A 50.

The EMM State/MM State indicates a mobility management state of the UE_A 10 or the MME_A 40/CPF_A 140/AMF_A 240. For example, the EMM State/MM State may be an EMM-REGISTERED state (registered state) in which the UE_A 10 is registered in the network, and/or an EMM-DEREGISTERD state (deregistered state) in which the UE_A 10 is not registered in the network. The EMM State/MM State may be an ECM-CONNECTED state in which a connection is maintained between the UE_A 10 and the core network, and/or an ECM-IDLE state in which the connection is released. Note that the EMM State/MM State may be information for distinguishing a state in which the UE_A 10 is registered in the EPC from a state in which the UE_A 10 is registered in the NGC or 5GC.

The Globally Unique Temporary Identity (GUTI) is temporary identification information of the UE_A 10. The GUTI includes identification information (Globally Unique MME Identifier (GUMMEI)) of the MME_A 40/CPF_A 140/AMF_A 240 and identification information (M-Temporary Mobile Subscriber Identity (M-TMSI)) of the UE_A 10 in a specific MME_A 40/CPF_A 140/AMF_A 240. The ME Identity is an ID of the UE_A 10 or the ME, and may be International Mobile Equipment Identity (IMEI) or IMEI Software Version (IMEISV), for example. The MSISDN represents a basic phone number of the UE_A 10. The MSISDN stored by the MME_A 40/CPF_A 140/AMF_A 240 may be information indicated by the storage unit of the HSS_A 50. Note that the GUTI may include information for identifying the CPF_140.

The MME F-TEID is information for identifying the MME_A 40/CPF_A 140/AMF_A 240. The MME F-TEID may include an IP address of the MME_A 40/CPF_A 140/AMF_A 240, a Tunnel Endpoint Identifier (TEID) of the MME_A 40/CPF_A 140/AMF_A 240, or both of them. The IP address of the MME_A 40/CPF_A 140/AMF_A 240 and the TEID of the MME_A 40/CPF_A 140/AMF_A 240 may be stored independently of each other. The MME F-TEID may be identification information for user data, or identification information for control information.

The SGW F-TEID is information for identifying the SGW_A 35. The SGW F-TEID may include an IP address of the SGW_A 35, a TEID of the SGW_A 35, or both of them. The IP address of the SGW_A 35 and the TEID of the SGW_A 35 may be stored independently of each other. The SGW F-TEID may be identification information for user data, or identification information for control information.

The PGW F-TEID is information for identifying the PGW_A 30/UPGW_A 130/SMF_A 230/UPF_A 235. The PGW F-TEID may include an IP address of the PGW_A 30/UPGW_A 130/SMF_A 230/UPF_A 235, a TEID of the PGW_A 30/UPGW_A 130/SMF_A 230/UPF_A 235, or both of them. The IP address of the PGW_A 30/UPGW_A 130/SMF_A 230/UPF_A 235 and the TEID of the PGW_A 30/UPGW_A 130/SMF_A 230/UPF_A 235 may be stored independently of each other. The PGW F-TEID may be identification information for user data, or identification information for control information.

The eNB F-TEID is information for identifying the eNB_A 45. The eNB F-TEID may include an IP address of the eNB_A 45, a TEID of the eNB_A 45, or both of them. The IP address of the eNB_A 45 and the TEID of the SGW_A 35 may be stored independently of each other. The eNB F-TEID may be identification information for user data, or identification information for control information.

The APN may be identification information for identifying the core network and an external network such as the DN. Furthermore, the APN can also be used as information for selecting a gateway such as the PGW_A 30/UPGW_A 130/UPF_A 235 for connecting the core network A_90. Note that the APN may be a Data Network Name (DNN). Therefore, the APN may be represented by a DNN, or the DNN may be represented by the APN.

Note that the APN may be identification information for identifying such a gateway, or identification information for identifying an external network such as the DN. Note that, in a case that multiple gateways connecting the core network and the DN are deployed, there may be multiple gateways that can be selected according to the APN. Furthermore, one gateway may be selected among such multiple gateways by another method using identification information other than the APN.

The UE Radio Access Capability is identification information indicating a radio access capability of the UE_A 10. The UE Network Capability includes an algorithm of security supported by the UE_A 10 and a key derivation function. The MS Network Capability is information including, in the UE_A 10 having a function of a GERAN_A 25 and/or a UTRAN_A 20, one or more pieces of information necessary for an SGSN_A 42. The Access Restriction is registration information for access restriction. The eNB Address is an IP address of the eNB_A 45. The MME UE S1AP ID is information for identifying the UE_A 10 in the MME_A 40/CPF_A 140/AMF_A 240. The eNB UE S1AP ID is information for identifying the UE_A 10 in the eNB_A 45.

The APN in Use is an APN recently used. The APN in Use may be Data Network Identifier. This APN may include identification information of the network and identification information of a default operator. Furthermore, the APN in Use may be information for identifying a DN with which the PDU session is established.

The Assigned Session Type is information indicating a PDU session type. The Assigned Session Type may be Assigned PDN Type. The PDU session type may be IP, or non-IP. Furthermore, in a case that the PDU session type is IP, information indicating a PDN type assigned by the network may be further included. Note that the Assigned Session Type may be IPv4, IPv6, or IPv4v6.

Unless otherwise specifically described, the IP Address refers to the IP address assigned to the UE. The IP address may be an IPv4 address, an IPv6 address, an IPv6 prefix, or the interface ID. Note that in a case that the Assigned Session Type indicates non-IP, an element of the IP Address may not be included.

The DN ID is identification information for identifying the core network_B 190 and an external network such as the DN. Furthermore, the DN ID can also be used as information for selecting a gateway such as the UPGW_A 130 or the PF_A 235 connecting the core network_B 190.

Note that the DN ID may be identification information for identifying such a gateway, or identification information for identifying an external network such as the DN. Note that, in a case that multiple gateways connecting the core network_B 190 and the DN are deployed, there may be multiple gateways that can be selected according to the DN ID. Furthermore, one gateway may be selected among such multiple gateways by another method using identification information other than the DN ID.

Furthermore, the DN ID may be information equivalent to the APN, or different from the APN. Note that in a case that the DN ID is the information different from the APN, each apparatus may manage information indicating mapping between the DN ID and the APN, perform a procedure to inquire the APN by using the DN ID, or perform a procedure to inquire the DN ID by using the APN.

SCEF ID is an IP address of an SCEF_A 46 used in the PDU session. The Default Bearer is information acquired and/or created in a case that a PDU session is established and is EPS bearer identification information for identifying a default bearer associated with the PDU session.

The EPS Bearer ID is identification information of the EPS bearer. The EPS Bearer ID may be identification information for identifying Signalling Radio Bearer (SRB) and/or Control-plane Radio bearer (CRB), or identification information for identifying Data Radio Bearer (DRB). The Transaction Identifier (TI) is identification information for identifying a bidirectional message flow (Transaction). Note that the EPS Bearer ID may be EPS bearer identification information for identifying a dedicated bearer. Therefore, the EPS bearer ID may be identification information for identifying the EPS bearer different from the default bearer. The TFT indicates all packet filters associated with the EPS bearer. The TFT is information for identifying some pieces of user data to be transmitted and/or received, and thus, the UE_A 10 uses the EPS bearer associated with the TFT to transmit and/or receive the user data identified by the TFT. In still other words, the UE_A 10 uses a Radio Bearer (RB) associated with the TFT to transmit and/or receive the user data identified by the TFT. The TFT may associate the user data such as application data to be transmitted and/or received with an appropriate transfer path, and may be identification information for identifying the application data. The UE_A 10 may use the default bearer to transmit and/or receive the user data which cannot be identified by the TFT. The UE_A 10 may store in advance the TFT associated with the default bearer.

The Default Bearer is EPS bearer identification information for identifying a default bearer associated with a PDU session. Note that the EPS bearer may be a logical communication path established between the UE_A 10 and the PGW_A 30/UPGW_A 130/UPF_A 235, or a communication path constituting the PDN connection/PDU session. Furthermore, the EPS bearer may be a default bearer, or a dedicated bearer. Furthermore, the EPS bearer may include an RB established between the UE_A 10 and the base station and/or the access point in the access network. Furthermore, the RB and the EPS bearer may be associated with each other on a one-to-one basis. Therefore, identification information of the RB may be associated with the identification information of the EPS bearer on a one-to-one basis, or may be the same identification information as the identification information of the EPS bearer. Note that the RB may be an SRB and/or a CRB, or a DRB. The Default Bearer may be information that the UE_A 10 and/or the SGW_A 35 and/or the PGW_A 30/UPGW_A 130/SMF_A 230/UPF_A 235 acquire from the core network in a case that the PDU session is established. Note that the default bearer is an EPS bearer first established during the PDN connection/PDU session, and is such an EPS bearer that only one bearer can be established during one PDN connection/PDU session. The default bearer may be an EPS bearer that can be used for communication of user data not associated with the TFT. The dedicated bearer is an EPS bearer established after the default bearer is established during the PDN connection/PDU session, and is such an EPS bearer that multiple bearers can be established during one PDN connection/PDU session. The dedicated bearer is an EPS bearer that can be used for communication of user data not associated with the TFT.

User Identity is information for identifying a subscriber. The User Identity may be an IMSI, or an MSISDN. Furthermore, the User Identity may also be identification information other than the IMSI or the MSISDN. Serving Node Information is information for identifying the MME_A 40/CPF_A 140/AMF_A 240 used in a PDU session, and may be an IP address of the MME_A 40/CPF_A 140/AMF_A 240.

The eNB Address is an IP address of the eNB_A 45. The eNB ID is information for identifying the UE in the eNB_A 45. MME Address is an IP address of the MME_A 40/CPF_A 140/AMF_A 240. MME ID is information for identifying the MME_A 40/CPF_A 140/AMF_A 240. The NR node Address is an IP address of the NR node_A 122. The NR node ID is information for identifying the NR node_A 122. The WAG Address is an IP address of the WAG. The WAG ID is information for identifying the WAG.

The anchor or anchor point is a UFP with a gateway function of the DN and the PDU session. The UPF to be the anchor point may be a PDU session anchor or may be an anchor.

The SSC mode indicates a mode of Session and Service Continuity supported by a system and/or each apparatus in the 5GC. To be more specific, the SSC mode may be a mode indicating a type of the session and service continuity supported by a PDU session established between the UE_A 10 and the anchor point). Here, anchor point may be the UPGW or may be the UPF_A 235. Note that the SSC mode may be a mode indicating a type of the session and service continuity configured for each PDU session. The SSC mode may be configured to include three modes of SSC mode 1, SSC mode 2, and SSC mode 3. The SSC mode is associated with the anchor point and cannot be changed while the PDU session is established.

The SSC mode 1 in the present embodiment is a mode of the session and service continuity in which the same UPF is continuously maintained as an anchor point regardless of the access technology such as the Radio Access Technology (RAT) and the cell the UE_A 10 uses to connect to a network. To be more specific, the SSC mode 1 may be a mode in which even in a case that the mobility of the UE_A 10 occurs, the session and service continuity is achieved without changing the anchor point used by the established PDU session.

Furthermore, the SSC mode 2 in the present embodiment is a mode of the session and service continuity to release a PDU session first, and then establish a PDU session, in a case that the PDU session includes an anchor point associated with the SSC mode 2. To be more specific, the SSC mode 2 is a mode to delete the PDU session once, and then establish a new PDU session in a case that a relocation of the anchor point occurs.

The SSC mode 2 is a mode of the session and service continuity in which the same UPF is continuously maintained as an anchor point only in a serving area of the UPF. To be more specific, the SSC mode 2 may be a mode in which as long as the UE_A 10 is in the serving area of the UPF, the session and service continuity is achieved without changing the UPF used by the established PDU session. The SSC mode 2 may be a mode in which in a case that the mobility that the UE_A 10 leaves the serving area of the UPF occurs, the session and service continuity is achieved by changing the UPF used by the established PDU session.

Here, the serving area of the TUPF may be an area in which one UPF can provide a session and service continuity function, or a subset of the access network such as the RAT or the cell used in a case that the UE_A 10 connects to a network. The subset of the access network may be a network including one or multiple RATs and/or cells, or may be the TA.

Furthermore, the SSC mode 3 in the present embodiment is a mode of the session and service continuity in which a PDU session can be established between a new anchor point and a UE for the same DN without releasing a PDU session between the UE and the anchor point.

The SSC mode 3 is a mode of the session and service continuity that allows a new PDU session and/or communication path to be established via a new UPF to the same DN before disconnecting the PDU session and/or the communication path established between the UE_A 10 and the UPF. The SSC mode 3 may be a mode of the session and service continuity that allows the UE_A 10 to be multi-homed.

Additionally/alternatively, the SSC mode 3 may be a mode that allows the session and service continuity using multiple PDU sessions and/or the UPFs associated with the PDU sessions. In other words, in the case of the SSC mode 3, each apparatus may achieve the session and service continuity using the multiple PDU sessions, or may achieve the session and service continuity using the multiple TUPFs.

Here, in the case that each apparatus establishes a new PDU session and/or communication path, a new UPF may be selected by the network, or a new UPF may be an optimal UPF for a place at which the UE_A 10 connects to the network. In a case that the multiple PDU sessions and/or the UPFs used by the PDU sessions are effective, the UE_A 10 may correlate the application and/or flow communications to a new established PDU session immediately or based on the completion of the communications.

1.3. Description of Initial Procedure

Next, before describing detailed processes of an initial procedure in the present embodiment, in order to avoid redundant descriptions, terminology specific to the present embodiment and primary identification information used in each procedure will be described beforehand.

In the present embodiment, the network refers to at least some of the access network_A 20/80, the access network_B 80/120, the core network_A 90, the core network_B 190, the DN_A 5, and the PDN_A 6. One or more apparatuses included in at least some of the access network_A 20/80, the access network_B 80/120, the core network_A 90, the core network_B 190, the DN_A 5, and the PDN_A 6 may also be referred to as a network or a network apparatus. Specifically, the expression "the network performs transmission and/or reception of a message and/or performs a procedure" signifies that "an apparatus (network apparatus) in the network performs transmission and/or reception of a message and/or performs a procedure".

In the present embodiment, a Session Management (SM) message (also referred to as a Non-Access-Stratum (NAS) SM message or an SM message) may be a NAS message used in a procedure for the SM (also referred to as a session management procedure or an SM procedure), or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. The procedure for SM may include a PDU session establishment procedure, a PDU session modification procedure, and the like.

In the present embodiment, a Tracking Area (TA) is a range that can be represented by location information of the UE_A 10 managed by the core network, and may include one or more cells, for example. The TA may be a range in which a control message such as a paging message is broadcast, or a range in which the UE_A 10 can move without performing a handover procedure.

In the present embodiment, a TA list is a list including one or more TAs allocated to the UE_A 10 by the network. Note that, while the UE_A 10 is moving within the one or more TAs included in the TA list, the UE_A 10 can move without performing the registration procedure. In other words, the TA list may be an information group indicating an area in which the UE_A 10 can move without performing the registration procedure.

In the present embodiment, a Network Slice is a logical network that provides specific network capabilities and network performance. Hereinafter, the network slice is also referred to as a NW slice.

The Network Slice Instance (NSI) in the present embodiment is an entity of each of one or multiple Network Slices configured in the core network_B 190. The NSI in the present embodiment may include a virtual Network Function (NF) generated using a Network Slice Template (NST). Here, the NST is associated with a resource request for providing a required communication service or capability, and is a logical expression of one or multiple Network Functions (NFs). Specifically, the NSI may be an aggregation including multiple NFs in the core network_B 190. The NSI may be a logical network configured to classify the user data delivered through a service or the like. The network slice may include at least one or more NFs. The NF included in the network slice may be an apparatus shared by another network slice or otherwise. The UE_A 10, and/or the apparatus in the network can be assigned to one or multiple network slices, based on NSSAI and/or S-NSSAI and/or UE usage type and/or one or multiple network slice type IDs and/or registration information such as one or multiple NSIDs and/or the APN.

The S-NSSAI in the present embodiment is an abbreviation for Single Network Slice Selection Assistance information, and is information for identifying a network slice. The S-NSSAI may include Slice/Service type (SST) and Slice Differentiator (SD). The S-NSSAI may be configured with only the SST, or may be configured with both the SST and the SD. Here, the SST is information indicating the operation of network slices expected in terms of function and service. The SD may be information that complements the SST in a case of selecting one NSI from multiple NSIs indicated by the SST. The S-NSSAI may be unique information for each Public Land Mobile Network (PLMN), may be standard information shared between PLMNs, or may be information specific to communication service operators different for each PLMN.

More specifically, the SST and/or the SD may be standard information (Standard Value) shared between PLMNs or may be information specific (Non Standard Value) to communication service operators different for each PLMN. The network may store one or multiple pieces of S-NSSAI in the registration information of the UE_A 10 as the default S-NSSAI.

The Single Network Slice Selection Assistance information (NSSAI) in the present embodiment is a group of pieces of S-NSSAI. Each S-NSSAI included in the NSSAI is information that assists the access network or the core network to select an NSI. The UE_A 10 may store the NSSAI allowed from the network for each PLMN. The NSSAI may be information used to select the AMF_A 240.

The operator A network according to the present embodiment is a network operated by a network operator A (operator A). Here, for example, the operator A may deploy a NW slice common to the operator B described below.

The operator B network according to the present embodiment is a network operated by a network operator B (operator B). Here, for example, the operator B may deploy a NW slice common to the operator A.

The first NW slice in the present embodiment is a NW slice to which the established PDU session belongs in a case that the UE connects to a specific DN. Note that for example, the first NW slice may be a NW slice managed in the operator A network, or a NW slice that is commonly managed in the operator B network.

The second NW slice in the present embodiment is a NW slice to which another PDU session capable of connecting to the DN belongs, which is the connection destination of the PDU session belonging to the first NW slice. Note that the first NW slice and the second NW slice can be operated by the same operator or may be operated by different operators.

In the present embodiment, an equivalent PLMN is a PLMN treated to be the same PLMN as arbitrary PLMN in the network.

The Dedicated Core Network (DCN) in the present embodiment is one or multiple specific subscriber type dedicated core networks configured in the core network_A 90. Specifically, a DCN for a UE registered as a Machine to Machine (M2M) communication function user may be configured in the core network_A 90, for example. A default DCN for a UE without a proper DCN may be configured in the core network_A 90. Furthermore, in the DCN, at least one or more MMEs_40 or SGSNs_A 42 may be located, and further, at least one or more SGWs_A 35, PGWs_A 30, or PCRFs_A 60 may be located. Note that the DCN may be identified by a DCN ID, and further the UE may be assigned to one DCN based on information such as the UE usage type and/or the DCN ID, and the like.

The first timer in the present embodiment is a timer for managing initiation of a procedure for session management, such as a PDU session establishment procedure, and/or transmission of a Session Management (SM) message such as a PDU session establishment request message, and may be information indicating a value of a backoff timer for managing session management behavior. Hereinafter, the first timer and/or the backoff timer may be referred to as a timer. While the first timer is running, the initiation of the procedure for session management and/or the transmission and/or reception of the SM message for each apparatus may be prohibited. Note that the first timer may be configured to associate with at least one of a congestion management unit applied by the NW and/or a congestion management unit identified by the UE. For example, the first timer may be configured with at least one unit of an APN/DNN unit, and/or an identification information unit indicating one or more NW slices, and/or a reject cause value unit in the session management procedure, and/or a session unit in which rejection is indicated in the session management procedure, and/or a PTI unit of the session management procedure.

Note that the SM message may be a NAS message used in a procedure for the session management, or may be a control message transmitted and/or received between the UE_A 10 and the SMF_A 230 via the AMF_A 240. Furthermore, the SM message may include a PDU session establishment request message, a PDU session establishment accept message, a PDU session complete message, a PDU session reject message, a PDU session modification request message, a PDU session modification accept message, a PDU session modification reject message, and the like. Furthermore, the procedure for the session management may include a PDU session establishment procedure, a PDU session modification procedure, and the like. In these procedures, a backoff timer value may be included for each message received by the UE_A 10. The UE may configure a backoff timer received from the NW as a first timer, may configure a timer value in other ways, or may configure a random value. In addition, in a case that multiple backoff timers received from the NW is configured, the UE may manage multiple "first timers" corresponding to the multiple backoff timers, or may select one timer value from the multiple backoff timer values received from the NW based on the policy held by the UE, and configure and manage the first timer. For example, in a case that the UE receives two backoff timer values, the UE configures and manages the backoff timer values received from the NW to the "first timer #1" and the "first timer #2" respectively. In addition, the UE may select one value from the multiple backoff timer values received from the NW based on the policy held by the UE and configure to the first timer to manage.

The UE_A 10 may manage multiple "first timers" corresponding to the multiple backoff timers in a case that the UE_A 10 receives multiple backoff timer values from the NW. Here, to distinguish between the multiple "first timers" received by the UE_A 10, the multiple "first timers" may be described, for example, as the "first timer #1" or the "first timer #2" below. The multiple backoff timers may be acquired in a single session management procedure, or may be acquired in different separate session management procedures.

Here, the first timer may be a backoff timer for preventing reconnection, which is configured for multiple associated NW slices based on information for identifying one NW slice as previously described, or may be a backoff timer for preventing reconnection, which is configured in a unit of a combination of APN/DNN and one NW slice. However, the first timer is not limited to this, and the first timer may be a backoff timer for preventing reconnection, which is configured in a unit of a combination of APN/DNN and multiple associated NW slices based on information for identifying one NW slice.

The re-attempt (Re-attempt) information included in the 11th identification information in the present embodiment is information for the network (NW) to indicate to the UE_A 10 whether or not allow reconnection using the same DNN information and/or S-NSSAI information for the rejected PDU session establishment request (S1100).

At this time, in the PDU session establishment request (1100), in a case that the UE has performed a PDU session establishment request (S1100) not including a DNN, not including a DNN is referred to as the same information. In addition, in the PDU session establishment request (1100), in a case that the UE has performed a PDU session establishment request (S1100) not including a S-NSSAI, not including a S-NSSAI is referred to as the same information.

Note that the re-attempt information may be configured in a unit of UTRAN access and/or E-UTRAN access and/or NR access and/or slice information and/or equivalent PLMN and/or S1 mode and/or NW mode.

Further, the re-attempt information specified in the access unit (UTRAN access, E-UTRAN access, NR access) may be information indicating reconnection using the same information to the network assuming the access changes. The re-attempt information specified in the slice unit may be specified with slice information different from the rejected slice, and reconnection using the specified slice information may be allowed.

In addition, the re-attempt information specified in the equivalent PLMN unit may be information indicating that reconnection using the same information is allowed for the PLMN change as long as the PLMN of the change destination is an equivalent PLMN. In addition, in a case that the PLMN of the change destination is not an equivalent PLMN, the re-attempt information specified in the equivalent PLMN unit may be information indicating that reconnection using the present procedure is not allowed.

Furthermore, the re-attempt information specified in the mode unit (S1 mode, N1 mode) may be information indicating that reconnection using the same information is allowed in the mode change as long as the mode of the change destination is the S1 mode. The re-attempt information specified in the mode unit (S1 mode, N1 mode) may be information indicating that reconnection using the same information is not allowed in the mode change as long as the mode of the change destination is the S1 mode.

The network slice association rules in the present embodiment are rules that associate information for identifying multiple network slices. Note that the network slice association rules may be received in the PDU session reject message or may be configured to the UE_A 10 in advance. In addition, the network slice association rules may apply the latest one at the UE_A 10. Conversely, the UE_A 10 may perform behavior based on the latest network slice association rule. For example, in a case that the UE_A 10 receives a new network slice association rule in the PDU session reject message while a network slice association rule is configured to the UE_A 10 in advance, the UE_A 10 may update the network slice association rule held in the UE_A 10.

The priority management rules of the backoff timer in the present embodiment are rules configured to the UE_A 10 to collectively manage multiple backoff timers that have occurred in multiple PDU sessions into a single backoff timer. For example, in a case that conflicting or overlapping congestion managements are applied and in a case that the UE is holding multiple backoff timers, the UE_A 10 may collectively manage the multiple backoff timers based on the priority management rules of the backoff timer. Note that a pattern in which conflicting or overlapping congestion managements occur is a case in which congestion management based solely on the DNN and congestion management based on both the DNN and the slice information are applied at the same time. In this case, congestion management based solely on the DNN is prioritized. Note that the priority management rules of the backoff timer may not be limited to this. Note that the backoff timer may be a first timer included in the PDU session reject message.

The first state in the present embodiment is a state in which each apparatus has completed the registration procedure and the PDU session establishment procedure, and is a state in which the UE_A 10 and/or each apparatus is applied with one or more of first to fourth congestion managements. Here, the UE_A 10 and/or each apparatus may be in a state in which the UE_A 10 is registered to the network (RM-REGISTERED state) by the completion of the registration procedure, and the completion of the PDU session establishment procedure may be a state in which the UE_A 10 has received the PDU session establishment reject message from the network.

The congestion management in the present embodiment consists of one or more congestion managements of the first congestion management to the fourth congestion management. Note that the control of the UE by the NW is achieved by congestion management recognized by the first timer and the UE, and the UE may store associations of these pieces of information.

The first congestion management in the present embodiment indicates control signal congestion management intended for parameters of the DNN. For example, in the NW, in a case that the congestion for the DNN #A is detected, and in a case that the NW recognizes a UE-initiated session management request intended for only parameters of the DNN #A, the NW can apply the first congestion management. Note that even in a case that the UE-initiated session management request does not include DNN information, the default DNN may be selected initiated by the NW for the congestion management target. Alternatively, the NW may apply the first congestion management even in a case that the NW recognizes the UE-initiated session management request including the DNN #A and S-NSSAI #A. In a case that the first congestion management is applied, the UE may suppress the UE-initiated session management request intended for the DNN #A only.

In other words, the first congestion management in the present embodiment may be control signal congestion management intended for the DNN, and may be congestion management due to connectivity to the DNN being congested. For example, the first congestion management may be congestion management to restrict connection to the DNN #A in all connectivity. Here, the connection to the DNN #A in all connectivity may be connection of the DNN #A in connectivity using all S-NSSAI available to the UE, and may be connection of the DNN #A through network slices to which the UE is connectable. Furthermore, the connection to the DNN #A in all connectivity may include connectivity to the DNN #A not through network slices.

The second congestion management in the present embodiment indicates control signal congestion management intended for parameters of the S-NSSI. For example, in the NW, in a case that the control signal congestion for the S-NSSAI #A is detected, and in a case that the NW recognizes a UE-initiated session management request intended for only parameters of the S-NSSAI #A, the NW can apply the second congestion management. In a case that the second congestion management is applied, the UE may suppress the UE-initiated session management request intended for the S-NSSAI #A only.

In other words, the second congestion management in the present embodiment is control signal congestion management intended for the S-NSSAI and may be congestion management due to network slices selected by the S-NSSAI being congested. For example, the second congestion management may be congestion management to restrict all connections based on the S-NSSAI #A. That is, the second congestion management may be congestion management to restrict all connections to the DNN via network slices selected by the S-NSSAI #A.

The third congestion management in the present embodiment indicates control signal congestion management intended for parameters of the DNN and the S-NSSAI. For example, in the NW, in a case that the control signal congestion for the DNN #A and control signal congestion for the S-NSSAI #A are detected at the same time, and in a case that the NW recognizes a UE-initiated session management request intended for the parameters of the DNN #A and the S-NSSAI #A, the NW can apply the third congestion management. Note that even in a case that the UE-initiated session management request does not include information indicating the DNN, the default DNN may be selected initiated by the NW for the congestion management target together. In a case that the third congestion management is applied, the UE may suppress the UE-initiated session management request intended for the parameters of the DNN #A and the S-NSSAI #A.

In other words, the third congestion management in the present embodiment is control signal congestion management intended for parameters of the DNN and the S-NSSAI, and may be congestion management due to connectivity to the DNN via network slices selected based on the S-NSSAI being congested. For example, the third congestion management may be congestion management to restrict connection to the DNN #A within connectivity based on the S-NSSAI #A.

The fourth congestion management in the present embodiment indicates control signal congestion management intended for at least one parameter of the DNN and/or the S-NSSAI. For example, in the NW, in a case that the control signal congestion for the DNN #A and control signal congestion for the S-NSSAI #A are detected at the same time, and in a case that the NW recognizes a UE-initiated session management request intended for at least one parameter of the DNN #A and/or the S-NSSAI #A, the NW can apply the fourth congestion management. Note that even in a case that the UE-initiated session management request does not include information indicating the DNN, the default DNN may be selected initiated by the NW for the congestion management target together. In a case that the fourth congestion management is applied, the UE may suppress the UE-initiated session management request intended for at least one parameter of the DNN #A and/or the S-NSSAI #A.

In other words, the fourth congestion management in the present embodiment is control signal congestion management intended for parameters of the DNN and the S-NSSAI, and may be congestion management due to connectivity of the network slices selected based on the S-NSSAI to the DNN being congested. For example, the fourth congestion management may be congestion management to restrict all connections based on the S-NSSAI #A and may be congestion management to restrict connection to the DNN #A in all connectivity. That is, the fourth congestion management may be congestion management to restrict all connections to the DNN through network slices selected by the S-NSSAI #A, and may be congestion management to restrict connection to the DNN #A in all connectivity. Here, the connection to the DNN #A in all connectivity may be connection of the DNN #A in connectivity using all S-NSSAI available to the UE, and may be connection of the DNN #A through network slices to which the UE is connectable. Furthermore, the connection to the DNN #A in all connectivity may include connectivity to the DNN #A not through network slices.

Thus, the fourth congestion management using parameters of the DNN #A and the S-NSSAI #A may be congestion management simultaneously performing the first congestion management using parameters of the DNN #A and the second congestion management using parameters of the S-NSSAI #A.

The first behavior in the present embodiment is a behavior in which the UE stores slice information transmitted in the first PDU session establishment request message in association with the transmitted PDU session identification information. In the first behavior, the UE may store slice information transmitted in the first PDU session establishment request message or may store slice information received in a case that the first PDU session establishment request is rejected.

The second behavior in the present embodiment is a behavior in which the UE transmits a PDU session establishment request to connect to the same APN/DNN as the first PDU session establishment request by using other slice information different from the slice information specified in the first PDU session establishment. Specifically, the second behavior may be a behavior in which the UE transmits a PDU session establishment request to connect to the same APN/DNN as the first PDU session establishment request by using slice information different from the slice information specified in the first PDU session establishment in a case that the backoff timer value received from the network is zero or disabled. Alternatively, the second behavior may be a behavior in which, in a case that the first PDU session is rejected because the radio access of the specific PLMN to which the specified APN/DNN is connected is not supported, or in a case that the first PDU session is rejected for a temporary cause, the UE may transmit a PDU session establishment request to connect to the same APN/DNN as the APN/DNN included in the first PDU session establishment request by using slice information different from the slice information specified in the first PDU session establishment.

The third behavior in the present embodiment is a behavior in which the UE does not transmit a new PDU session establishment request with the same identification information until the first timer expires in a case that the PDU session establishment request is rejected. Specifically, the third behavior may be a behavior in which the UE does not transmit a new PDU session establishment request with the same identification information until the first timer expires in a case that the backoff timer value received from the network is not zero nor disabled. Here, the same identification information may mean whether the first identification information and/or the second identification information carried on the new PDU session establishment request is the same as the first identification information and/or the second identification information transmitted in the rejected PDU session establishment request.

Alternatively, the third behavior may be a behavior in which, in a case that another PLMN is selected, or in a case that another NW slice is selected, and in a case that a reject cause for a configuration failure of network operation is received, the UE does not transmit a new PDU session establishment request with the same identification information until the first timer expires in a case that the backoff timer received in a case that the first PDU session establishment request is rejected has been activated.

In particular, the PDU session that does not transmit a new PDU session establishment request in the third behavior may be a PDU session in which congestion management associated with the first timer is applied. More specifically, the third behavior may be a behavior that does not transmit a new PDU session establishment request for a PDU session, which is connectivity in accordance with the type of congestion management associated with the first timer, using the DNN and/or the S-NSSAI associated with the congestion management. Note that the process prohibited for the UE by the present behavior may be an initiation of a procedure for session management including a PDU session establishment request and/or transmission and/or reception of an SM message.

The fourth behavior in the present embodiment is a behavior in which the UE does not transmit a new PDU session establishment request that does not carry slice information and DNN/APN information until the first timer expires in a case that the PDU session establishment request is rejected. Specifically, the fourth behavior may be a behavior in which the UE does not transmit a new PDU session establishment request that does not carry slice information and DNN/APN information until the first timer expires in a case that the backoff timer received from the network is not zero nor disabled.

The fifth behavior in the present embodiment is a behavior in which the UE does not transmit a new PDU session establishment request with the same identification information in a case that the PDU session establishment request is rejected. Specifically, the fifth behavior may be a behavior in which the UE does not transmit a new PDU session establishment request with the same identification information in a case that the PDP types supported by the UE and the network are different and in a case that the UE is in the equivalent PLMN.

The sixth behavior in the present embodiment is a behavior in which the UE transmits a new PDU session establishment request as an initial procedure with the same identification information in a case that the PDU session establishment request is rejected. Specifically, the sixth behavior may be a behavior in which, in a case that the first PDU session establishment request is rejected because the PDN session context of interest is not present in the handover from non-3GPP access, the UE transmits a new PDU session establishment request as an initial procedure with the same identification information.

The seventh behavior in the present embodiment is a behavior in which the UE continues the received backoff timer in a case that the previous PDU session establishment request is rejected in a case that the UE selects another NW slice in the procedure for selecting a PLMN. Specifically, the seventh behavior may be a behavior in which, in a case that the UE selects a PLMN in a case that the first PDU session establishment request is rejected, and in a case that it is possible to specify a common NW slice with the NW slice specified in the first PDU session establishment request for the PLMN of the selection destination, the UE continues the backoff timer received in a case that the first PDU session establishment request is rejected.

The eighth behavior in the present embodiment is a behavior in which the UE configures a value notified from the network or a value configured to the UE in advance as the first timer value. Specifically, the eighth behavior may be a behavior in which the UE configures the backoff timer value received in the reject notification for the first PDU session establishment request as the first timer value, or may be a behavior in which the UE configures a value configured to or held by the UE in advance as the first timer value. Note that the UE may configure a value configured to or held by the UE in advance as the first timer value only in a case that the UE is served by the HPLMN or equivalent PLMN.

The ninth behavior in the present embodiment is a behavior in which the UE does not transmit a new PDU session establishment request until terminal power on/off or extraction and/or insertion of Universal Subscriber Identity Module (USIM) in a case that the PDU session establishment request is rejected. Specifically, the ninth behavior may be a behavior in which, in a case that the backoff timer received from the network is disabled, or in a case that the first PDU session reject causes are different for the PDP types between the UE and the network, the UE does not transmit a new PDU session establishment request until terminal power on/off or extraction and/or insertion of USIM. Alternatively, the ninth behavior may be a behavior in which, in a case that the first PDU session is rejected because the specified APN/DNN is not supported in the wireless of the connecting PLMN, and in a case that there is no information element of the backoff timer from the network, and there is no Re-attempt information, or in a case that a PDU session reconnection to the equivalent PLMN is allowed, the UE does not transmit a new PDU session establishment request until terminal power on/off or extraction and/or insertion of USIM in the connecting PLMN. Alternatively, the ninth behavior may be a behavior in which, in a case that the first PDU session is rejected because the specified APN/DNN is not supported in the wireless of the connecting PLMN, and in a case that there is no information element of the backoff timer from the network, and there is no Re-attempt information, or in a case that a PDU session reconnection to the equivalent PLMN is not allowed, the UE does not transmit a new PDU session establishment request until terminal power on/off or extraction and/or insertion of USIM in the connecting PLMN. Alternatively, the ninth behavior may be a behavior in which, in a case that the first PDU session is rejected because the specified APN/DNN is not supported in the wireless of the connecting PLMN, and in a case that the backoff timer from the network is not zero nor disabled, the UE does not transmit a new PDU session establishment request until terminal power on/off or extraction and/or insertion of USIM. Alternatively, the ninth behavior may be a behavior in which, in a case that the first PDU session is rejected because the specified APN/DNN is not supported in the wireless of the connecting PLMN, and in a case that the backoff timer from the network is disabled, the UE does not transmit a new PDU session establishment request until terminal power on/off or extraction and/or insertion of USIM.

The 10th behavior in the present embodiment is a behavior in which the UE transmits a new PDU session establishment request in a case that the PDU session establishment request is rejected. Specifically, the 10th behavior may be a behavior in which the UE transmits a new PDU session establishment request in a case that the backoff timer received from the network is zero, or in a case that the first PDU session establishment request is rejected for temporary causes and even there is no backoff timer information element itself to be notified from the network. Alternatively, the 10th behavior may be a behavior in which the UE transmits a new PDU session establishment request, in a case that another PLMN is selected or in a case that another NW slice is selected, and in a case that the first PDU session establishment request is rejected for temporary causes, and in a case that the backoff timer is not activated for the APN/DNN of interest in the selected PLMN, or in a case that the backoff timer received from the network is disabled. Alternatively, the 10th behavior may be a behavior in which the UE transmits a new PDU session establishment request, in a case that the first PDU session establishment request is rejected because the PDP types of the UE and the network are different, and in a case that Re-attempt information is not received or a PLMN that is not in the equivalent PLMN list is selected in a case that selecting a different PLMN, or in a case that the PDP type is changed or in a case of terminal power on/off or extraction and/or insertion of USIM. Alternatively, the 10th behavior may be a behavior in which the UE transmits a new PDU session establishment request, in a case that the first PDU session is rejected because the specified APN/DNN is not supported in the wireless of the connecting PLMN, and in a case that the backoff timer notified from the network is zero.

The 11th behavior in the present embodiment is a behavior in which the UE ignores the first timer and the Re-attempt information. Specifically, the 11th behavior may be a behavior in which the UE ignores the first timer and the Re-attempt information in a case that the first PDU session establishment request is rejected because there is no PDN session context of interest in the handover from non-3GPP access, or in a case that the first PDU session establishment is rejected because the number of bearers deployed in the PDN connection reaches a maximum number.

The 12th behavior in the present embodiment is a behavior in which the UE determines information for identifying multiple associated NW slices based on information for identifying one NW slice received in the reject notification for the first PDU session establishment request, and suppresses reconnection to the multiple associated NW slices based on the information for identifying one NW slice. Specifically, the 12th behavior may be a behavior in which the UE derives information for identifying another NW slice associated with information for identifying a NW slice notified in the first PDU session establishment request reject based on the network slice association rules. Note that the network slice association rules may be configured to the UE in advance or may be notified from the network in the reject notification of the PDU session establishment.

The 13th behavior in the present embodiment may be a behavior in which the UE manages a timer based on a priority management rule of backoff timer in a case that multiple different congestion managements are activated for one or multiple PDU session establishments by the same UE, and multiple timers are provided from the network. For example, a first PDU session establishment request for a combination of a DNN_1 and a slice_1 by the UE is subject to congestion management based on both DNN and slice information, and the UE receives a first timer #1. In addition, the UE makes a second PDU session establishment request for a combination of a DNN_1 and a slice_2, which is subject to congestion management based on only the DNN, and the UE receives a first timer #2. At this time, in the UE, the behavior of the PDU session re-establishment of the UE may be managed by the prioritized first timer #2, based on the priority management rules of the backoff timer. Specifically, the timer value generated by the prioritized congestion management may overwrite the value of the timer held by the UE.

The 14th behavior in the present embodiment may be a behavior that manages a timer for each session management instance (PDU session unit) in a case that multiple different congestion managements are applied to one or multiple PDU session establishments by the same UE and multiple timers are provided from the network. For example, in a case that the first PDU session establishment for a combination of a DNN #1 and a slice #1 by the UE is subject to congestion based on both DNN and slice information, the UE manages the backoff timer value of interest as a first timer #1. Thereafter, in a case that the UE has attempted to establish a PDU session for a combination of a DNN #1 and a slice #2 as a second PDU session, which is subject to congestion based on only the DNN, the UE manages the backoff timer value of interest as a first timer #2. At this time, the UE simultaneously manages multiple timers (here, the first timer #1 and the first timer #2). Specifically, the UE manages timers in session management instance/PDU session units. In addition, in a case that the UE receives multiple timers simultaneously in one session management procedure, the UE simultaneously manages the backoff timers of interest in congestion management units identified by the UE.

The 15th behavior in the present embodiment may be a behavior in which the UE_A 10 performs a first identification process for identifying which type of congestion management to apply in the first congestion management to the fourth congestion management, and perform a second identification process for identifying the DNN and/or the S-NSSAI associated with the congestion management to apply. Note that the first identification process may perform identification based on at least one or more pieces of identification information of the first identification information to the fourth identification information and/or at least one or more pieces of identification information of the 11th identification information to the 18th identification information. Similarly, the second identification process may perform identification based on at least one or more pieces of identification information of the first identification information to the fourth identification information and/or at least one or more pieces of identification information of the 11th identification information to the 18th identification information.

An example of the first identification process will be described below. In the first identification process, the type of congestion management to apply in a case that any one or two or more combinations of the following cases are met may be identified as the first congestion management.—In a case that at least the 15th identification information is a value corresponding to the first congestion management.— In a case that at least the 16th identification information is a value corresponding to the first congestion management.— In a case that at least the 14th identification information includes information indicating the first congestion management.—In a case that at least the 17th identification information includes only the DNN and does not include the S-NSSAI.—In a case that at least the 16th identification information is not received, in a case that the 16th identification information is information for identifying any identification information of the first congestion management and the second congestion management, and is information capable of configuring only a value corresponding to the second congestion management for the 16th identification information.—In a case that at least the 16th identification information is not received, in a case that the 16th identification information is information for identifying any identification information of the first congestion management and the fourth congestion management, and is information capable of configuring only a value corresponding to the fourth congestion management for the 16th identification information.—In a case that at least the 16th identification information is not received, in a case that the 16th identification information is information for identifying any identification information of the first congestion management, the second congestion management, and the fourth congestion management, and is information capable of configuring only a value corresponding to the second congestion management and a value corresponding to the fourth congestion management for the 16th identification information.

However, the present invention is not limited to the example described above, and the UE_A 10 may perform identification based on at least one or more pieces of identification information of the first identification information to the fourth identification information, and/or at least one piece of identification information of the 11th identification information to the 18th identification information, or a combination of two or more pieces of identification information.

In the first identification process, the type of congestion management to apply in a case that any one or two or more combinations of the following cases are met may be identified as the second congestion management.—In a case that at least the 15th identification information is a value corresponding to the second congestion management.—In a case that at least the 16th identification information is a value corresponding to the second congestion management.—In a case that at least the 14th identification information includes information indicating the second congestion management.—In a case that at least the 17th identification information includes only the S-NSSAI and does not include the DNN.—In a case that at least the 16th identification information is not received, in a case that the 16th identification information is information for identifying any identification information of the first congestion management and the second congestion management, and is information capable of configuring only a value corresponding to the first congestion management for the 16th identification information.—In a case that at least the 16th identification information is not received, in a case that the 16th identification information is information for identifying any identification information of the second congestion management and the third congestion management, and is information capable of configuring only a value corresponding to the third congestion management for the 16th identification information.— In a case that at least the 16th identification information is not received, in a case that the 16th identification information is information for identifying any identification information of the second congestion management, the third congestion management, and the fourth congestion management, and is information capable of configuring only a value corresponding to the third congestion management and a value corresponding to the fourth congestion management for the 16th identification information.

However, the present invention is not limited to the example described above, and the UE_A 10 may perform identification based on at least one or more pieces of identification information of the first identification information to the fourth identification information, and/or at least one piece of identification information of the 11th identification information to the 18th identification information, or a combination of two or more pieces of identification information.

In the first identification process, the type of congestion management to apply in a case that any one or two or more combinations of the following cases are met may be identified as the third congestion management.—In a case that at least the 15th identification information is a value corresponding to the third congestion management.—In a case that at least the 16th identification information is a value corresponding to the third congestion management.—In a case that at least the 14th identification information includes information indicating the third congestion management.— In a case that at least the 15th identification information is a value corresponding to multiple congestion managements including the third congestion management and not including the fourth congestion management, and in a case that the 17th identification information includes the S-NSSAI and the DNN.—In a case that at least the 16th identification information is not received, in a case that the 16th identification information is information for identifying any identification information of the third congestion management and the fourth congestion management, and is information capable of configuring only a value corresponding to the fourth congestion management for the 16th identification information.—In a case that at least the 16th identification information is not received, in a case that the 16th identification information is information for identifying any identification information of the second congestion management and the third congestion management, and is information capable of configuring only a value corresponding to the second congestion management for the 16th identification information.—In a case that at least the 16th identification information is not received, in a case that the 16th identification information is information for identifying any identification information of the second congestion management, the third congestion management, and the fourth congestion management, and is information capable of configuring only a value corresponding to the second congestion management and a value corresponding to the fourth congestion management for the 16th identification information.

However, the present invention is not limited to the example described above, and the UE_A 10 may perform identification based on at least one or more pieces of identification information of the first identification information to the fourth identification information, and/or at least one piece of identification information of the 11th identification information to the 18th identification information, or a combination of two or more pieces of identification information.

In the first identification process, the type of congestion management to apply in a case that any one or two or more combinations of the following cases are met may be identified as the fourth congestion management.—In a case that at least the 15th identification information is a value corresponding to the fourth congestion management.—In a case that at least the 16th identification information is a value corresponding to the fourth congestion management.—In a case that at least the 14th identification information includes information indicating the fourth congestion management.—In a case that at least the 15th identification information is a value corresponding to multiple congestion managements including the fourth congestion management and not including the third congestion management, and in a case that the 17th identification information includes the S-NSSAI and the DNN.—In a case that at least the 16th identification information is not received, in a case that the 16th identification information is information for identifying any identification information of the third congestion management and the fourth congestion management, and is information capable of configuring only a value corresponding to the third congestion management for the 16th identification information.—In a case that at least the 16th identification information is not received, in a case that the 16th identification information is information for identifying any identification information of the second congestion management and the fourth congestion management, and is information capable of configuring only a value corresponding to the second congestion management for the 16th identification information.—In a case that at least the 16th identification information is not received, in a case that the 16th identification information is information for identifying any identification information of the first congestion management and the fourth congestion management, and is information capable of configuring only a value corresponding to the first congestion management for the 16th identification information.—In a case that at least the 16th identification information is not received, in a case that the 16th identification information is information for identifying any identification information of the second congestion management, the third congestion management, and the fourth congestion management, and is information capable of configuring only a value corresponding to the second congestion management and a value corresponding to the third congestion management for the 16th identification information. —In a case that at least the 16th identification information is not received, in a case that the 16th identification information is information for identifying any identification information of the first congestion management, the second congestion management, and the fourth congestion management, and is information capable of configuring only a value corresponding to the first congestion management and a value corresponding to the second congestion management for the 16th identification information.

However, the present invention is not limited to the example described above, and the UE_A 10 may perform identification based on at least one or more pieces of identification information of the first identification information to the fourth identification information, and/or at least one piece of identification information of the 11th identification information to the 18th identification information, or a combination of two or more pieces of identification information, or the UE_A 10 may perform identification by using other ways.

As described above, the type of congestion management may be identified by the first identification process.

Next, an example of the second identification process will be described. Note that the second identification process may be a process for identifying the DNN and/or the S-NSSAI corresponding to the type of the congestion management identified by the first identification process.

More specifically, the DNN corresponding to the first congestion management, the third congestion management, and the fourth congestion management may be determined based on the 12th identification information. Additionally/alternatively, the DNN corresponding to the first congestion management, the third congestion management, and the fourth congestion management may be determined based on the 17th identification information.

Additionally/alternatively, the DNN corresponding to the first congestion management, the third congestion management, and the fourth congestion management may be determined based on the second identification information.

Accordingly, the DNN corresponding to the first congestion management, the third congestion management, and the fourth congestion management may be the DNN indicated by the 12th identification information. Additionally/alternatively, the DNN corresponding to the first congestion management, the third congestion management, and the fourth congestion management may be the DNN included in the 17th identification information.

Additionally/alternatively, the DNN corresponding to the first congestion management, the third congestion management, and the fourth congestion management may be the DNN indicated by the second identification information.

The S-NSSAI corresponding to the second congestion management, the third congestion management, and the fourth congestion management may be determined based on the 17th identification information. Additionally/alternatively, the DNN corresponding to the first congestion management, the third congestion management, and the fourth congestion management may be determined based on the first identification information.

Thus, the DNN corresponding to the first congestion management, the third congestion management, and the fourth congestion management may be the S-NSSAI indicated by the 17th identification information. Additionally/alternatively, the DNN corresponding to the first congestion management, the third congestion management, and the fourth congestion management may be the S-NSSAI included in the first identification information.

However, the present invention is not limited to the example described above, and the UE_A 10 may perform identification based on at least one or more pieces of identification information of the first identification information to the fourth identification information, and/or at least one piece of identification information of the 11th identification information to the 18th identification information, or a combination of two or more pieces of identification information, or the UE_A 10 may perform identification by using other ways.

Based on the above 15th behavior, the UE_A 10 may identify the congestion management which the core network_B 190 applies to the UE_A 10. In other words, the UE_A 10 may identify the corresponding type of congestion management and the corresponding S-NSSAI and/or DNN as congestion management to apply based on the 15th behavior. Note that the UE_A 10 may store and manage one or more pieces of identification information of the first identification information to the fourth identification information, and the 11th identification information to the 18th identification information in association with the congestion management to apply. Here, the third identification information, and/or the fourth identification information, and/or the 13th identification information may be stored and managed as information for identifying the congestion management to apply.

The 16th behavior in the present embodiment is a behavior in which the UE stops the first timer in a case that the NW-initiated session management procedure is performed while the first timer is activated.

Here, for example, the 16th behavior in the present embodiment may be a behavior in which, in a case that multiple first timers are activated, the UE determines a first timer to stop out of the multiple first timers activated based on the 21st identification information and stops the timer. Additionally/alternatively, the 16th behavior in the present embodiment may be a behavior in which the UE stops a first timer associated with congestion management identified by the 17th behavior. Note that in a case that there are multiple congestion managements identified by the 17th behavior, the timers associated with each congestion management may be stopped.

The 17th behavior in the present embodiment may be a behavior of the UE identifying congestion management to stop application in one or more congestion managements that the UE is applying, based on the reception of the control message transmitted by the core network. For example, the UE may identify congestion management to stop or change application based on the 21st identification information.

Specifically, as previously described, the UE may store the third identification information and/or the fourth identification information and/or the 13th identification information or the like in the fourth process as information for identifying congestion management, and identify congestion management in which identification information of these congestion managements and the 13th identification information included in the 21st identification information match each other as congestion management to stop application.

Additionally/alternatively, the UE may identify congestion management to stop application based on combinations of one or more of the 11th identification information to the 18th identification information included in the 21st identification information. Here, the identification method may be the same as the identification process in the 15th behavior described in the fourth process in the example of the PDU session establishment procedure described below. That is, the UE may identify the congestion management to stop in a similar manner to the method of identifying congestion management to apply.

Note that the UE may identify multiple congestion managements to stop application. Hereinafter, the congestion management identified by the foregoing method is referred to as a first congestion management, and a method for identifying a second congestion management which is different from the first congestion management will be described.

For example, the UE may identify congestion management that is associated with the same DNN as the DNN associated with the first congestion management as a second congestion management. Additionally/alternatively, the UE may identify congestion management associated with the same S-NSSAI as the S-NSSAI associated with the first congestion management as a second congestion management. Note that identifying multiple congestion managements to stop application may be configured to be perform only in a case that the first congestion management and/or the second congestion management is a specific type of congestion management.

Specifically, in a case that the first congestion management is any of the first congestion management to the fourth congestion management, the UE may identify the second congestion management. Additionally/alternatively, in identifying the second congestion management, in a case that the congestion management of search target is any of the first congestion management to the fourth congestion management, the UE may identify the second congestion management. Note that in which type the first congestion management and/or the second identification information can identify multiple congestion management may be configured in the core network and/or the UE in advance. Note that a specific type of congestion management for which identification is allowed need not be specified as one, but multiple types may be configured.

The first identification information in the present embodiment is information for identifying belonging to the first NW slice. In other words, the first identification information may be information indicating that the UE expects an establishment of a PDU session belonging to the first NW slice. Specifically, for example, the first identification information may be information for identifying the first NW slice. Note that the slice information may be identification information indicating a specific S-NSSAI. Note that the first identification information may be information for identifying a specific NW slice in the operator A network, or may be information for identifying the same NW slice in common in the operator B (other operators other than the operator A). Furthermore, the first identification information may be information for identifying a first NW slice configured from the HPLMN, may be information for identifying a first NW slice obtained from the AMF in a registration procedure, or may be information for identifying a first NW slice that is granted from the network. In addition, the first identification information may be information for identifying a first NW slice stored for each PLMN.

The second identification information in the present embodiment may be Data Network Name (DNN) and may be information used to identify a Data Network (DN).

The third identification information in the present embodiment may be a PDU session ID and may be information used to identify a PDU session.

The fourth identification information in the present embodiment may be a Procedure transaction identity (PTI), and may be information for identifying transmission and/or reception of a sequence of messages of a specific session management procedure as a single group, and further may be information used to identify and/or distinguish transmission and/or reception of other sequences of session management related messages.

The 11th identification information in the present embodiment may be information indicating that a request for a PDU session establishment or a request for a PDU session modification is rejected. Note that a request for a PDU session establishment or a request for a PDU session modification is a request made by the UE, and includes a DNN and/or a S-NSSAI. That is, the 11th identification information may be information indicating that the NW rejects an establishment request or a modification request for a PDU session corresponding to the DNN and/or S-NSSA.

The 11th identification information may be information indicating re-attempt (Re-attempt) information.

The NW may indicate congestion management to the UE by transmitting at least one piece of identification information of the 12th identification information to the 18th identification information along with the 11th identification information to the UE. In other words, the NW may notify the UE of congestion management corresponding to combinations of one or more pieces of identification information of the 12th identification information to the 18th identification information. Meanwhile, the UE may identify congestion management corresponding to combinations of one or more pieces of identification information of the 12th identification information to the 18th identification information, and perform processing based on the identified congestion management. Specifically, the UE may initiate the counting of the first timer associated with the identified congestion management. Note that the timer value of the first timer may be determined by using the 14th identification information, or a timer value configured in another manner such as using a value stored in the UE in advance may be configured, or a random value may be configured.

The 12th identification information in the present embodiment may be DNN, which may be a DNN that is not allowed by the network, or may be information indicating that the DNN identified by the second identification information is not allowed. In addition, the 12th identification information may be the same DNN as the second identification information.

The 13th identification information in the present embodiment may be a PDU Session ID and/or PTI, may be a PDU session ID and/or PTI not allowed by the network, or may be information indicating that the PDU session ID and/or PTI identified by the third identification information is not allowed. Furthermore, the PDU Session ID of the 13th identification information may be the same PDU session ID as the third identification information. Additionally, the PTI of the 13th identification information may be the same PTI as the fourth identification information.

Here, the 13th identification information may be used as information for identifying congestion management which the NW notifies to the UE based on the rejection of the PDU session establishment. In other words, the UE may store and manage the 13th identification information in association with congestion management performed based on the 15th behavior and may use the 13th identification information to identify the performed congestion management. Note that the information for identifying the congestion management may include a combination of one or more pieces of identification information of the 14th to the 18th identification information in addition to the 13th identification information.

The 14th identification information in the present embodiment may be information indicating a value of a backoff timer. In other words, the backoff timer may be a value indicating an effective period of congestion management which the NW notifies to the UE based on the rejection of the PDU session establishment. In other words, the UE may use the 14th identification information as the value of the timer in the 15th behavior performed with the reception of the 14th identification information. Furthermore, the 14th identification information may include information for identifying the type of congestion management in addition to the timer value. Specifically, information for identifying which congestion management of the first congestion management to the fourth congestion management may be included. For example, the information for identifying the congestion management type may be a timer name that identifies each congestion management, or may be a flag that identifies each congestion management. This is not a limitation, and each congestion management may be identified by other methods, such as identified by the location to be stored in the control message, and the like.

The 15th identification information in the present embodiment is information indicating one or more cause values indicating causes why the present procedure is rejected. In other words, the cause value may be information indicating congestion management applied to the present procedure by the NW or may be information indicating a cause value for rejecting the present procedure applied by the NW other than congestion management.

Note that the cause value may be information for identifying which congestion management of the first congestion management to the fourth congestion management the congestion management notified by the NW to the UE based on the rejection of the PDU session establishment indicates. In this case, in accordance with each congestion management of the first congestion management to the fourth congestion management, the NW may transmit a different value as a cause value to the UE. The UE may know the meaning of each value to be transmitted as a cause value in advance, and identify which congestion management in the first congestion management and the fourth congestion management, based on at least the 15th identification information, in the 15th behavior.

Alternatively, the cause value may be information for identifying whether the congestion management which the NW notifies to the UE based on the rejection of the PDU session establishment is the first congestion management or any congestion management of the second congestion management, the third congestion management, and the fourth congestion management. In this case, the NW may transmit different values to the UE as a cause value in accordance with the case of the first congestion management and the case of any congestion management of the second congestion management, the third congestion management, and the fourth congestion management. The UE may know the meaning of each value to be transmitted as a cause value in advance, and identify whether the first congestion management, or the second congestion management, the third congestion management, and the fourth congestion management, based at least on the 15th identification information, in the 15th behavior.

Alternatively, the cause value may be information for identifying whether the congestion management which the NW notifies to the UE based on the rejection of the PDU session establishment is the first congestion management, or the second congestion management, or any congestion management of the third congestion management and the fourth congestion management. In this case, the NW may transmit different values to the UE as a cause value in accordance with the case of the first congestion management, the case of the second congestion management, and the case of any congestion management of the third congestion management and the fourth congestion management. The UE may know the meaning of each value to be transmitted as a cause value in advance, and identify whether the first congestion management, or the second congestion management, or any congestion management of the third congestion management and the fourth congestion management, based at least on the 15th identification information, in the 15th behavior.

Alternatively, the cause value may be information for identifying whether the congestion management which the NW notifies to the UE based on the rejection of the PDU session establishment is the first congestion management or the second congestion management, or the third congestion management or the fourth congestion management. In this case, the NW may transmit different values to the UE as a cause value in accordance with the case of the first congestion management or the second congestion management, and the case of the third congestion management or the fourth congestion management. The UE may know the meaning of each value to be transmitted as a cause value in advance, and identify whether the first congestion management or the second congestion management, or the third congestion management or the fourth congestion management, based at least on the 15th identification information, in the 15th behavior.

Alternatively, the cause value may be information for identifying whether the congestion management which the NW notifies to the UE based on the rejection of the PDU session establishment is the second congestion management or the third congestion management, or the first congestion management or the fourth congestion management. In this case, the NW may transmit different values to the UE as a cause value in accordance with the case of the second congestion management or the third congestion management, and the case of the first congestion management or the fourth congestion management. The UE may know the meaning of each value to be transmitted as a cause value in advance, and identify whether the second congestion management or the third congestion management, or the first congestion management or the fourth congestion management, based at least on the 15th identification information, in the 15th behavior.

Alternatively, the cause value may be information for identifying whether the congestion management which the NW notifies to the UE based on the rejection of the PDU session establishment is the second congestion management or the fourth congestion management, or the first congestion management or the third congestion management. In this case, the NW may transmit different values to the UE as a cause value in accordance with the case of the second congestion management or the fourth congestion management, and the case of the first congestion management or the third congestion management. The UE may know the meaning of each value to be transmitted as a cause value in advance, and identify whether the second congestion management or the fourth congestion management, or the first congestion management or the third congestion management, based at least on the 15th identification information, in the 15th behavior.

Alternatively, the cause value may be information indicating that the NW performs congestion management for the UE based on the rejection of the PDU session establishment. In other words, the cause value may be information for causing the UE to perform any of the first congestion management to the fourth congestion management. In this case, the cause value may not be information that can identify certain congestion management.

Furthermore, as a more detailed example of the cause value for rejecting the present procedure applied by the NW other than the congestion managements described above, the cause value may be a cause value (Missing or unknown DNN) notified by the NW to the UE indicating that the external DN has rejected the present procedure for a cause that DNN information is not included in the present procedure or DNN is unknown. The cause value may be a cause value (Unknown PDU session type) notified by the NW to the UE indicating that the external DN has rejected the present procedure for a cause that the PDU session type of the present procedure cannot be identified or is not allowed. The cause value may be a cause value (User authentication or authorization failed) notified by the NW to the UE indicating that the external DN has rejected the present procedure for a cause of user authentication and authorization failure in the present procedure, expiration of authentication and authorization by the external DN, or expiration of authentication and authorization by the NW. The cause value may be a cause value (Request rejected, unspecified) notified by the NW to the UE indicating that services, operations, or resource reservation requests requested based on a non-specific cause are rejected. The cause value may be a cause value (Service option temporarily out of order) notified by the NW to the UE indicating that the NW cannot temporarily receive a service request from the UE. The cause value may be a cause value (PTI already in use) notified by the NW to the UE indicating that the PTI inserted by the UE is already in use. The cause value may be a cause value (Out of LADN service area) notified by the NW to the UE indicating that the UE is outside of the LADN service area. The cause value may be a cause value (PDU session type IPv4 only allowed) notified by the NW to the UE indicating to allow only the PDU session type IPv4. The cause value may be a cause value (PDU session type IPv6 only allowed) notified by the NW to the UE indicating to allow only the PDU session type IPv6. The cause value may be a cause value (PDU session does not exist) notified by the NW to the UE indicating that the NW does not hold the PDU session of interest in a case that the UE transfers the PDU session from non 3GPP access to 3GPP access or from EPS to 5GS. The cause value may be a cause value (Not supported SSC mode) notified by the NW to the UE indicating that the NW does not support the SSC mode requested by the UE. The cause value may be a cause value (Missing or unknown DNN in a slice) notified by the NW to the UE indicating that the external DN has rejected the present procedure for a cause that DNN information is not included in the present procedure through a specific slice or the DNN is unknown. The cause value may be a cause value (Maximum data rate per UE for user-plane integrity protection is too low) notified by the NW to the UE indicating that the UE does not satisfy the requirements of the maximum data transfer rate for user plane confidentiality guaranty required in services requested by the UE to the NW.

Note that in the present embodiment, in a case that the third congestion management is not performed, the meaning corresponding to the third congestion management in the cause value for the 15th identification information described above is unnecessary, and the cause value for the 15th identification information may be a value in which the process, the description, and the meaning of the third congestion management are omitted from the description above. In the present embodiment, in a case that the fourth congestion management is not performed, the meaning corresponding to the fourth congestion management in the cause value for the 15th identification information described above is unnecessary, and the cause value for the 15th identification information may be a value in which the process, the description, and the meaning of the fourth congestion management are omitted from the description above.

As a more detailed example, the 15th identification information for identifying the first congestion management may be a cause value indicating that resources are insufficient (Insufficient resources). The 15th identification information for identifying the second congestion management may be a cause value indicating that resources for a specific slice are insufficient (Insufficient resources for specific slice). The 15th identification information for identifying the third congestion management may be a cause value indicating that resources for a specific slice and DNN are insufficient (Insufficient resources for specific slice and DNN).

In this way, the 15th identification information may be information capable of identifying the type of congestion management, and further may be information indicating to which type of congestion management the backoff timer and/or the backoff timer value indicated by the 14th identification information corresponds.

Accordingly, the UE_A 10 may identify the type of congestion management based on the 15th identification information. Furthermore, based on the 15th identification information, the UE_A 10 may determine to which type of congestion management the backoff timer and/or the backoff timer value indicated by the 14th identification information corresponds.

The 16th identification information in the present embodiment is one or more pieces of indication information indicating that the present procedure has been rejected. In other words, the Indication information may be information indicating congestion management applied by the NW to the present procedure. The NW can indicate congestion management applied by the NW based on the 16th identification information.

For example, the Indication information may be information indicating which congestion management is restricted by the NW for the UE in two or more congestion managements in the first congestion management to the fourth congestion management. Accordingly, the NW may transmit a value corresponding to restriction management applied to the UE as Indication information. The UE may know the meaning of each value to be transmitted as Indication information in advance, and identify which congestion management in the first congestion management and the fourth congestion management, based on at least the 16th identification information, in the 15th behavior. Here, the two or more congestion managements in the first congestion management to the fourth congestion management are congestion managements that can be identified by using the Indication information, and the congestion managements to be identified may be all four congestion managements, may be the first congestion management and the second congestion management, may be the third congestion management and the fourth congestion management, may be the second congestion management to the fourth congestion management, or may be any other combination.

Note that the Indication information does not necessarily require respective values for all of the congestion managements to be identified. For example, in a case that values of Indication information are assigned to each of the congestion managements in association except for a congestion management A, a value of Indication information need not necessarily be configured for the congestion management A. In this case, the NW and the UE can identify that the first congestion management due to the indication information not being transmitted and/or received. Note that congestion management A may be any congestion management in the first congestion management to the fourth congestion management.

In a case of notifying the UE of congestion management based on the transmission of the PDU session establishment reject message, there may be a case that Identification is included or a case that Identification is not included depending on the type of congestion management of the first congestion management to the fourth congestion management. In other words, depending on the type of congestion management, the NW may use Identification information as information indicating congestion management, or may use other identification information as information indicating congestion management without using Identification information depending on the type of congestion management.

Note that in the present embodiment, in a case that the third congestion management is not performed, the meaning corresponding to the third congestion management in the Indication information for the 16th identification information described above is unnecessary, and the Indication information for the 16th identification information may be a value in which the process, the description, and the meaning of the third congestion management are omitted from the description above. In the present embodiment, in a case that the fourth congestion management is not performed, the meaning corresponding to the fourth congestion management in the Indication information for the 16th identification information described above is unnecessary, and the Indication information for the 16th identification information may be a value in which the process, the description, and the meaning of the fourth congestion management are omitted from the description above.

The 17th identification information in the present embodiment is one or more pieces of Value information indicating that the present procedure has been rejected. In other words, the Value Information may be information indicating congestion management applied by the NW to the present procedure. Note that the 17th identification information may be information including at least one of identification information for identifying one or more NW slices included in the 18th identification information and/or the 12th identification information.

The NW can indicate congestion management applied by the NW based on the 17th identification information. In other words, the NW may indicate which congestion management has been applied in the first congestion management to the fourth congestion management based on the 17th identification information. In addition, the NW may indicate the DNN and/or the S-NSSAI that is subject to congestion management to apply to the UE based on the transmission of the PDU session reject message, based on the 17th identification information. For example, in a case of DNN #1 only, the 17th identification information may indicate that the first congestion management intended for DNN #1 is being applied. In a case of S-NSSAI #1 only, the 17th identification information may indicate that the second congestion management intended for S-NSSAI #1 is being applied. In a case of being composed of DNN #1 and S-NSSAI #1, the 17th identification information may indicate that the third congestion management or the fourth congestion management intended for at least one of DNN #1 and/or S-NSSAI #1 is being applied.

Note that the 17th identification information need not necessarily be information that can identify which congestion management has been applied in the first congestion management to the fourth congestion management, but the 17th identification information may be information indicating the DNN and/or the S-NSSAI intended for congestion management identified by other methods, such as being identified based on other identification information.

The 18th identification information in the present embodiment may be information indicating that a request for establishment of a PDU session belonging to a first NW slice has been rejected, or may be information indicating that a request for establishment a PDU session belonging to the first NW slice or a PDU session modification is not allowed. Here, the first NW slice may be a NW slice determined by the first identification information, or may be a different NW slice. In addition, the 18th identification information may be information indicating that establishment of a PDU session belonging to the first NW slice is not allowed by the DN identified by the 12th identification information, or may be information indicating that establishment of a PDU session belonging to the first NW slice is not allowed in the PDU session identified by the 13th identification information. In addition, the 11th identification information may be information indicating that establishment of a PDU session belonging to the first slice is not allowed in a registration area and/or a tracking area to which the UE_A 10 is currently belonging, or may be information indicating that establishment of a PDU session belonging to the first NW slice is not allowed in an access network to which the UE_A 10 is connected. Further, the 11th identification information may be identification information for identifying one or more NW slices that determine the NW slices to which the rejected PDU session request belongs. Furthermore, the 18th identification information may be identification information indicating auxiliary information for the radio access system to select an appropriate MME in a case that the UE switches the connection destination to the EPS. Note that the auxiliary information may be information indicating DCN ID. In addition, the 18th identification information may be a network slice association rule that is a rule associating multiple pieces of slice information.

The 21st identification information in the present embodiment may be information that stops one or more first timers activated by the UE, or may be information indicating a first timer to stop among first timers activated by the UE. Specifically, the 21st identification information may be information indicating the 13th identification information stored in the UE in association with the first timer. Furthermore, the 21st identification information may be information indicating at least one of the 12th to 18th identification information stored in the UE in association with the first timer.

Furthermore, the 21st identification information may be information that changes the association between the first timer stored in the UE and information indicating at least one of the 13th to 17th identification information. For example, in a case that an NW-initiated session management request is received that includes the 21st identification information that allows connection to DNN #A in a case that the first timer that inhibits UE-initiated session management of a combination of DNN #A and DN #A is activated, the UE may change the association target of the timer being activated to only S-NSSAI #A, and may recognize that the UE-initiated session management request to DNN #A has been allowed. In other words, the 21st identification information may be information indicating that the congestion management being applied at the time of receiving the 21st identification information is changed to another congestion management among the first to fourth congestion managements.

Figure 9:
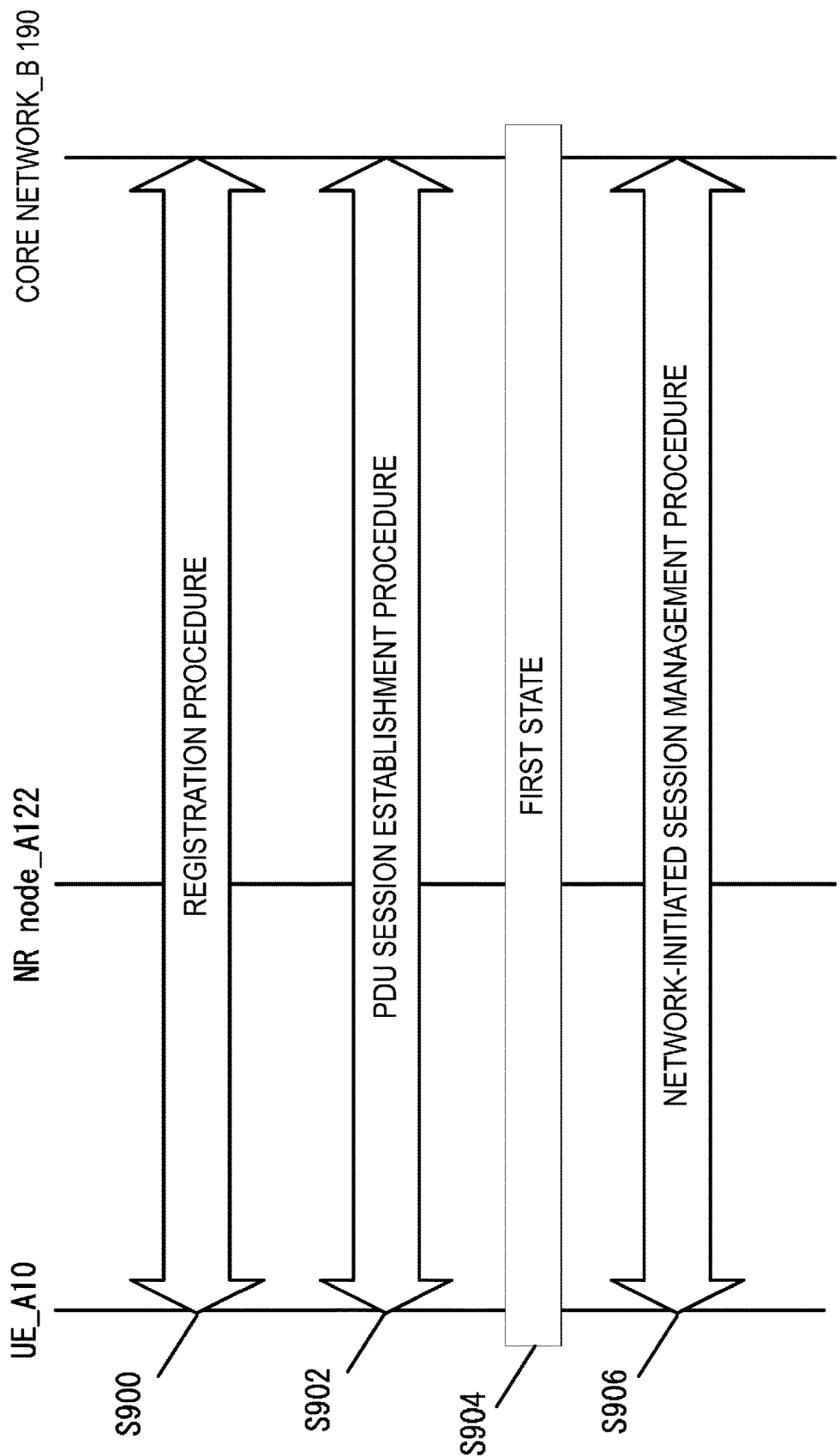
FIG. 9 is a diagram illustrating an initial procedure.

Next, the initial procedure according to the present embodiment will be described with reference to FIG. 9. Hereinafter, the initial procedure is also referred to as the present procedure, and the present procedure includes the Registration procedure, a UE-initiated PDU session establishment procedure, and a network-initiated session management procedure. Details of the registration procedure, the PDU session establishment procedure, and the network-initiated session management procedure will be described later.

Specifically, by performing the registration procedure by each apparatus (S900), the UE_A 10 transitions to a state registered with the network (RM-REGISTERED state). Next, by performing the PDU session establishment procedure by each apparatus (S902), the UE_A 10 establishes the PDU session with the DN_A 5 that provides the PDU connection service via the core network_B 190 and transitions to the first state between each apparatus (S904). Note that, although this PDU session is assumed to be established via the access network and the UPF_A 235, this PDU session is not limited thereto. That is, a UPF (UPF_C 239) different from the UPF_A 235 may be present between the UPF_A 235 and the access network. At this time, the PDU session is established via the access network, the UPF_C 239, and the UPF_A 235. Next, each apparatus in the first state may perform a network-initiated session management procedure at any timing (S906).

Note that each apparatus may exchange various pieces of capability information and/or various pieces of request information of each apparatus in the registration procedure and/or the PDU session establishment procedure and/or the network-initiated session management procedure. Note that in a case that each apparatus performs the exchange of various pieces of information and/or negotiation of various requests in the registration procedure, each apparatus may or may not perform the exchange of various pieces of information and/or the negotiation of various requests in the PDU session establishment procedure and/or the network-initiated session management procedure. In a case that each apparatus does not perform the exchange of various pieces of information and/or the negotiation of various requests in the registration procedure, each apparatus may perform the exchange of various pieces of information and/or the negotiation of various requests in the PDU session establishment procedure and/or the network-initiated session management procedure. Even in a case that each apparatus performs the exchange of various pieces of information and/or the negotiation of various requests in the registration procedure, each apparatus may perform the exchange of various pieces of information and/or the negotiation of various requests in the PDU session establishment procedure and/or the network-initiated session management procedure.

Each apparatus may perform the PDU session establishment procedure in the registration procedure or after the registration procedure is completed. In a case that the PDU session establishment procedure is performed in the registration procedure, the PDU session establishment request message included in the registration request message may be transmitted and/or received, and the PDU session establishment accept message included in the registration accept message may be transmitted and/or received, a PDU session establishment complete message included in a registration complete message may be transmitted and/or received, and a PDU session establishment reject message included in a registration reject message may be transmitted and/or received. In a case that the PDU session establishment procedure is performed in the registration procedure, each apparatus may establish a PDU session based on the completion of the registration procedure, or may transition to a state in which the PDU session is established between each apparatus.

Each apparatus involved in the present procedure may transmit and/or receive each control message described in the present procedure to transmit and/or receive one or more pieces of identification information included in each control message and store each piece of identification information transmitted and/or received as a context.

1.3.1. Overview of Registration Procedure

First, the following describes the overview of the registration procedure. The registration procedure is a procedure initiated by the UE_A 10 to perform registration in a network (the access network and/or the core network_B 190 and/or the DN_A 5). In a state in which the UE_A 10 is not registered in the network, the UE_A 10 can perform the present procedure at any timing such as the timing of turning on power. In other words, the UE_A 10 may initiate the present procedure at any timing in a non-registered state (RM-DEREGISTERED state). Each apparatus may transition to a registered state (RM-REGISTERED state), based on the completion of the registration procedure.

Furthermore, the present procedure may be a procedure for updating location registration information of the UE_A 10 in the network, for regularly notifying a state of the UE_A 10 from the UE_A 10 to the network, and/or for updating specific parameters related to the UE_A 10 in the network.

The UE_A 10 may initiate the present procedure in a case that the UE_A 10 applies mobility across TAs. In other words, the UE_A 10 may initiate the present procedure in a case that the UE_A 10 moves to a TA different from a TA indicated in a TA list that the UE_A 10 holds. Furthermore, the UE_A 10 may initiate the present procedure in a case that a running timer expires. Furthermore, the UE_A 10 may initiate the present procedure in a case that a context of each apparatus needs to be updated due to disconnection or nullification (also referred to as deactivation) of a PDU session. Furthermore, the UE_A 10 may initiate the present procedure in a case that a change occurs in capability information and/or preference concerning PDU session establishment of the UE_A 10. Furthermore, the UE_A 10 may initiate the present procedure regularly. Note that, besides the above, the UE_A 10 can perform the present procedure at any timing as long as a PDU session is established.

1.3.1.1. Example of Registration Procedure

An example procedure of performing the registration procedure will be described with reference to FIG. 10. In this section, the present procedure refers to the registration procedure. Each step of the present procedure will be described below.

First, the UE_A 10 transmits a registration request message to the AMF_A 240 via the NR node (also referred to as a gNB)_A 122 and/or the ng-eNB (S1000, S1002, and S1004) to initiate the registration procedure. The UE_A 10 may transmit a Session Management (SM) message (e.g., a PDU session establishment request message) included in the registration request message, or transmits the SM message (e.g., the PDU session establishment request message) along with the registration request message to initiate a procedure for session management (SM), such as a PDU session establishment procedure, during the registration procedure.

Specifically, the UE_A 10 transmits a Radio Resource Control (RRC) message including the registration request message to the NR node_A 122 and/or the ng-eNB (S1000). In a case that the RRC message including the registration request message is received, the NR node_A 122 and/or the ng-eNB retrieves the registration request message from the RRC message, and selects the AMF_A 240 as a NF or a common CP function to which the registration request message is routed (S1002). Here, the NR node_A 122 and/or the ng-eNB may select the AMF_A 240 based on information included in the RRC message. The NR node_A 122 and/or the ng-eNB transmits or transfers the registration request message to the selected AMF_A 240 (S1004).

Note that, the registration request message is a Non-Access-Stratum (NAS) message transmitted and/or received on the N1 interface. The RRC message is a control message transmitted and/or received between the UE_A 10 and the NR node_A 122 and/or the ng-eNB. The NAS message is processed in a NAS layer, the RRC message is processed in a RRC layer, and the NAS layer is a higher layer than the RRC layer.

In a case that there are multiple NSIs requesting registration, the UE_A 10 may transmit a registration request message for each of the NSIs, or may transmit multiple registration request messages included in one or more RRC messages. The above-described multiple registration request messages included in one or more RRC messages may be transmitted as one registration request message.

The AMF_A 240 receives the registration request message and/or the control message different from the registration request message and then performs first determination of whether condition is satisfied. The first determination of whether condition is satisfied is intended to determine whether or not the AMF_A 240 accepts a request of the UE_A 10. In the first determination of whether condition is satisfied, the AMF_A 240 determines whether the result of the first determination of whether condition is satisfied is true or false. The AMF_A 240 initiates the procedure of (A) in the present procedure in a case that the result of the first determination of whether condition is satisfied is true (in other words, in a case that the network accepts the request of the UE_A 10), and initiates the procedure of (B) in the present procedure in a case that the result of the first determination of whether condition is satisfied is false (in other words, in a case that the network does not accept the request of the UE_A 10).

As follows, steps in a case that the result of the first determination of whether condition is satisfied is true, in other words, each step of the procedure of (A) in the present procedure will be described. The AMF_A 240 performs a fourth determination of whether condition is satisfied, and initiates the procedure of (A) in the present procedure. The fourth determination of whether condition is satisfied is to determine whether the AMF_A 240 transmits and/or receives the SM message to and/or from the SMF_A 230. In other words, the fourth determination of whether condition is satisfied may be intended to determine whether or not the AMF_A 240 performs a PDU session establishment procedure in the present procedure. In a case that the result of the fourth determination of whether condition is satisfied is true (in other words, in a case that the AMF_A 240 performs the transmission and/or reception of the SM message to and/or from the SMF_A 230), the AMF_A 240 select the SMF_A 230 and transmits and/or receive the SM message to and/or from the selected SMF_A 230. In a case that the result of the fourth determination of whether condition is satisfied is false (in other words, in a case that the AMF_A 240 does not perform the transmission and/or reception of the SM message to and/or from the SMF_A 230), the AMF_A 240 skips such processes (S1006). Note that in a case that the AMF_A 240 receives an SM message indicating rejection from the SMF_A 230, the AMF_A 240 may terminate the procedure of (A) in the present procedure, and may initiate the procedure of (B) in the present procedure.

In addition, the AMF_A 240 transmits the Registration Accept message to the UE_A 10 via the NR node_A 122 based on the reception of the registration request message from the UE_A 10 and/or the completion of the transmission and/or reception of the SM message to and/or from the SMF_A 230 (S1008). For example, in a case that the result of the fourth determination of whether condition is satisfied is true, the AMF_A 240 may transmit the registration accept message based on the reception of the registration request message from the UE_A 10. In a case that the fourth determination of whether condition is satisfied is false, the AMF_A 240 may transmit the registration accept message based on the completion of the transmission and/or reception of the SM message to and/or from the SMF_A 230. Here, the registration accept message may be transmitted as a response message to the registration request message. The registration accept message is a NAS message transmitted and/or received on the N1 interface. For example, the AMF_A 240 may transmit the registration accept message as a control message of the N2 interface to the NR node_A 122, and the NR node_A 122 receiving this may transmit the message included in the RRC message to the UE_A 10.

Further, in a case that the result of the fourth determination of whether condition is satisfied is true, the AMF_A 240 may transmit the SM message (e.g., a PDU session establishment accept message) included in the registration accept message, or transmit the SM message (e.g., a PDU session establishment accept message) along with the registration accept message. This transmission method may be performed in a case that the SM message (e.g., the PDU session establishment request message) is included in the registration request message and the result of the fourth determination of whether condition is satisfied is true. The transmission method may be performed in a case that the registration request message and the SM message (e.g., the PDU session establishment request message) are included and the result of the fourth determination of whether condition is satisfied is true. The AMF_A 240 may indicate that the procedure for SM has been accepted by performing such a transmission method.

The UE_A 10 receives a registration accept message via the NR node_A 122 (S1008). The UE_A 10 receives the registration accept message and recognizes the contents of various types of identification information included in the registration accept message.

Next, the UE_A 10 transmits a Registration Complete message to the AMF_A 240 based on the reception of the registration accept message (S1010). Note that, in a case that the UE_A 10 has received an SM message such as a PDU session establishment accept message, the UE_A 10 may transmit the SM message such as the PDU session establishment complete message included in the registration complete message, or may include the SM message therein to indicate that the procedure for SM is completed. Here, the registration complete message may be transmitted as a response message to the registration accept message. The registration complete message is a NAS message transmitted and/or received on the N1 interface. For example, the UE_A 10 may transmit the registration complete message included in the RRC message to the NR node_A 122, and the NR node_A 122 receiving this may transmit the message as a control message of the N2 interface to the AMF_A 240.

The AMF_A 240 receives the registration complete message (S1010). In addition, each apparatus completes the procedure of (A) in the present procedure based on the transmission and/or reception of the registration accept message and/or the registration complete message.

Next, steps in a case that the first determination of whether condition is satisfied is false, in other words, each step of the procedure of (B) in the present procedure will be described. The AMF_A 240 transmits a Registration Reject message to the UE_A 10 via the NR node_A 122 (S1012) to initiate the procedure of (B) in the present procedure. Here, the registration reject message may be transmitted as a response message to the registration request message. The registration reject message is a NAS message transmitted and/or received on the N1 interface. For example, the AMF_A 240 may transmit the registration reject message as a control message of the N2 interface to the NR node_A 122, and the NR node_A 122 receiving this may transmit the message included in the RRC message to the UE_A 10. The registration reject message transmitted by the AMF_A 240 is not limited thereto as long as it is a message for rejecting the request of the UE_A 10.

Note that the procedure of (B) in the present procedure may be initiated in a case that the procedure of (A) in the present procedure is canceled. In the procedure of (A), in a case that the result of the fourth determination of whether condition is satisfied is true, the AMF_A 240 may transmit an SM message such as a PDU session establishment reject message indicating rejection in the registration reject message, or may include the SM message indicating rejection therein to indicate that the procedure for SM has been rejected. In that case, the UE_A 10 may further receive the SM message, such as the PDU session establishment reject message, that indicates rejection, or may recognize that the procedure for SM has been rejected.

Furthermore, the UE_A 10 may recognize that a request of the UE_A 10 has been rejected by receiving the registration reject message or not receiving the registration accept message. Each apparatus completes the procedure of (B) in the present procedure based on the transmission and/or reception of the registration reject message.

Each apparatus completes the present procedure (registration procedure), based on the completion of the procedure of (A) or (B) in the present procedure. Note that each apparatus may transition to a state in which the UE_A 10 is registered with the network (RM_REGISTERED state) based on the completion of the procedure of (A) in the present procedure, or may maintain a state in which the UE_A 10 is not registered with the network (RM_DEREGISTERED state) based on the completion of the procedure of (B) in the present procedure. Transition to each state of each apparatus may be performed based on completion of the present procedure, or may be performed based on an establishment of a PDU session.

Furthermore, each apparatus may perform processing based on identification information transmitted and/or received in the present procedure, based on completion of the present procedure.

The first determination of whether condition is satisfied may be performed based on identification information, and/or subscriber information, and/or an operator policy included in the registration request message. For example, the first determination of whether condition is satisfied may be true in a case that the network allows a request of the UE_A 10. The first determination of whether condition is satisfied may be false in a case that the network does not allow a request of the UE_A 10. Furthermore, the first determination of whether condition is satisfied may be true in a case that the network of a destination of registration of the UE_A 10 and/or an apparatus in the network supports a function requested by the UE_A 10, and may be false in a case that the network and/or the apparatus does not support the function. Furthermore, the first determination of whether condition is satisfied may be true in a case that it is determined that the network is congested, or may be false in a case that it is determined that the network is not congested. Note that conditions for determining whether the first determination of whether condition is satisfied is true or false may not be limited to the above-described conditions.

The fourth determination of whether condition is satisfied may also be performed based on whether AMF_A 240 has received an SM and may be performed based on whether a SM message is included in the registration request message. For example, the fourth determination of whether condition is satisfied may be true in a case that the AMF_A 240 has received the SM and/or the SM message is included in the registration request message, and may be false in a case that the AMF_A 240 has not received the SM and/or the SM message is not included in the registration request message. Note that conditions for determining whether the fourth determination of whether condition is satisfied is true or false may not be limited to the above-described conditions.

1.3.2. Overview of PDU Session Establishment Procedure

Next, an overview of the PDU session establishment procedure performed to establish a PDU session with the DN_A 5 will be described. The PDU session establishment procedure is also referred to as a present procedure below. The present procedure is a procedure for each apparatus to establish the PDU session. Note that each apparatus may perform the present procedure in a state in which the registration procedure is completed or during the registration procedure. In addition, each apparatus may initiate the present procedure in a registered state, or may initiate the present procedure at any timing after the registration procedure. Each apparatus may establish the PDU session, based on completion of the PDU session establishment procedure. Furthermore, each apparatus may perform the present procedure multiple times to establish multiple PDU sessions.

1.3.2.1. Example of PDU Session Establishment Procedure

Figure 11:
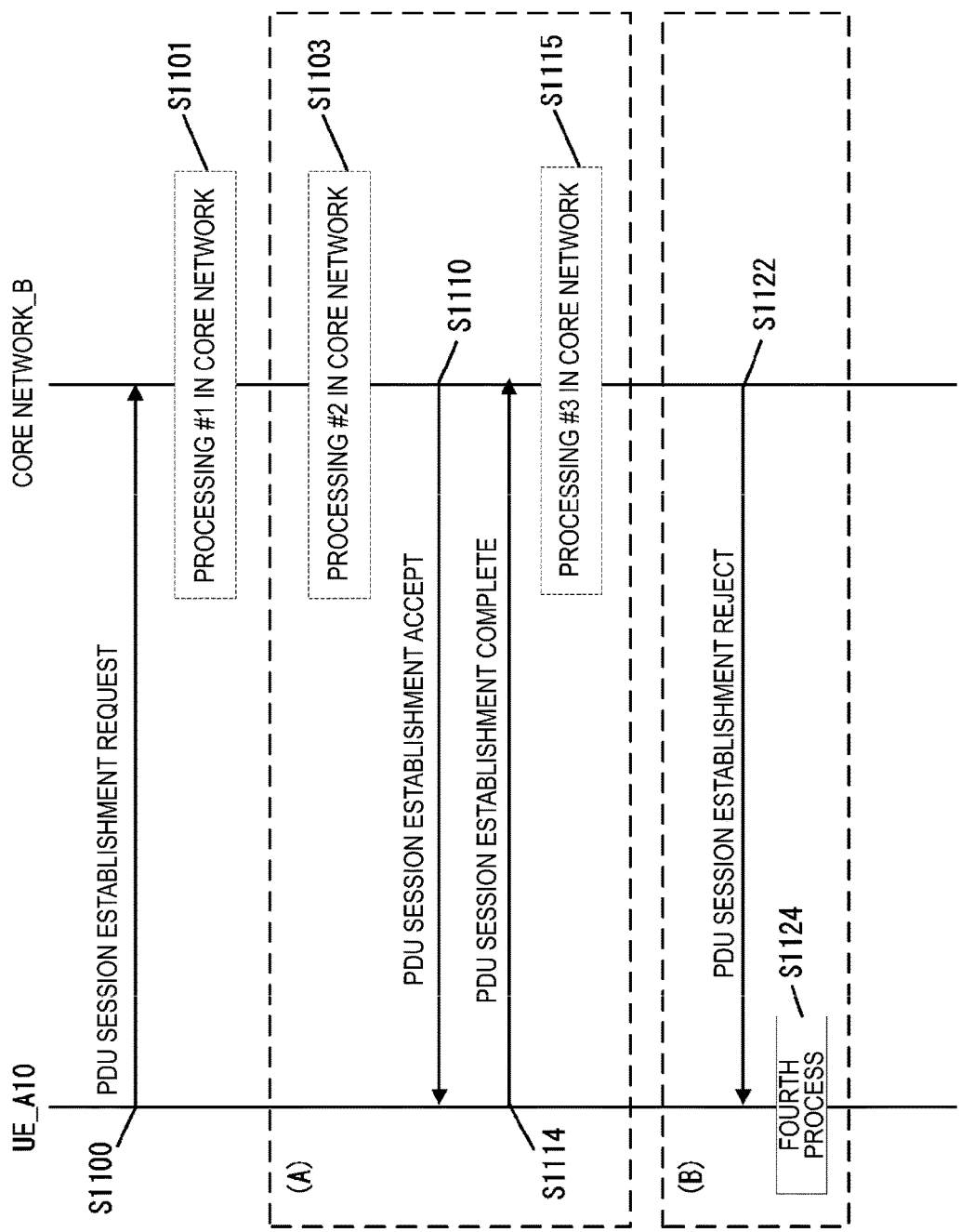
FIG. 11 is a diagram illustrating a PDU session establishment procedure.

With reference to FIG. 11, an example of a procedure of performing a PDU session establishment procedure will be described. Each step of the present procedure will be described below. First, the UE_A 10 transmits a PDU Session Establishment Request message to the core network_B via the access network_B (S1100), and initiates a PDU session establishment procedure.

Specifically, the UE_A 10 transmits the PDU session establishment request message to the AMF_A 240 in the core network_B 190 via the NR node_A 122 using the N1 interface (S1100). The AMF_A receives the PDU session establishment request message, and performs the third determination of whether condition is satisfied. The third determination of whether condition is satisfied is to determine whether the AMF_A accepts the request of the UE_A 10. In the third determination of whether condition is satisfied, the AMF_A determines whether the result of the fifth determination of whether condition is satisfied is true or false. In a case that the result of the third determination of whether condition is satisfied is true, the core network_B initiates the processing #1 in the core network (S1101), and in a case that the result of the third determination of whether condition is satisfied is false, the core network_B initiates the procedure of (B) in the present procedure. Note that steps in the case that the third determination of whether condition is satisfied is false will be described later. Here, the processing #1 in the core network may be the SMF selection by the AMF_A in the core network_B 190 and/or the transmission and/or reception of the PDU session establishment request message between the PDU_A and the SMF_A.

The core network_B 190 initiates the processing #1 in the core network. In the processing #1 in the core network, the AMF_A 240 may select the SMF_A 230 as an NF of a routing destination of the PDU session establishment request message and transmit or forward the PDU session establishment request message to the selected SMF_A 230 using the N11 interface. Here, the AMF_A 240 may select the SMF_A 230 of the routing destination based on the information included in the PDU session establishment request message. More specifically, the AMF_A 240 may select the SMF_A 230 of the routing destination based on each piece of identification information acquired based on the reception of the PDU session establishment request message, and/or the subscriber information, and/or the capability information of the network, and/or the operator policy, and/or the state of the network, and/or the context already held by the AMF_A 240.

The PDU session establishment request message may be a NAS message. The PDU session establishment request message only needs to be a message requesting the PDU session establishment and not limited to this.

Here, the UE_A 10 may include one or more pieces of identification information of the first identification information to the fourth identification information in a PDU session establishment request message, or may indicate a request of the UE_A 10, by including these pieces of identification information. Note that two or more pieces of identification information of these pieces of identification information may be configured as one or more pieces of identification information.

Furthermore, by transmitting the first identification information and/or the second identification information and/or the third identification information and/or the fourth identification information included in the PDU session establishment request message, the UE_A 10 may request establishment of a PDU session belonging to a network slice, may indicate a network slice to which the PDU session belongs which is requested by the UE_A 10, or may indicate a network slice to which the PDU session will belong.

More particularly, by transmitting the first identification information and the second identification information in association with each other, the UE_A 10 may request establishment of a PDU session belonging to a network slice in a PDU session established for a DN identified by the second identification information, may indicate a network slice to which the PDU session belongs which is requested by the UE_A 10, or may indicate a network slice to which the PDU session will belong.

Furthermore, the UE_A 10 may combine and transmit two or more pieces of identification information of the first to fourth identification information, thereby making a request in which the above-described matters are combined. Note that the matters indicated by the UE_A 10 transmitting each identification information may not be limited thereto.

Note that the UE_A 10 may determine which piece of identification information of the first identification information to the fourth identification information is to be included in the PDU session establishment request message, based on the capability information of the UE_A 10, and/or the policy such as the UE policy, and/or the preference of the UE_A 10, and/or the application (higher layer). Note that the determination performed by the UE_A 10 as to which piece of identification information is to be included in the PDU session establishment request message is not limited to the determination described above.

The SMF_A 230 in the core network_B 190 receives the PDU session establishment request message, and performs the third determination of whether condition is satisfied. The third determination of whether condition is satisfied is to determine whether the SMF_A 230 accepts the request of the UE_A 10. In the third determination of whether condition is satisfied, the SMF_A 230 determines whether the result of the third determination of whether condition is satisfied is true or false. In a case that the result of the third determination of whether condition is satisfied is true, the SMF_A 230 initiates the procedure of (A) in the present procedure, and in a case that the result of the third determination of whether condition is satisfied is false, the SMF_A 230 initiates the procedure of (B) in the present procedure. Note that steps in the case that the third determination of whether condition is satisfied is false will be described later.

As follows, steps in a case that the result of the third determination of whether condition is satisfied is true, in other words, each step of the procedure of (A) in the present procedure will be described. The SMF_A 230 selects the UPF_A 235 as the establishment destination of the PDU session, and performs the 11th determination of whether condition is satisfied.

Here, the 11th determination of whether condition is satisfied is intended to determine whether or not each apparatus performs processing #2 in the core network. Here, the processing #2 in the core network may include initiating and/or performing a PDU session establishment authentication procedure by each apparatus, and/or transmission and/or reception of a Session Establishment request message between the SMF_A and UPF_A in the core network_B 190, and/or transmission and/or reception of a Session Establishment response message, and the like (S1103). In the 11th determination of whether condition is satisfied, the SMF_A 230 determines whether the result of the 11th determination of whether condition is satisfied is true or false. The SMF_A 230 initiates the PDU session establishment authentication approval procedure in a case that the result of the 11th determination of whether condition is satisfied is true, or omits the PDU session establishment authentication approval procedure in a case that the result of the 11th determination of whether condition is satisfied is false. Note that the details of the PDU session establishment authentication approval procedure of the processing #2 in the core network will be described later.

Next, the SMF_A 230 transmits a session establishment request message to the selected UPF_A 235 based on the 11th determination of whether condition is satisfied and/or completion of the PDU session establishment authentication approval procedure, and initiates the procedure of (A) in the present procedure. Note that the SMF_A 230 may initiate the procedure of (B) in the present procedure without initiating the procedure of (A) in the present procedure, based on the completion of the PDU session establishment authentication approval procedure.

Here, the SMF_A 230 may select one or more UPFs_A 235 based on each piece of identification information acquired based on the reception of the PDU session establishment request message, and/or the capability information of the network, and/or the subscriber information, and/or the operator policy, and/or the state of the network, and/or the context already held by the SMF_A 230. Note that in a case that multiple UPFs_A 235 are selected, the SMF_A 230 may transmit the session establishment request message to each UPF_A 235.

The UPF_A 235 receives the session establishment request message and creates a context for the PDU session. In addition, the UPF_A 235 transmits the session establishment response message to the SMF_A 230 based on the reception of the session establishment request message and/or the creation of the context for the PDU session. Furthermore, the SMF_A 230 receives a session establishment response message. Note that the session establishment request message and the session establishment response message may be control messages transmitted and/or received on the N4 interface. Further, the session establishment response message may be a response message to the session establishment request message.

Further, the SMF_A 230 may assign an address to be assigned to the UE_A 10 based on the reception of the PDU session establishment request message and/or the selection of the UPF_A 235 and/or the reception of the session establishment response message. Note that the SMF_A 230 may assign the address to be assigned to the UE_A 10 during the PDU session establishment procedure, or may assign the address after the completion of the PDU session establishment procedure.

Specifically, in a case that the SMF_A 230 assigns the IPv4 address without using the DHCPv4, the SMF_A 230 may assign the address during the PDU session establishment procedure or may transmit the assigned address to the UE_A 10. In addition, in a case that the SMF_A 230 assigns the IPv4 address, and/or the IPv6 address, and/or the IPv6 prefix using the DHCPv4 or the DHCPv6 or Stateless Address Autoconfiguration (SLAAC), the SMF_A 230 may assign the address after the PDU session establishment procedure or may transmit the assigned address to the UE_A 10. Note that the address allocation performed by SMF_A 230 is not limited to these.

Furthermore, the SMF_A 230 may transmit the assigned address included in the PDU session establishment accept message to the UE_A 10, or may transmit the assigned address to the UE_A 10 after completion of the PDU session establishment procedure, based on the completion of the address allocation of the address to assign to the UE_A 10.

The SMF_A 230 transmits the PDU session establishment accept message to the UE_A 10 via the AMF_A 240, based on the reception of the PDU session establishment request message, and/or the selection of the UPF_A 235, and/or the reception of the session establishment response message, and/or the completion of the address assignment of the address to be assigned to the UE_A 10 (S1110).

Specifically, the SMF_A 230 transmits the PDU session establishment accept message to the AMF_A 240 using the N11 interface. The AMF_A 240 that has received the PDU session establishment accept message transmits the PDU session establishment accept message to the UE_A 10 using the N1 interface.

Note that in a case that the PDU session is PDN connection, the PDU session establishment accept message may be a PDN connectivity accept message. Furthermore, the PDU session establishment accept message may be a NAS message transmitted and/or received on the N11 interface and the N1 interface. The PDU session establishment accept message is not limited to the PDU session establishment accept message described above, and only needs to be a message indicating the acceptance of the establishment of the PDU session.

The UE_A 10 receives a PDU session establishment accept message from the SMF_A 230. The UE_A 10 receives the PDU session establishment accept message and recognizes the contents of various types of identification information included in the PDU session establishment accept message.

Next, the UE_A 10 transmits the PDU session establishment complete message to the SMF_A 230 via the AMF_A 240 based on the completion of the reception of the PDU session establishment accept message (S1114). Furthermore, the SMF_A 230 receives the PDU session establishment complete message, and performs the second determination of whether condition is satisfied.

Specifically, the UE_A 10 transmits the PDU session establishment complete message to the AMF_A 240 using the N1 interface. The AMF_A 240 that has received the PDU session establishment complete message transmits the PDU session establishment complete message to the SMF_A 230 using the N11 interface.

Note that in a case that the PDU session is PDN connection, the PDU session establishment complete message may be a PDN Connectivity complete message, or may be an Activate default EPS bearer context accept message. Furthermore, the PDU session establishment complete message may be a NAS message transmitted and/or received on the N1 interface and the N11 interface. The PDU session establishment complete message only needs to be a response message to the PDU session establishment accept message. However, the PDU session establishment complete message is not limited to this, and only needs to be a message indicating that the PDU session establishment procedure is completed.

The second determination of whether condition is satisfied is for the SMF_A 230 to determine a type of the message on the N4 interface to be transmitted and/or received. In a case that the result of the second determination of whether condition is satisfied is true, then the processing #3 in the core network may be initiated (S1115). Here, the processing #3 in the core network may include transmission and/or reception of a Session Modification request message, and/or transmission and/or reception of a Session Modification response message, and the like. The SMF_A 230 transmits a session modification request message to the UPF_A 235, and further receives the session modification accept message transmitted from the UPF_A 235 that has received the session modification request message. In a case that the second determination of whether condition is satisfied is false, the SMF_A 230 performs the processing #2 in the core network. In other words, the SMF_A transmits a session establishment request message to the UPF_A 235, and further receives the session modification accept message transmitted from the UPF_A 235 that has received the session establishment request message.

Each apparatus completes the procedure of (A) in the present procedure, based on the transmission and/or reception of the PDU session establishment complete message, and/or the transmission and/or reception of the session modification response message, and/or the transmission and/or reception of the session establishment response message, and/or the transmission and/or reception of the Router Advertisement (RA).

Next, steps in a case that the third determination of whether condition is satisfied is false, in other words, each step of the procedure of (B) in the present procedure will be described. The SMF_A 230 transmits the PDU session establishment reject message to the UE_A 10 via the AMF_A 240 (S1122), and initiates the procedure of (B) in the present procedure.

Specifically, the SMF_A 230 transmits the PDU session establishment reject message to the AMF_A 240 using the N11 interface, and the AMF_A 240 that has received the PDU session establishment request message transmits the PDU session establishment reject message to the UE_A 10 using the N1 interface.

Note that in a case that the PDU session is PDN connection, the PDU session establishment reject message may be a PDN Connectivity reject message. Furthermore, the PDU session establishment reject message may be a NAS message transmitted and/or received on the N11 interface and the N1 interface. The PDU session establishment reject message is not limited to the PDU session establishment reject message described above, and only needs to be a message indicating that the PDU session establishment has been rejected.

Here, the SMF_A 230 may include one or more pieces of identification information among the 11th identification information to the 18th identification information in the PDU session establishment reject message, or may indicate that the request of the UE_A 10 has been rejected by including these pieces of identification information. Note that two or more pieces of identification information of these pieces of identification information may be configured as one or more pieces of identification information.

Furthermore, by transmitting the 11th identification information and/or 12th identification information and/or 13th identification information and/or 14th identification information and/or 15th identification information and/or 16th identification information and/or 17th identification information and/or the 18th identification information included in the PDU session establishment reject message, the SMF_A 230 may indicate that a request for establishment of a PDU session belonging to a network slice has been rejected, or may indicate a network slice to which the PDU session is not allowed to belong.

More particularly, by transmitting the 18th identification information and the 12th identification information in association with each other, the SMF_A 230 may indicate that a request for establishment of a PDU session belonging to a network slice has been rejected in a PDU session established for a DN identified by the 12th identification information, or may indicate a network slice to which the PDU session is not allowed to belong.

Furthermore, by transmitting the 18th identification information included in the PDU session establishment reject message, the SMF_A 230 may indicate that a request for establishment of a PDU session belonging to a network slice has been rejected in a registration area and/or a tracking area to which the UE_A 10 is currently belonging, or may indicate a network slice to which the PDU session is not allowed to belong.

Furthermore, by transmitting the 18th identification information included in the PDU session establishment reject message, the SMF_A 230 may indicate that a request for establishment of a PDU session belonging to a network slice has been rejected in an access network to which the UE_A 10 is currently connecting, or may indicate a network slice to which the PDU session is not allowed to belong.

Furthermore, by transmitting the 11th identification information and/or the 14th identification information included in the PDU session establishment reject message, the SMF_A 230 may indicate the value of the first timer, or may indicate whether or not the same procedure as the present procedure should be performed again after the completion of the present procedure.

Furthermore, the SMF_A 230 may combine and transmit two or more pieces of identification information of the 11th to 18th identification information, thereby making a request in which the above-described matters are combined. Note that the matters indicated by the SMF_A 230 transmitting each identification information may not be limited thereto.

Note that the SMF_A 230 may determine which piece of identification information among the 11th identification information to the 18th identification information is to be included in the PDU session establishment reject message, based on the received identification information, and/or the capability information of the network, and/or the policy such as the operator policy, and/or the state of the network.

Furthermore, the 12th identification information may be information indicating the same DNN as the DNN indicated by the second identification information. Furthermore, the 13th identification information may be information indicating the same PDU session ID as the PDU session ID indicated by the third identification information. Further, the 18th identification information may be information transmitted in a case that the first identification information is received and/or in a case that the network slice indicated by the first identification information is not allowed by the network. Note that determination performed by the SMF_A 230 as to which piece of identification information is to be included in the PDU session establishment reject message is not limited to the determination described above.

As described above, the core network_B 190 transmits the PDU session reject message to notify the UE_A 10 of congestion management. Note that the core network_B 190 may notify applying congestion management to the UE_A 10, and/or indicating to perform congestion management on the UE_A 10, and/or information for identifying the type of congestion management to apply, and/or information for identifying the target for congestion management such as DNN and/or S-NSSAI corresponding to the congestion management to apply, and/or a value of the timer associated with the congestion management to apply.

Here, each of the above-described information may be information identified by one or more pieces of identification information of the 11th identification information to the 18th identification information.

The UE_A 10 may include one or more pieces of identification information in the 11th identification information to the 18th identification information in the PDU session establishment reject message received from the SMF_A 230.

Next, the UE_A 10 performs the fourth process based on the reception of the PDU session establishment reject message (S1124). The UE_A 10 may perform the fourth process based on the completion of the present procedure.

A first example of the fourth process will be described below.

Here, the fourth process may be a process in which the UE_A 10 recognizes a matter indicated by the SMF_A 230. Furthermore, the fourth process may be a process in which the UE_A 10 stores the received identification information as a context, or may be a process in which the UE_A 10 transfers the received identification information to a higher layer and/or a lower layer. Furthermore, the fourth process may be a process in which the UE_A 10 recognizes that the request for the present procedure has been rejected.

Furthermore, in a case that the UE_A 10 receives the 14th identification information and the 11th identification information, the fourth process may be a process in which the UE_A 10 configures the value indicated by the 14th identification information to the first timer value, or may be a process for initiating the first timer with the timer value configured. Furthermore, in a case that the UE_A 10 receives the 11th identification information, the fourth process may be a process for performing one or more behaviors of the first to 11th behaviors.

Further, in a case that the UE_A 10 receives the 18th identification information and the 11th identification information, the fourth process may be a process for performing the 12th behavior by the UE_A 10, based on information for identifying an NW slice included in the 18th identification information, and network slice association rules included in the 18th identification information or network slice association rules held by and configured to the UE_A 10 in advance.

Furthermore, in a case that the UE_A 10 receives multiple pieces of the 14th identification information and the 11th identification information, the fourth process may be a process in which the UE_A 10 performs the 13th behavior, based on multiple first timers included in each of the 14th identification information and priority management rules of the backoff timer held by the UE_A 10.

Furthermore, in a case that the UE_A 10 receives multiple pieces of the 14th identification information and the 11th identification information, the fourth process may be a process in which the UE_A 10 performs the 14th behavior based on multiple first timers included in each of the 14th identification information.

Here, the 12th to 15th behaviors may be congestion management initiated and performed by the UE_A 10 based on rules and/or policies within the UE_A 10. Specifically, for example, the UE_A 10 may include policies (UE policies) and/or rules, management functions of the policies and/or rules, policy enforcer to cause the UE_A 10 to operate based on the policies and/or rules, one or more applications, and session management instances (session managers) for managing one or more PDU sessions to establish or attempt to establish based on requests from each application in a storage unit and/or controller within the UE_A 10, and congestion management initiated by the UE_A 10 may be implemented by performing any of the 12th to 15th behaviors as the fourth process based on these. The policies and/or rules may include one or more of network slice association rules, and/or priority management rules for backoff timers, and/or Network Slice Selection Policy (NSSP), which may further be configured to the UE_A 10 in advance or received from the network. Here, the policy enforcer may be an NSSP enforcer. Here, the application may be a protocol of an application layer, and may establish or attempt to establish a PDU session based on a request from the protocol of the application layer. Here, the session management instance may be a software element dynamically generated in a PDU session unit. Here, S-NSSAI may be grouped as the internal processing of the UE_A 10, and a process based on the grouping of the S-NSSAI may be performed. Note that the internal configuration and processing of the UE_A 10 is not limited thereto, and each element may be implemented as software or may be performed as software processing within the UE_A 10.

Furthermore, the UE_A 10 may switch to the EPS in the fourth process, or based on the completion of the fourth process, and may initiate the position registration in the EPS based on the DCN ID included in the 18th identification information. Note that the switch of the UE_A 10 to the EPS may be based on the handover procedure, or may be a RAT switch initiated by the UE_A 10. In a case that the UE_A 10 receives the 18th identification information including the DCN ID, the UE_A 10 may perform the switch to the EPS during the fourth process or after the completion of the fourth process.

Furthermore, the fourth process may be a process in which the UE_A 10 initiates the present procedure again after a certain period of time, or may be a process in which request of the UE_A 10 transitions to a limited or restricted state.

Note that the UE_A 10 may transition to the first state along with the completion of the fourth process.

Next, a second example of the fourth process will be described.

Here, the fourth process may be a process in which the UE_A 10 recognizes a matter indicated by the SMF_A 230. Furthermore, the fourth process may be a process in which the UE_A 10 stores the received identification information as a context, or may be a process in which the UE_A 10 transfers the received identification information to a higher layer and/or a lower layer.

Furthermore, in the fourth process, processing may be performed to identify that congestion management is applied based on one or more pieces of identification information of the 11th identification information to the 18th identification information.

Furthermore, in the fourth process, processing may be performed to identify which type of congestion management to apply in the first congestion management the fourth congestion management based on one or more pieces of identification information of the 11th identification information to the 18th identification information, and processing may be performed to identify the DNN and/or the S-NSSAI associated with the congestion management to apply. More specifically, the present processing may be the process described in the 15th behavior.

Furthermore, in the fourth process, a value configured to the first timer indicated by the 14th identification information associated with the congestion management to apply may be identified and configured based on one or more pieces of identification information of the 11th identification information to the 18th identification information, and the counting of the first timer may be initiated. More specifically, the present processing may be the process described in the eighth behavior.

Furthermore, in the fourth process, one or more of the first behavior to the seventh behavior may be performed in accordance with the initiation or completion of any of the processes described above.

Furthermore, in the fourth process, one or more of the ninth behavior to the 15th behavior may be performed in accordance with the initiation or completion of any of the processes described above.

Note that the UE_A 10 may transition to the first state along with the completion of the fourth process.

While processing contents have been described with respect to the fourth process using the first example and the second example, the fourth process need not be limited to these processes. For example, the fourth process can be a process of a combination of a part of the multiple detailed processes described in the first example and a part of the multiple detailed processes described in the second example.

Furthermore, the UE_A 10 may recognize that a request of the UE_A 10 has been rejected by receiving the PDU session establishment reject message or not receiving the PDU session establishment accept message. Each apparatus completes the procedure of (B) in the present procedure, based on transmission and/or reception of the PDU session establishment reject message.

Each apparatus completes the present procedure, based on completion of the procedure of (A) or (B) in the present procedure. Note that each apparatus may transition to a state in which the PDU session is established, based on the completion of the procedure of (A) in the present procedure. Each apparatus may recognize that the present procedure has been rejected, may transition to a state in which the PDU session is not established, or may transition to a first state, based on the completion of the procedure of (B) in the present procedure.

Furthermore, each apparatus may perform processing based on identification information transmitted and/or received in the present procedure, based on completion of the present procedure. In other words, the UE_A 10 may perform the fourth process based on the completion of the present procedure, or may transition to the first state after the completion of the fourth process.

The third determination of whether condition is satisfied may be performed based on the identification information included in the PDU session establishment request message, and/or the subscriber information, and/or the operator policy. For example, the third determination of whether condition is satisfied may be true in a case that the network allows a request of the UE_A 10. The third determination of whether condition is satisfied may be false in a case that the network does not allow a request of the UE_A 10. Furthermore, in a case that the network as the connection destination of the UE_A 10 and/or the apparatus in the network supports the function requested by the UE_A 10, the third determination of whether condition is satisfied may be true, and in a case that the function is not supported, the third determination of whether condition is satisfied may be false. Furthermore, the third determination of whether condition is satisfied may be true in a case that it is determined that the network is congested, or may be false in a case that it is determined that the network is not congested. Note that conditions for determining whether the third determination of whether condition is satisfied is true or false may not be limited to the above-described conditions.

The second determination of whether condition is satisfied may be performed based on whether the session on the N4 interface for the PDU session has been established. For example, in a case that the session on the N4 interface for the PDU session has been established, the second determination of whether condition is satisfied may be true, and in a case that the session on the N4 interface for the PDU session is not established, the second determination of whether condition is satisfied may be false. Conditions for determining true or false of the second determination of whether condition is satisfied need not be limited to the above-described conditions.

The 11th determination of whether condition is satisfied may be performed based on the identification information included in the PDU session establishment request message, and/or the subscriber information, and/or the operator policy. For example, the 11th determination of whether condition is satisfied may be true in a case that the network allows authentication and/or approval by the DN_A 5 to be performed during the present procedure. The 11th determination of whether condition is satisfied may be false in a case that the network does not allow authentication and/or approval by the DN_A 5 to be performed during the present procedure. Furthermore, in a case that the network as the connection destination of the UE_A 10 and/or the apparatus in the network supports to perform authentication and/or approval by the DN_A 5 in the present procedure, the 11th determination of whether condition is satisfied may be true, and in a case that it is not supported, the 11th determination of whether condition is satisfied may be false. Further, the 11th determination of whether condition is satisfied may be true in a case that the 61st identification information is received, and may be false in a case that the 61st identification information is not received. In other words, the 11th determination of whether condition is satisfied may be true in a case that a container including information such as SM PDU DN Request Container and/or multiple pieces of information is received, and may be false in a case that a container is not received. Note that conditions for determining whether the 11th determination of whether condition is satisfied is true or false may not be limited to the above-described conditions.

By the transmission and/or reception of the PDU session reject message in the above-described procedures, the core network_B 190 can notify the UE_A 10 of congestion management to apply, and the UE_A 10 can apply congestion management indicated by the core network_B 190. Note that the core network B190 and the UE_A 10 may apply multiple congestion managements by performing the procedures and processes described in the present procedure multiple times. Note that each congestion management that is applied may be congestion management corresponding to different types of congestion management and/or different DNNs and/or congestion management corresponding to different S-NNSAIs and/or congestion management having different combinations of DNN and S-NSSAI.

1.3.3. Overview of Network-Initiated Session Management Procedure

Next, an overview of the network-initiated session management procedure will be described. Hereinafter, the network-initiated session management procedure is also referred to as the present procedure. The present procedure is a procedure for session management initiated and performed by the network for an established PDU session. Note that the present procedure may be performed at any timing after the registration procedure and/or the PDU session establishment procedure described above is completed and each apparatus has transitioned to the first state. Each apparatus may transmit and/or receive a message including identification information for stopping or changing congestion management in the present procedure, or may initiate a behavior based on new congestion management indicated by the network based on the completion of the present procedure.

In addition, the UE_A 10 may stop the application of congestion management identified based on control information transmitted and/or received by the present procedure. In other words, by initiating the present procedure and, in addition, transmitting control messages and control information of the present procedure to the UE_A 10, the core network_B 190 can notify the UE_A 10 to stop the application of congestion management that can be identified by using these pieces of control information.

Note that the present procedure may be a network-initiated PDU session modification procedure, and/or a network-initiated PDU session release procedure, or the like, or a network-initiated session management procedure not limited to these may be performed. Note that each apparatus may transmit and/or receive a PDU session modification message in a network-initiated PDU session modification procedure, or may transmit and/or receive a PDU session release message in a network-initiated PDU session release procedure.

1.3.3.1. First Network-initiated Session Management Procedure Example

Figure 12:
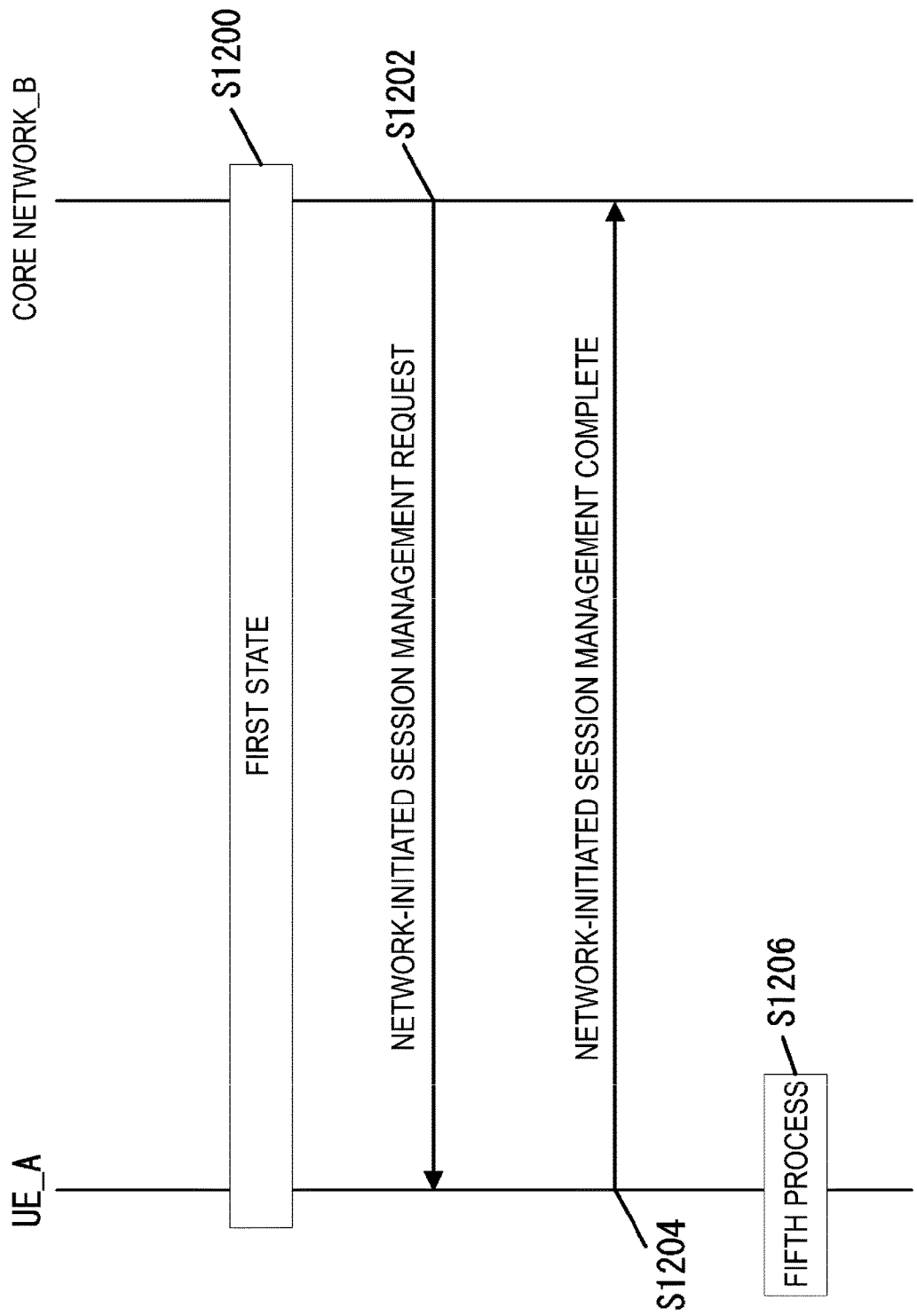
FIG. 12 is a diagram illustrating a network-initiated session management procedure.

An example of a network-initiated session management procedure will be described with reference to FIG. 12. In this section, the present procedure refers to a network-initiated session management procedure. Each step of the present procedure will be described below.

As described above, based on the completion of the registration procedure and/or the PDU session establishment procedure, each apparatus in the UE_A 10 and core network_B 190 that have transitioned to the first state (S1200) initiates a network-initiated session management procedure at any timing. Here, the apparatus in the core network_B 190 that initiates the present procedure may be the SMF_A and/or the AMF_A, and the UE_A may transmit and/or messages in the present procedure via the AMF_A and/or the access network_B.

Specifically, the apparatus in the core network_B 190 transmits a network-initiated session management request message to the UE_A (S1202). Here, the apparatus in the core network_B 190 may include the 21st identification information in the network-initiated session management request message, or may indicate the request of the core network_B 190 by including the identification information.

Next, the UE_A that has received the network-initiated session management request message transmits a network-initiated session management complete message (S1204). Furthermore, the UE_A may perform a fifth process (S1206) based on the 21st identification information received from the core network_B 190, and complete the present procedure. The UE_A 10 may perform the fifth process based on the completion of the present procedure.

Examples of the fifth process will be described below.

Here, the fifth process may be a process in which the UE_A 10 recognizes a matter indicated by the core network_B 190, or may be a process in which the UE_A 10 recognizes a request of the core network_B 190. Furthermore, the fifth process may be a process in which the UE_A 10 stores the received identification information as a context, or may be a process in which the UE_A 10 transfers the received identification information to a higher layer and/or a lower layer.

The message transmitted and/or received in the network-initiated session management request may be PDU SESSION MODIFICATION COMMAND, or may be PDU SESSION RELEASE COMMAND, but not limited to these.

Note that the UE_A 10 may perform, in the fifth process, the congestion management identification process applied by the UE_A 10 based on the received 21st identification information. Here, the congestion management identification process may be the 17th behavior.

Further, in a case that the UE_A 10 receives the 21st identification information, the fifth process may be the 16th behavior. Specifically, the fifth process may be, for example, a process that stops one or more timers running based on the fourth process described above.

In other words, the UE_A 10 that has received the 21st identification information identifies congestion management to stop or change indicated from the network by performing the 17th behavior, and subsequently stops or changes the identified congestion management by performing the 16th behavior.

Furthermore, each apparatus may perform processing based on identification information transmitted and/or received in the present procedure, based on completion of the present procedure. In other words, the UE_A 10 may perform the fifth process based on the completion of the present procedure, or may complete the procedure after the completion of the fifth process.

In the above-described procedure, by transmission and/or reception of the network-initiated session management request message, the core network_B 190 can indicate the UE_A 10 to stop or change the congestion management which the UE_A 10 is already applying. Furthermore, the UE_A 10 may stop or change the congestion management which the UE_A 10 is applying, based on the network-initiated session management request message. Here, in a case that the UE_A 10 is applying one or more congestion managements, the UE_A 10 may identify congestion management to stop or change based on the reception of the identification information included in the network-initiated session management request message from the core network_B 190. Note that each congestion management that is applied may be congestion management corresponding to different types of congestion management and/or different DNNs and/or congestion management corresponding to different S-NNSAIs and/or congestion management having different combinations of DNN and S-NSSAI.

1.3.3.2. Second Network-Initiated Session Management Procedure Example

In the first network-initiated session management procedure example described in section 1.3.3.1, an example is described in which congestion management is stopped in the procedure, regardless of which congestion management of the first to fourth congestion managements the congestion management applied to the UE_A 10 is.

The present invention is not limited to this, and the procedure described in the first network-initiated session management procedure example described in section 1.3.3.1 may be a procedure performed in accordance with congestion management. For example, the procedure may be a procedure performed for congestion managements classified into the first congestion management, the third congestion management, and the fourth congestion management among one or more congestion managements applied by the UE_A 10.

In other words, the UE_A 10 may stop congestion management corresponding to the first congestion management, the third congestion management, and the fourth congestion management in the fifth process.

In a case that the UE_10 receives a network-initiated session management request message for the second congestion management while performing the counting of the backoff timer associated with the second congestion management, the UE_A 10 may respond to the core network_B 190 without stopping the backoff timer associated with the second congestion management.

In other words, in a case that the UE_A 10 receives a network-initiated session management request message for congested S-NSSAI #A and any DNN while performing the counting of the backoff timer associated with the S-NSSAI #A, the UE_A 10 may respond to the core network_B 190 without stopping the backoff timer associated with the S-NSSAI #A.

Thus, for the second congestion management, in receiving the network-initiated session management request message, the UE_A 10 may transmit a response message to the network-initiated session management request message to the core network_B 190, but may continue congestion management. Accordingly, transmission of the UE-initiated session management request message restricted by the second congestion management may continue to be inhibited.

Here, as described above, the network-initiated session management request message in the present embodiment may be a PDU SESSION MODIFICATION COMMAND message in a network-initiated PDU session modification procedure, or may be a PDU SESSION RELEASE COMMAND message in a network-initiated PDU session release procedure.

Moreover, as previously mentioned, the network-initiated session management complete message responsive to the PDU session modification command message in the present embodiment may be a PDU session modification complete message (PDU SESSION MODIFICATION COMPLETE), and the network-initiated session management complete message responsive to the PDU session release command message in the present embodiment may be a PDU session release complete message (PDU SESSION RELEASE COMPLETE). In a case that the network-initiated session management request message is a PDU session modification command and/or PDU session release message, the UE_A 10 and the core network_B 190 may be configured to perform the further detailed processing described below in addition to the above-described processes.

For example, in a case that the core network_B 190 transmits the network-initiated session management request message including information indicating a reactivation request (Reactivation Required), the core network_B 190 may perform processing as follows. Note that the information indicating the reactivation request (Reactivation Required) is information indicating that activation is requested, and a specific example may be 5G session management cause value #39 (5GSM Cause #39).

Hereinafter, the first process and procedure example in a case of receiving the information indicating the reactivation request will be described.

In a case that the UE_A 10 receives a network-initiated session management request message including information indicating a reactivation request (Reactivation Required), rather than initiating the UE-initiated PDU session establishment procedure again immediately after completion of the network-initiated session management procedure, the UE_A 10 initiates the UE-initiated PDU session establishment procedure again after waiting for the congestion management to be released. Here, the UE-initiated PDU session establishment procedure may be a UE-initiated PDU session establishment procedure for a PDU session type, SSC mode, DNN, and S-NSSAI provided in the UE-initiated PDU establishment procedure in a case that a PDU session to be changed or released is established.

Note that waiting for the congestion management to be released may be performing after a timer associated with the second congestion management has expired. In other words, waiting for the congestion management to be released may be performing after completion of the counting of the timer associated with the second congestion management and/or after the timer value associated with the second congestion management becomes zero.

Furthermore, the UE_A 10 may include the following supplemental information in the network-initiated session management complete message.

The supplemental information may be information indicating awaiting expiration of the timer and/or information indicating the remaining timer value. Here, the timer may be a timer associated with the second congestion management. Awaiting expiration of the timer may be performing after expiration of the timer. In other words, waiting for the congestion management to be released may be performing after completion of the counting of the timer associated with the second congestion management and/or after the timer value associated with the second congestion management becomes zero.

Note that the core network B_190 may receive the network-initiated session management complete message including the supplemental information and recognize the remaining value of the timer. Furthermore, the core network_B 190 may recognize that the UE-initiated PDU session establishment procedure is initiated after the time of the value indicated by the remaining timer has elapsed.

Here, the remaining timer recognized by the core network_B 190 may be a value indicated by the received supplemental information, or may be a value in consideration with the offset of the transmission time of the UE_A 10 and the reception time of the core network_B 190 of the network-initiated session management complete message with respect to the value indicated by the received supplemental information.

Without limited to the first process and procedure example in a case that the information indicating the reactivation request is received, the second process and procedure example in a case that the information indicating the reactivation request is received may be performed as described below.

As described previously, for the second congestion management, in receiving the network-initiated session management request message, the UE_A 10 may transmit a response message to the network-initiated session management request message to the core network_B 190, but may continue congestion management. Accordingly, transmission of the UE-initiated session management request message restricted by the second congestion management may continue to be inhibited, but the UE_A 10 and/or the core network_B 190 may be configured to be allowed only to initiate the UE-initiated PDU session establishment procedure again.

In other words, in a case that the UE_A 10 receives a network-initiated session management request message including information indicating reactivation request (Reactivation Required), the UE_A 10 initiates the UE-initiated PDU session establishment procedure again after completing the network-initiated network-initiated session management procedure. Here, the UE-initiated PDU session establishment procedure may be a UE-initiated PDU session establishment procedure for a PDU session type, SSC mode, DNN, and S-NSSAI provided in the UE-initiated PDU establishment procedure in a case that a PDU session to be changed or released is established.

Note that while the UE_A 10 continues to apply congestion management, the UE_A 10 and the core network B190 may perform and complete the accepted procedure as an exception, but the UE_A 10 may be inhibited to initiate other UE-initiated session management procedures inhibited by the second congestion management.

Without being limited to the first and second process and procedure examples in a case that the information indicating the reactivation request is received, the third process and procedure example in a case that the information indicating the reactivation request is received may be performed as described below.

As described previously, for the second congestion management, in receiving the network-initiated session management request message, the UE_A 10 transmits a response message to the network-initiated session management request message to the core network_B 190. Furthermore, in a case that the UE_A 10 receives the network-initiated session management request message including information indicating the reactivation request (Reactivation Required), the UE_A 10 may stop the application of the second congestion management.

In other words, the UE_A 10 may continue the congestion management in a case that the network-initiated session management request message does not include information indicating a reactivation request (Reactivation Required). In this case, transmission of the UE-initiated session management request message restricted by the second congestion management may continue to be inhibited.

Accordingly, in a case that the UE_A 10 receives a network-initiated session management request message including information indicating reactivation request (Reactivation Required), the UE_A 10 initiates the UE-initiated PDU session establishment procedure again after completing the network-initiated network-initiated session management procedure. Here, the UE-initiated PDU session establishment procedure may be a UE-initiated PDU session establishment procedure for a PDU session type, SSC mode, DNN, and S-NSSAI provided in the UE-initiated PDU establishment procedure in a case that a PDU session to be changed or released is established.

Without being limited to the first, second, and third process and procedure examples in a case that the information indicating the reactivation request is received, the information indicating the reactivation request may be configured not to be transmitted by the core network_B 190 as described below.

More specifically, in a case that the core network_B 190 transmits a network-initiated session management request message to the UE_A 10 applying congestion management, the core network_B 190 may be configured to be inhibited to include information indicating a reactivation request (Reactivation Required).

Alternatively, in a case that the core network_B 190 transmits a network-initiated session management request message to the UE_A 10 applying second congestion management, the core network_B 190 may be configured to be inhibited to include information indicating a reactivation request (Reactivation Required).

Although the processing and procedure of the UE_A 10 and the core network B190 have been described above, the processing of the core network_B 190 described in this section may be, more specifically, a process performed by a control apparatus such as the SMF_A 230 and/or the AMF_A 240, which is an apparatus within the core network_B 190. Thus, the core network B190 transmitting and/or receiving control messages may be a control apparatus such as the SMF_A 230 and/or AMF_A 240, which is an apparatus in the core network_B 190, transmitting and/or receiving control messages.

Furthermore, not only in this section, in the expression used in the description of the present embodiment, releasing application of congestion management or stopping congestion management may include a process for stopping a backoff timer associated with congestion management, and continuing application of congestion management or continuing congestion management may include continuing counting the backoff timer associated with congestion management.

In the first, second, and third process and procedure examples in a case that the information indicating the reactivation request is received described in this section, the network-initiated session management request message and/or network-initiated session management procedure have been described as being performed by the UE_A 10 for congested S-NSSAI #A and any DNN.

In other words, the congested S-NSSAI #A and any DNN may be the S-NSSAI #A and any DNN associated with the PDU session intended for the network-initiated session management request message and/or the network-initiated session management procedure in this section.

Note that the UE_A 10 and the core network_B 190 may perform an anchor relocation procedure in the SSC mode 2, which includes the procedure in this section, and switch to the anchor of the PDU session or to a PDU session of a different anchor to continue communication. Here, the anchor relocation procedure in the SSC mode 2 is a procedure initiated by the core network_B 190, and a procedure involved in transmission of the PDU session release command performed in this procedure may be any procedure described in this section.

The UE_A 10 and the core network_B 190 may perform an anchor relocation procedure in the SSC mode 3, which includes the procedure in this section, and switch to the anchor of the PDU session or to a PDU session of a different anchor to continue communication. Here, the anchor relocation procedure in the SSC mode 3 is a procedure initiated by the core network_B 190, and a procedure involved in transmission of the PDU session modification command performed in this procedure may be any procedure described in this section.

Next, a process in a case that the UE moves with PLMN changes in a state in which congestion management is being applied will be described.

Here, a process in a case that the UE_A 10 changes the PLMN, in a state in which the first congestion management is particularly being applied will be described. Here, the first congestion management and the processing restricted in a case that the first congestion management is applied may be as described above.

Again, the first congestion management may be a DNN based congestion management. For example, the first congestion management may be congestion management to apply to the UE_A 10 by the NW based on a message rejecting a UE-initiated session management request, in a case that the NW receives the UE-initiated session management request using DNN #A from the UE_A 10, and congestion for a specific DNN, for example, DNN #A is detected in the NW. In this case, in the application of the first congestion management, the UE_A 10 may be configured to start counting the backoff timer corresponding to the first congestion management received from the NW and not to transmit the UE-initiated session management request using the DNN #A until the backoff timer expires. Note that the use of DNN may be to include DNN information in a UE-initiated session management request such as a PDU session establishment request message.

Here, for description, such first congestion management is represented as a "first congestion management for a specific DNN".

In the first congestion management, even in a case that the UE-initiated session management request does not include DNN information, the default DNN may be selected initiated by the NW for the congestion management target. In other words, the first congestion management may be congestion management to apply to the UE_A 10 by the NW based on a message rejecting a UE-initiated session management request, in a case that the NW receives the UE-initiated session management request not using DNN information from the UE_A 10, and congestion for default DNN is detected in the NW. In this case, in the application of the first congestion management, the UE_A 10 may be configured to start counting the backoff timer corresponding to the first congestion management received from the NW and not to transmit the UE-initiated session management request not using the DNN until the backoff timer expires. Note that not using DNN may be not to include DNN information in a UE-initiated session management request such as a PDU session establishment request message.

Here, for description, the first congestion management for the default DNN is expressed as "congestion management for No DNN" to distinguish from the first congestion management for a specific DNN because the first congestion management for the default DNN is applied based on a UE-initiated session management request not using DNN information. Furthermore, a UE-initiated session management request such as a PDU session establishment request message not using DNN is expressed as a UE-initiated session management request using No DNN. For example, a PDU session establishment request message using No DNN is a PDU session establishment request message not using DNN.

In a case that the UE_A 10 performs the counting of the backoff timer associated with the first congestion management for a specific DNN in the modification of the PLMN, or in a case that the backoff timer associated with the first congestion management for a specific DNN is deactivated, the UE_A 10 may be configured to be able to transmit a PDU session establishment request message using this specific DNN in the new PLMN. Accordingly, based on this configuration, the UE_10 may transmit a PDU session establishment request message using this specific DNN.

Here, the UE_A 10 may not stop the counting backoff timer and may continue counting until the timer expires. Alternatively, the UE_A 10 may continue to hold the deactivated backoff timer in the deactivated state.

Thus, the first congestion management for a specific DNN may be associated with the PLMN.

For example, in a case that the first congestion management for a specific DNN is applied, the UE associates a backoff timer with a PLMN and a specific DNN to start counting, and in a case that the backoff timer is not zero or deactivated, the UE does not perform a PDU session establishment using the specific DNN associated with the backoff timer in the PLMN associated with the backoff timer. In a case that the backoff timer is deactivated, until the terminal is turned off or the USIM is retrieved, the UE does not perform a PDU session establishment using the specific DNN associated with the backoff timer in the PLMN associated with the backoff timer. In the case that the backoff timer is zero, the UE may perform a PDU session establishment using the specific DNN associated with the backoff timer in the PLMN associated with the backoff timer.

In other words, in a case that the UE_A 10 performs the counting of the backoff timer associated with the first congestion management for a specific DNN and a PLMN before modification in the modification of the PLMN, or in a case that the backoff timer associated with the first congestion management for the specific DNN and the PLMN before modification is deactivated, or further in a case that the UE_A 10 does not perform the counting of the backoff timer associated with the first congestion management for the specific DNN and the PLMN after modification, and in a case that the backoff timer associated with the first congestion management for the specific DNN and the PLMN after modification is not deactivated, the UE_A 10 may be configured to be able to transmit a PDU session establishment request message using this specific DNN in the new PLMN. Furthermore, based on this configuration, the UE_10 may transmit a PDU session establishment request message using this specific DNN.

In a case that the UE_A 10 performs the counting of the backoff timer associated with the first congestion management for No DNN in the modification of the PLMN, or in a case that the backoff timer associated with the first congestion management for No DNN is deactivated, the UE_A 10 may be configured to be able to transmit a PDU session establishment request message not using DNN in the new PLMN. Accordingly, based on this configuration, the UE_10 may transmit a PDU session establishment request message using this specific DNN.

Here, the UE_A 10 may not stop the counting backoff timer and may continue counting until the timer expires. Alternatively, the UE_A 10 may continue to hold the deactivated backoff timer in the deactivated state.

As described above, the first congestion management for No DNN may be associated with the PLMN. In other words, in a case that the UE_A 10 performs the counting of the backoff timer of the first congestion management for No DNN associated with the PLMN before modification in the modification of the PLMN, or in a case that the backoff timer of the first congestion management for No DNN associated with the PLMN before modification is deactivated, or further in a case that the UE_A 10 does not perform the counting of the backoff timer of the first congestion management for No DNN associated with the PLMN after modification, and the backoff timer of the first congestion management for No DNN associated with the PLMN is not deactivated, the UE_A 10 may be configured to be able to transmit a PDU session establishment request message without using DNN in the new PLMN. Furthermore, based on this configuration, the UE_10 may transmit a PDU session establishment request message not using DNN.

As described above, the UE_A 10 may perform similar processing regardless of whether the first congestion management is for a specific DNN or No DNN.

That is, in a case that the UE_A 10 performs the counting of the backoff timer of the first congestion management associated with the PLMN before modification in the modification of the PLMN, or in a case that the backoff timer of the first congestion management associated with the PLMN before modification is deactivated, or further in a case that the UE_A 10 does not perform the counting of the backoff timer of the first congestion management associated with the PLMN after modification, and the backoff timer of the first congestion management associated with the PLMN after modification is not deactivated, the UE_A 10 is configured to be able to transmit a PDU session establishment request message using a specific DNN and/or a PDU session establishment request message not using DNN, which was restricted by congestion management associated with the PLMN before modification, in the new PLMN.

Alternatively, the UE_A 10 may perform different processing depending on whether the first congestion management is for a specific DNN or for No DNN.

In a case that the UE_A 10 performs the counting of the backoff timer associated with the first congestion management for a specific DNN in the modification of the PLMN, or in a case that the backoff timer associated with the first congestion management for a specific DNN is deactivated, the UE_A 10 may be configured not to transmit a PDU session establishment request message using this specific DNN in the new PLMN. Accordingly, based on this configuration, the UE_10 may be restricted for transmission of a PDU session establishment request message using this specific DNN.

Here, the UE_A 10 may not stop the counting backoff timer and may continue counting until the timer expires. Alternatively, the UE_A 10 may continue to hold the deactivated backoff timer in the deactivated state.

Thus, the first congestion management for a specific DNN may also be applied in different PLMNs.

Meanwhile, in a case that the UE_A 10 performs the counting of the backoff timer associated with the first congestion management for No DNN in the modification of the PLMN, or in a case that the backoff timer associated with the first congestion management for No DNN is deactivated, the UE_A 10 may be configured to be able to transmit a PDU session establishment request message not using DNN in the new PLMN. Accordingly, based on this configuration, the UE_10 may transmit a PDU session establishment request message using this specific DNN.

Here, the UE_A 10 may not stop the counting backoff timer and may continue counting until the timer expires. Alternatively, the UE_A 10 may continue to hold the deactivated backoff timer in the deactivated state.

As described above, the first congestion management for No DNN may be associated with the PLMN.

For example, in a case that the first congestion management for No DNN is applied, the UE associates a backoff timer with a PLMN and No DNN to start counting, and in a case that the backoff timer is not zero or deactivated, the UE does not perform a PDU session establishment using No DNN associated with the backoff timer in the PLMN associated with the backoff timer. In a case that the backoff timer is deactivated, until the terminal is turned off or the USIM is retrieved, the UE does not perform a PDU session establishment using the No DNN associated with the backoff timer in the PLMN associated with the backoff timer. In the case that the backoff timer is zero, the UE may perform a PDU session establishment using the No DNN associated with the backoff timer in the PLMN associated with the backoff timer.

In other words, in a case that the UE_A 10 performs the counting of the backoff timer of the first congestion management for No DNN associated with the PLMN before modification in the modification of the PLMN, or in a case that the backoff timer of the first congestion management for No DNN associated with the PLMN before modification is deactivated, or further in a case that the UE_A 10 does not perform the counting of the backoff timer of the first congestion management for No DNN associated with the PLMN after modification, and the backoff timer of the first congestion management for No DNN associated with the PLMN is not deactivated, the UE_A 10 may be configured to be able to transmit a PDU session establishment request message without using DNN in the new PLMN. Furthermore, based on this configuration, the UE_10 may transmit a PDU session establishment request message not using DNN.

Here, as a process associated with the modification to the PLMN described above, whether a same process is performed or different processes are performed regardless of whether the first congestion management is for a specific DNN or No DNN may be configured based on information configured to the UE_A 10 in advance, but may be determined depending on whether the second PLMN after the modification is an equivalent PLMN for the first PLMN before the modification. For example, in a case that the second PLMN after the modification is not an equivalent PLMN for the first PLMN before the modification, a same process may be applied. In a case that the second PLMN after the modification is an equivalent PLMN for the first PLMN before the modification, different processes may be performed.

Note that in the present embodiment, the backoff timer being deactivated may be the backoff timer and/or the congestion management associated with the backoff timer having transitioned to the deactivated state. Note that in a case that the UE_A 10 receives a timer value indicating deactivation, the UE_A 10 may deactivate the backoff timer and/or the congestion management associated with the backoff timer.

Here, the backoff timer and/or the congestion management associated with the backoff timer to be deactivated may be associated with the first to fourth congestion management types. The congestion management type with which the backoff timer and/or the congestion management associated with the backoff timer is associated may be similarly determined and recognized in a case of receiving the backoff timer value.

More specifically, the UE_A 10 may receive the 14th identification information indicating to deactivate the backoff timer and/or the congestion management associated with the backoff timer, and the 15th identification information from the NW, and may deactivate the backoff timer for the congestion management of the type indicated by the 15th identification information.

In a state in which the backoff timer and/or congestion management is deactivated, the application of congestion management may continue until the terminal is powered off or the USIM is retrieved. Further, the processing restricted at this time may be the same as the processing restricted in a case that the counting of the backoff timer is performed in accordance with the type of each congestion management.

Although processing of the UE_A 10 and NW associated with the modification of the PLMN described above has been described for the first congestion management and/or the backoff timer for the first congestion management, similar processing may be performed for the second congestion management, the third congestion management, and the fourth congestion management. However, PDU session establishment request messages to which transmission is restricted or allowed may be messages in accordance with each type. In other words, congestion management and/or a backoff timer associated with congestion management may be associated with the PLMN regardless of the type of congestion management. Alternatively, any congestion management and/or a backoff timer associated with congestion management may be configured to be associated with the PLMN. Thus, for the first congestion management, the second congestion management, and the third congestion management, congestion management and/or a backoff timer associated with congestion management may be configured to be associated with the PLMN. Alternatively, for the first congestion management, the second congestion management, and the third congestion management for the No DNN, congestion management and/or a backoff timer associated with congestion management may be configured to be associated with the PLMN, and for the first congestion management for a specific DNN, congestion management and/or a backoff timer associated with congestion management may not correspond to the PLMN. Note that the processing in a case that each congestion management is associated with the PLMN and/or the processing related to the backoff timer corresponding to each congestion management may be processing in which the first congestion management is replaced with each type of the second to fourth congestion managements in the description of the processing for the first congestion management associated with the PLMN previously described and/or the processing related to the backoff timer corresponding to the first congestion management associated with the PLMN previously described. The processing in a case that each congestion management is not associated with the PLMN and/or the processing related to the backoff timer corresponding to each congestion management may be processing in which the first congestion management is replaced with each type of the second to fourth congestion managements in the description of the processing for the first congestion management not associated with the PLMN previously described and/or the processing related to the backoff timer corresponding to the first congestion management not associated with the PLMN previously described. However, as mentioned above, PDU session establishment request messages to which transmission is restricted or allowed may be messages in accordance with each type.

In the description in the present embodiment, an expression that the NW transmits to the UE_A 10 may mean that the AMF or the SMF transmits to the UE_A 10, and an expression that the UE_A 10 transmits to the NW may mean that the UE_A 10 transmits to the AMF or the SMF. Furthermore, an expression that the NW receives from the UE_A 10 may mean that the AMF or the SMF receives from the UE_A 10, and an expression that the UE_A 10 receives from the NW may mean that the UE_A 10 receives from the AMF or the SMF.

2. EACH EMBODIMENT

Each embodiment of the present invention will be described below.

2.1. First Embodiment

A first embodiment of the present invention will be described with reference to FIG. 10 and FIG. 11. The first embodiment is also referred to as the present embodiment below. The present embodiment is not limited to the description of the fourth process example above, but the following processes may be performed in the fourth process.

Figure 10:
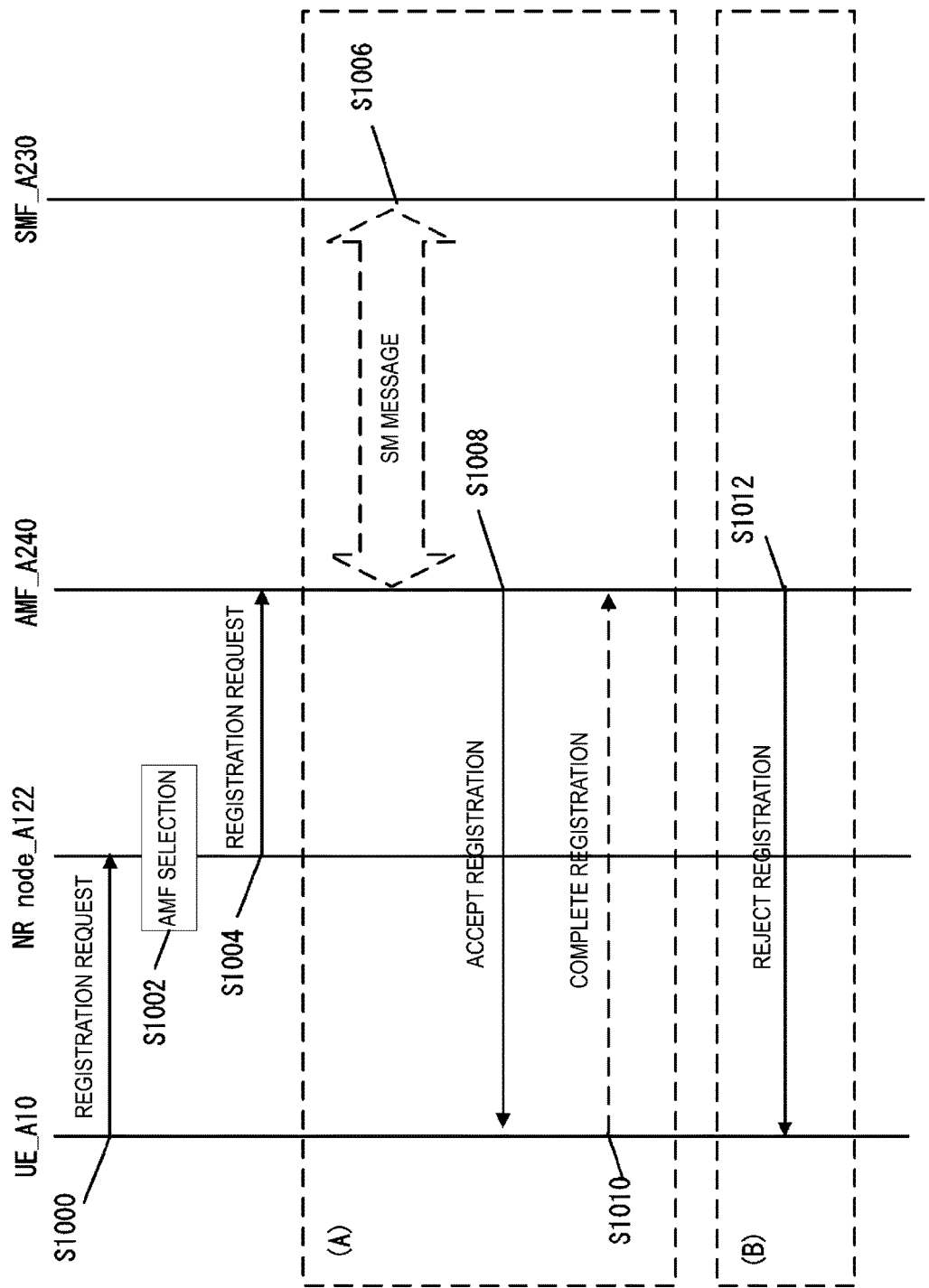
FIG. 10 is a diagram illustrating a registration procedure.

The present embodiment relates primarily to the behaviors of the registration procedure illustrated in FIG. 10 and/or the PDU session establishment registration procedure described in FIG. 11. Furthermore, the present embodiment relates to a case in which, in the PDU session establishment procedure illustrated in FIG. 11, the 15th identification information and/or the 14th identification information and/or the 11th identification information are included in the PDU session establishment reject message (S1122) received by the UE.

Note that in the present embodiment, the 15th identification information is information indicating one or more cause values for which the present procedure notified by the NW to the UE is rejected, for causes other than application of congestion management. The 14th identification information is information indicating a value of a backoff timer. The 11th identification information is information indicating re-attempt (Re-attempt) information. The backoff timer may use the first timer used in the third congestion management described above in the present embodiment, but is not limited to this as long as the timer is a timer of the present mobile communication system that the UE can recognize. Note that, in order to distinguish between the first timer and the backoff timer previously described, the time is expressed as an SM backoff timer. In a case that DNN information is not included in the PDU session establishment procedure, it is expressed as "no DNN" in order to distinguish from control signal management in the case that DNN information is included. In the same manner, in a case that S-NSSAI information is not included in the PDU session establishment procedure, it is expressed as "no S-NSSAI" in order to distinguish from control signal management in the case that S-NSSAI information is included.

The fourth process may be performed (S1124) in accordance with the contents of the 11th identification information and/or the 14th identification information and/or the 15th identification information included in the PDU session establishment reject message received by the UE_A.

The SMF_A 230 or the AMF_A 240 may transmit the PDU session establishment reject message (S1122) to the UE_A 10 including the SM backoff timer indicated by the 14th identification information, in a case that the reject cause value indicated by the 15th identification information is other than Insufficient resources and/or Insufficient resources for specific slice and DNN and/or Insufficient resources for specific slice.

At this time, in a case that the reject cause value indicated by the 15th identification information is other than Insufficient resources and/or Insufficient resources for specific slice and DNN and/or Insufficient resources for specific slice and/or user authentication or authorization failed, and/or out of LADN service area, and/or PDU session type IPv4 only allowed, and/or PDU session type IPv6 only allowed, and/or PDU session does not exist, the UE_A 10 may perform the fourth process based on the received SM backoff timer value.

Specifically, as a fourth process example in the present embodiment, in a case that the SM backoff timer value is not zero nor disabled, the UE_A 10 may perform a first procedure example described below.

The UE_A 10 may initiate an SM backoff timer for PLMN and/or DNN and/or S-NSSAI, may initiate an SM backoff timer for PLMN and/or no DNN and/or S-NSSAI, may initiate an SM backoff timer for PLMN and/or DNN and/or no S-NSSAI, or may initiate an SM backoff timer for PLMN and/or no DNN and/or no S-NSSAI.

Furthermore, the UE_A 10 may suppress transmission of the PDU session establishment request message (1011) based on the value of the SM backoff timer described above.

Specifically, the UE_A 10 may suppress reconnection using another PDU session establishment request message intended for the DNN and S-NSSAI parameters transmitted in the PDU session establishment request message (1011), until the SM backoff timer for the PLMN and/or DNN and/or S-NSSAI expires, or until terminal power on/off or extraction and/or insertion of Universal Subscriber Identity Module (USIM).

The UE_A 10 may suppress reconnection using another PDU session establishment request message intended for the no DNN and S-NSSAI parameters transmitted in the PDU session establishment request message (1011), until the SM backoff timer for the PLMN and/or no DNN and/or S-NSSAI expires, or until terminal power on/off or extraction and/or insertion of Universal Subscriber Identity Module (USIM).

The UE_A 10 may suppress reconnection using another PDU session establishment request message intended for the DNN and no S-NSSAI parameters transmitted in the PDU session establishment request message (1011), until the SM backoff timer for the PLMN and/or DNN and/or no S-NSSAI expires, or until terminal power on/off or extraction and/or insertion of Universal Subscriber Identity Module (USIM).

The UE_A 10 may suppress reconnection using another PDU session establishment request message intended for the no DNN and no S-NSSAI parameters transmitted in the PDU session establishment request message (1011), until the SM backoff timer for the PLMN and/or no DNN and/or no S-NSSAI expires, or until terminal power on/off or extraction and/or insertion of Universal Subscriber Identity Module (USIM).

Furthermore, as a fourth process example in the present embodiment, in a case that the SM backoff timer value is disabled, the UE_A 10 may perform a second procedure example different from the first example procedure.

The UE_A 10 may suppress reconnection using another PDU session establishment request message intended for the DNN and S-NSSAI parameters transmitted in the PDU session establishment request message (1011), until terminal power on/off or extraction and/or insertion of Universal Subscriber Identity Module (USIM).

The UE_A 10 may suppress reconnection using another PDU session establishment request message intended for the no DNN and S-NSSAI parameters transmitted in the PDU session establishment request message (1011), until terminal power on/off or extraction and/or insertion of Universal Subscriber Identity Module (USIM).

The UE_A 10 may suppress reconnection using another PDU session establishment request message intended for the DNN and no S-NSSAI parameters transmitted in the PDU session establishment request message (1011), until terminal power on/off or extraction and/or insertion of Universal Subscriber Identity Module (USIM).

Alternatively, the UE_A 10 may suppress reconnection using another PDU session establishment request message intended for the no DNN and no S-NSSAI parameters transmitted in the PDU session establishment request message (1011), until terminal power on/off or extraction and/or insertion of Universal Subscriber Identity Module (USIM).

Furthermore, as a fourth process example in the present embodiment, in a case that the SM backoff timer value is zero, the UE_A 10 may perform a third procedure example different from the first to second example procedures.

The UE_A 10 may stop an SM backoff timer in a case that the SM backoff timer associated with the DNN and the S-NSSAI transmitted in the PDU session establishment request message (1011) is activated, and may transmit another PDU session establishment request message by using the DNN and the S-NSSAI transmitted in the PDU session establishment request message (1011).

The UE_A 10 may stop an SM backoff timer in a case that the SM backoff timer associated with the no DNN and the S-NSSAI transmitted in the PDU session establishment request message (1011) is activated, and may transmit another PDU session establishment request message by using the no DNN and the S-NSSAI transmitted in the PDU session establishment request message (1011).

The UE_A 10 may stop an SM backoff timer in a case that the SM backoff timer associated with the DNN and the no S-NSSAI transmitted in the PDU session establishment request message (1011) is activated, and may transmit another PDU session establishment request message by using the DNN and the no S-NSSAI transmitted in the PDU session establishment request message (1011).

The UE_A 10 may stop an SM backoff timer in a case that the SM backoff timer associated with the no DNN and the no S-NSSAI transmitted in the PDU session establishment request message (1011) is activated, and may transmit another PDU session establishment request message by using the no DNN and the no S-NSSAI transmitted in the PDU session establishment request message (1011).

Note that the UE_A 10 does not stop the activated SM backoff timer in a case of changing the PLMN or changing from the N1 mode to the S1 mode. This is because, for example, in a case of returning from the PLMN change destination to the original PLMN in the PLMN change, the control signal management applied in the original PLMN is continuously applied by the backoff timer activated by the original PLMN continuing to be activated.

Furthermore, as a fourth process example in the present embodiment, the UE_A 10 may perform a fourth procedure example in a case that the PLMN change is performed while the SM backoff timer activated before the PLMN change is activated. Here, the PLMN before the PLMN change is referred to as the original PLMN.

In a case that the SM backoff timer intended for the S-NSSAI and DNN activated in the original PLMN is not activated in the PLMN change destination, the UE_A 10 may transmit a PDU session establishment request message by using the same S-NSSAI and DNN as the S-NSSAI and DNN associated with the SM backoff timer activated in the original PLMN.

In a case that the SM backoff timer intended for the S-NSSAI and no DNN activated in the original PLMN is not activated in the PLMN change destination, the UE_A 10 may transmit a PDU session establishment request message by using the same S-NSSAI and no DNN as the S-NSSAI and no DNN associated with the SM backoff timer activated in the original PLMN.

In a case that the SM backoff timer intended for the no S-NSSAI and DNN activated in the original PLMN is not activated in the PLMN change destination, the UE_A 10 may transmit a PDU session establishment request message by using the same no S-NSSAI and DNN as the no S-NSSAI and DNN associated with the SM backoff timer activated in the original PLMN.

In a case that the SM backoff timer intended for the no S-NSSAI and no DNN activated in the original PLMN is not activated in the PLMN change destination, the UE_A 10 may transmit a PDU session establishment request message by using the same no S-NSSAI and no DNN as the no S-NSSAI and no DNN associated with the SM backoff timer activated in the original PLMN.

Furthermore, as a fourth process example in the present embodiment, in a case that the cause value indicated by the 15th identification information is user authentication or authorization failed, or PDU session type IPv4 only allowed, or PDU session type IPv6 only allowed, the UE_A 10 may perform a fifth procedure example different from the first to third procedure examples.

Specifically, the fifth procedure example may be a procedure in which the UE_A 10 does not automatically transmit reconnection using another PDU session establishment request message intended for the DNN and S-NSSAI parameters transmitted in the PDU session establishment request message (1011), until the PDU session type used in the PDU session establishment request message (1011) is changed, or terminal power on/off or extraction and/or insertion of Universal Subscriber Identity Module (USIM).

The fifth procedure example may be a procedure in which the UE_A 10 does not automatically transmit reconnection using another PDU session establishment request message intended for the no DNN and S-NSSAI parameters transmitted in the PDU session establishment request message (1011), until the PDU session type used in the PDU session establishment request message (1011) is changed, or terminal power on/off or extraction and/or insertion of Universal Subscriber Identity Module (USIM).

The fifth procedure example may be a procedure in which the UE_A 10 does not automatically transmit reconnection using another PDU session establishment request message intended for the DNN and no S-NSSAI parameters transmitted in the PDU session establishment request message (1011), until the PDU session type used in the PDU session establishment request message (1011) is changed, or terminal power on/off or extraction and/or insertion of Universal Subscriber Identity Module (USIM).

The fifth procedure example may be a procedure in which the UE_A 10 does not automatically transmit reconnection using another PDU session establishment request message intended for the no DNN and no S-NSSAI parameters transmitted in the PDU session establishment request message (1011), until the PDU session type used in the PDU session establishment request message (1011) is changed, or terminal power on/off or extraction and/or insertion of Universal Subscriber Identity Module (USIM).

Furthermore, as a fourth process example in the present embodiment, in a case that the cause value indicated by the 15th identification information is PDU session does not exist, the UE_A 10 may perform a sixth procedure example different from the first to third and fifth procedure examples.

Specifically, the UE_A 10 may transmit an initial ("initial request") PDU session establishment request message intended for the DNN and S-NSSAI parameters transmitted in the PDU session establishment request message (1011).

The UE_A 10 may transmit an initial ("initial request") PDU session establishment request message intended for the no DNN and S-NSSAI parameters transmitted in the PDU session establishment request message (1011).

The UE_A 10 may transmit an initial ("initial request") PDU session establishment request message intended for the DNN and no S-NSSAI parameters transmitted in the PDU session establishment request message (1011).

The UE_A 10 may transmit an initial ("initial request") PDU session establishment request message intended for the no DNN and no S-NSSAI parameters transmitted in the PDU session establishment request message (1011).

Furthermore, as a fourth process example in the present embodiment, in a case that the cause value indicated by the 15th identification information is user authentication or authorization failed, and/or PDU session type IPv4 only allowed, and/or PDU session type IPv6 only allowed, and/or PDU session does not exist, the UE_A 10 may perform a seventh procedure example different from the first to third and fifth and sixth procedure examples.

Specifically, the UE_A 10 may ignore the received SM backoff timer.

Further, another PDU session establishment request message may be transmitted based on the re-attempt information indicated by the 11th identification information. Specifically, in a case that connection with an equivalent PLMN is allowed by the re-attempt information, the UE_A 10 may transmit another PDU session establishment request message intended for the DNN and S-NSSAI parameters transmitted in the PDU session establishment request message (1011) in the equivalent PLMN.

In a case that connection with an equivalent PLMN is allowed by the re-attempt information, the UE_A 10 may transmit another PDU session establishment request message intended for the no DNN and S-NSSAI parameters transmitted in the PDU session establishment request message (1011) in the equivalent PLMN.

In a case that connection with an equivalent PLMN is allowed by the re-attempt information, the UE_A 10 may transmit another PDU session establishment request message intended for the DNN and no S-NSSAI parameters transmitted in the PDU session establishment request message (1011) in the equivalent PLMN.

In a case that connection with an equivalent PLMN is allowed by the re-attempt information, the UE_A 10 may transmit another PDU session establishment request message intended for the no DNN and no S-NSSAI parameters transmitted in the PDU session establishment request message (1011) in the equivalent PLMN. As described above, the UE_A 10 may perform processing based on the reception of the PDU session establishment reject message.

The processing based on the reception of the PDU session establishment reject message described above may be a processing example described below in other words. Note that the processing example may be a process performed in a case that a timer value is included in the PDU session establishment reject message.

In a case that the 5GSM cause value included in the PDU session establishment reject message indicates other than the cause values associated with congestion management, the UE_A 10 may start the backoff timer for the combination of the PLMN, DNN, and S-NSSAI, by using the received timer value based on the received 5GSM cause value.

Here, the DNN and the S-NSSAI may be indicated by the UE_A 10. Specifically, as described above, the DNN and the S-NSSAI may be a DNN and an S-NSSAI included in the PDU session establishment request message by the UE_A 10. Note that the PDU session establishment reject message in the present process may be a response message of this PDU session establishment request message.

In addition, cause values associated with congestion management may be a cause value indicating that resources are insufficient (Insufficient resources), and/or a cause value indicating that resources for a specific slice are insufficient (Insufficient resources for specific slice), and/or a cause value indicating that resources for a specific slice and DNN are insufficient (Insufficient resources for specific slice and DNN).

In others words, in the above-described processing example, in a case that the 5GSM cause value included in the PDU session establishment reject message is different from the cause values included in the following group of cause values, the UE_A 10 may start the backoff timer for the combination of the PLMN, the DNN, and the S-NSSAI by using the received timer value.

Here, the group of cause values described above may be cause values related to the congestion managements described above, and/or user authentication or authorization failed, and/or out of LADN service area, and/or PDU session type IPv4 only allowed, and/or PDU session type IPv6 only allowed, and/or PDU session does not exist.

More specifically, in a case that the 5GSM cause value included in the PDU session establishment reject message indicates Request rejected, unspecified, the UE_A 10 may start the backoff timer for a combination of PLMN, DNN, and S-NSSAI by using the received timer value.

Note that the processing performed by the UE_A 10 during the counting of the backoff timer described above may be the process already described in this section.

2.2. Second Embodiment

The present embodiment describes a process in a case that the UE changes the system in a state in which congestion management is being applied. Specifically, the present embodiment describes a process in a case that the UE changes from the N1 mode to the S1 mode in a state in which congestion management is being applied.

Figure 13:
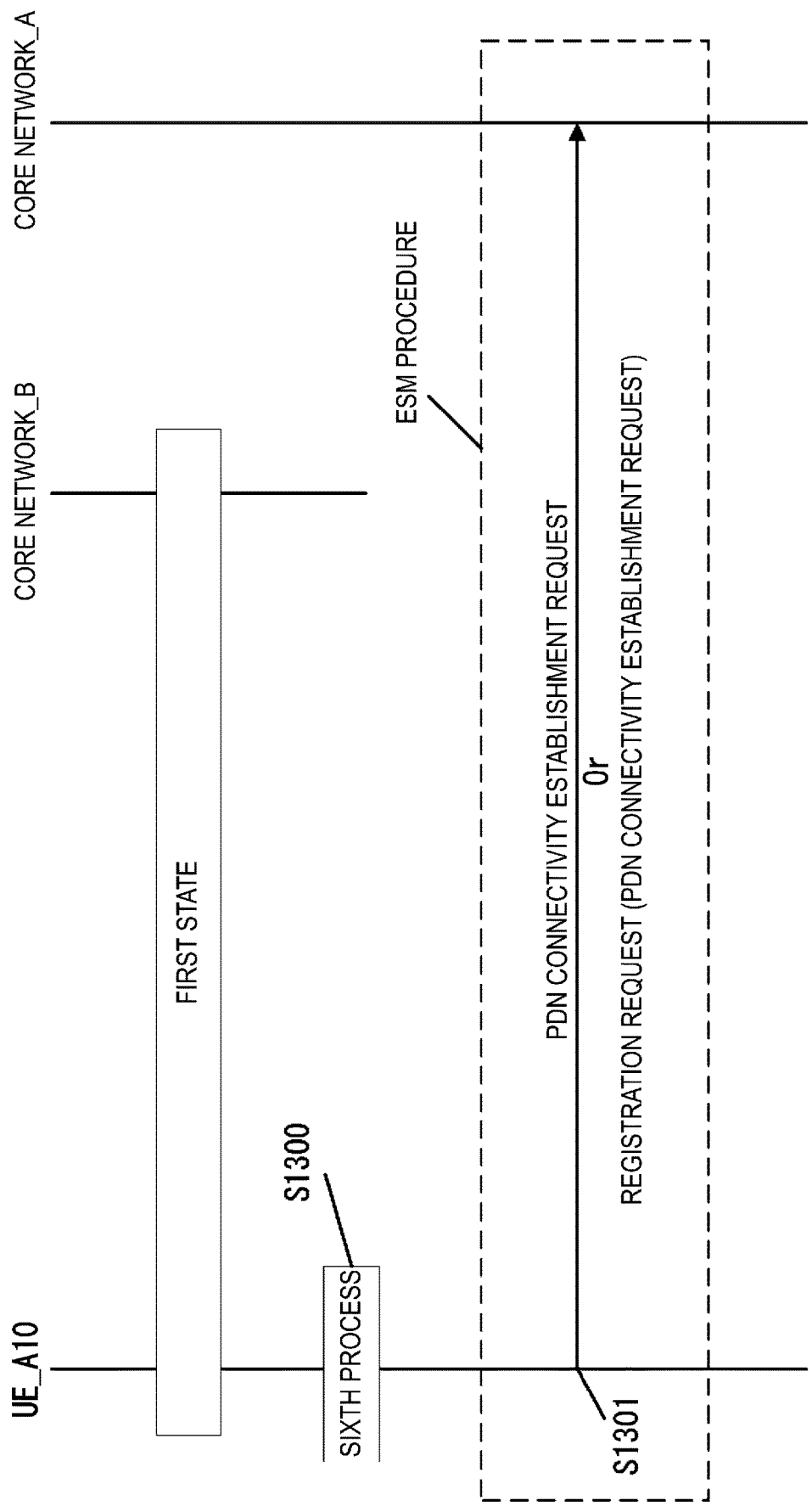
FIG. 13 is a diagram illustrating an EPS Session Management (ESM) procedure.

The process is mainly related to the behavior of the PDN connectivity establishment procedure described in FIG. 13.

Note that for simplicity, the PDN connectivity establishment procedure described in FIG. 13 may be referred to as an ESM procedure.

Note that in the present embodiment, the 15th identification information is information indicating one or more cause values for which the present procedure notified by the NW to the UE is rejected, for a cause of application of congestion management. The 14th identification information is information indicating a value of a backoff timer. The 11th identification information is information indicating re-attempt (Re-attempt) information.

In a case that DNN information is not included in the PDU session establishment procedure, it is expressed as "no DNN" in order to distinguish from control signal management in the case that DNN information is included. In the same manner, in a case that S-NSSAI information is not included in the PDU session establishment procedure, it is expressed as "no S-NSSAI" in order to distinguish from control signal management in the case that S-NSSAI information is included.

The SMF_A 230 or the AMF_A 240 may transmit the PDU session establishment reject message (S1122) to the UE_A 10 including the backoff timer indicated by the 14th identification information, in a case that the reject cause value indicated by the 15th identification information is Insufficient resources and/or Insufficient resources for specific slice and DNN and/or Insufficient resources for specific slice.

At this time, the UE_A may perform a sixth process (S1300) after the system change in accordance with the contents of the 11th identification information and/or the 14th identification information and/or the 15th identification information included in the PDU session establishment reject message received by the UE_A.

Here, a process in a case that the UE_A 10 changes the system, in a state in which the first congestion management associated with a specific DNN is being applied will be described. Processing in a case that the UE_A 10 changes the system in a case that the first congestion management backoff timer associated with a specific DNN is running or the first congestion management backoff timer associated with a specific DNN is deactivated will be described.

Here, the first congestion management associated with a specific DNN and the processing restricted in a case that the first congestion management associated with a specific DNN is applied may be as described above.

Again, the first congestion management associated with a specific DNN may be a DNN based congestion management. For example, the first congestion management may be congestion management to apply to the UE_A 10 by the NW based on a message rejecting a UE-initiated session management request, in a case that the NW receives the UE-initiated session management request using DNN #A from the UE_A 10, and congestion for a specific DNN, for example, DNN #A is detected in the NW. In this case, in the application of the first congestion management, the UE_A 10 may be configured to start counting the backoff timer corresponding to the first congestion management received from the NW and not to transmit the UE-initiated session management request using the DNN #A until the backoff timer expires. Note that the use of DNN may be to include DNN information in a UE-initiated session management request such as a PDU session establishment request message.

Here, for description, such first congestion management is represented as a "first congestion management for a specific DNN". In addition, a backoff timer corresponding to such first congestion management is represented as a "first congestion management backoff timer associated with a specific DNN".

The UE_A 10 may perform a 20th procedure example described below as the sixth process example in the present embodiment.

Specifically, in a case that the UE_A 10 performs the counting of the first congestion management backoff timer associated with a specific DNN, or in a case that the first congestion management backoff timer associated with a specific DNN is deactivated, the UE_A 10 may be configured to be able to perform an ESM procedure by using the APN equivalent to this specific DNN in the S1 mode in the modification of the system. Accordingly, based on this configuration, the UE_10 may transmit a PDN connectivity establishment request message using this specific APN.

Here, the UE_A 10 may not stop the counting backoff timer and may continue counting until the timer expires. Alternatively, the UE_A 10 may continue to hold the deactivated backoff timer in the deactivated state.

Thus, the first congestion management for a specific DNN may be associated with the system.

Next, a process in a case that the UE_A 10 changes the system, in a state in which the first congestion management associated with No DNN is being applied, will be described. Processing in a case that the UE_A 10 changes the system in a case that the first congestion management backoff timer associated with No DNN is running or the first congestion management backoff timer associated with No DNN is deactivated will be described.

Here, the first congestion management associated with No DNN and the processing restricted in a case that the first congestion management associated with No DNN is applied may be as described above.

In the first congestion management associated with No DNN, even in a case that the UE-initiated session management request does not include DNN information, the default DNN may be selected initiated by the NW for the congestion management target. In other words, the first congestion management may be congestion management to apply to the UE_A 10 by the NW based on a message rejecting a UE-initiated session management request, in a case that the NW receives the UE-initiated session management request not using DNN information from the UE_A 10, and congestion for default DNN is detected in the NW. In this case, in the application of the first congestion management, the UE_A 10 may be configured to start counting the backoff timer corresponding to the first congestion management received from the NW and not to transmit the UE-initiated session management request not using the DNN until the backoff timer expires. Note that not using DNN may be not to include DNN information in a UE-initiated session management request such as a PDU session establishment request message.

Here, for description, the first congestion management for the default DNN is expressed as "congestion management for No DNN" to distinguish from the first congestion management for a specific DNN because the first congestion management for the default DNN is applied based on a UE-initiated session management request not using DNN information. Furthermore, a UE-initiated session management request such as a PDU session establishment request message not using DNN is expressed as a UE-initiated session management request using No DNN. For example, a PDU session establishment request message using No DNN is a PDU session establishment request message not using DNN. In addition, a backoff timer corresponding to such first congestion management is represented as a "first congestion management backoff timer associated with No DNN".

The UE_A 10 may perform a 21st procedure example described below as the sixth process example in the present embodiment.

Specifically, in a case that the UE_A 10 performs the counting of the first congestion management backoff timer associated with No DNN, or in a case that the first congestion management backoff timer associated with No DNN is deactivated, the UE_A 10 may be configured to be able to perform an ESM procedure not including the APN in the S1 mode in the modification of the system. Accordingly, based on this configuration, the UE_10 may transmit a PDN connectivity establishment request message not including the APN.

Here, the UE_A 10 may not stop the counting backoff timer and may continue counting until the timer expires. Alternatively, the UE_A 10 may continue to hold the deactivated backoff timer in the deactivated state.

Thus, the first congestion management for No DNN may be associated with the system.

Heretofore, a processing example of the first congestion management associated with the system in the system modification has been described, but the present invention is not limited thereto. That is, in the system modification, the first congestion management may not be associated with the system.

Here, a process in a case that the UE_A 10 changes the system, in a state in which the first congestion management associated with a specific DNN is being applied will be described. Processing in a case that the UE_A 10 changes the system in a case that the first congestion management backoff timer associated with a specific DNN is running or the first congestion management backoff timer associated with a specific DNN is deactivated will be described.

The UE_A 10 may perform a 30th procedure example described below as the sixth process example in the present embodiment.

Specifically, in a case that the UE_A 10 performs the counting of the first congestion management backoff timer associated with a specific DNN, or in a case that the first congestion management backoff timer associated with a specific DNN is deactivated, the UE_A 10 may be configured to inhibit the implementation of the ESM procedure by using the APN equivalent to this specific DNN in the S1 mode in the modification of the system. Accordingly, the UE_10 may inhibit the transmission of the PDN connectivity establishment request message using this specific APN.

Here, the UE_A 10 may not stop the counting backoff timer and may continue counting until the timer expires. Alternatively, the UE_A 10 may continue to hold the deactivated backoff timer in the deactivated state.

Thus, the first congestion management for a specific DNN may also be applied in different systems.

Next, a process in a case that the UE_A 10 changes the system, in a state in which the first congestion management associated with No DNN is being applied, will be described. Processing in a case that the UE_A 10 changes the system in a case that the first congestion management backoff timer associated with No DNN is running or the first congestion management backoff timer associated with No DNN is deactivated will be described.

The UE_A 10 may perform a 31st procedure example described below as the sixth process example in the present embodiment.

Specifically, in a case that the UE_A 10 performs the counting of the first congestion management backoff timer associated with No DNN, or in a case that the first congestion management backoff timer associated with No DNN is deactivated, the UE_A 10 may be configured to inhibit the implementation of the ESM procedure not including the APN in the S1 mode in the modification of the system. Accordingly, the UE_10 may inhibit the transmission of the PDN connectivity establishment request message not including the APN.

Furthermore, the UE_A 10 may perform a 32nd procedure example described below as the sixth process example in the present embodiment.

Specifically, in a case that the UE_A 10 performs the counting of the first congestion management backoff timer associated with No DNN, or in a case that the first congestion management backoff timer associated with No DNN is deactivated, the UE_A 10 may be configured to inhibit the implementation of the ESM procedure not including the APN other than for the emergency call in the S1 mode in the modification of the system, but may be configured to be able to perform the ESM procedure for the emergency call. Accordingly, based on this configuration, the UE_10 may transmit the PDN connectivity establishment request message not including (request type="emergency") APN which configures the request type as an emergency call, but may be inhibited to transmit the PDN connectivity establishment request message not including (other than the request type="emergency") APN which does not configure the request type as an emergency call.

Here, the UE_A 10 may not stop the counting backoff timer and may continue counting until the timer expires. Alternatively, the UE_A 10 may continue to hold the deactivated backoff timer in the deactivated state.

Thus, the first congestion management for No DNN may also be applied in different systems.

Next, a process in a case that the UE_A 10 changes the system, in a state in which the third congestion management associated with specific [S-NSSAI, DNN] is being applied will be described. Processing in a case that the UE_A 10 changes the system in a case that the third congestion management backoff timer associated with specific [S-NSSAI, DNN] is running or the third congestion management backoff timer associated with specific [S-NSSAI, DNN] is deactivated will be described.

Here, the third congestion management associated with specific [S-NSSAI, DNN] and the processing restricted in a case that the third congestion management associated with specific [S-NSSAI, DNN] is applied may be as described above.

Again, the third congestion management associated with specific [S-NSSAI, DNN] may be an S-NSSAI based congestion management. For example, the third congestion management may be congestion management to apply to the UE_A 10 by the NW based on a message rejecting a UE-initiated session management request, in a case that the NW receives the UE-initiated session management request using DNN #A and S-NSSAI #A from the UE_A 10, and congestion for specific [S-NSSAI, DNN], for example, DNN #A and S-NSSAI #A is detected in the NW. In this case, in the application of the third congestion management, the UE_A 10 may be configured to start counting the backoff timer corresponding to the third congestion management received from the NW and not to transmit the UE-initiated session management request using DNN #A and S-NSAI #A until the backoff timer expires. Note that the use of [S-NSSAI, DNN] may be to include DNN information and S-NS-SAI information in a UE-initiated session management request such as a PDU session establishment request message.

Here, for description, such third congestion management is represented as a "third congestion management for specific [S-NSSAI, DNN]". In addition, a backoff timer corresponding to such third congestion management is represented as a "third congestion management backoff timer associated with specific [S-NSSAI, DNN]".

The UE_A 10 may perform a 22nd procedure example described below as the sixth process example in the present embodiment.

Specifically, in a case that the UE_A 10 performs the counting of the third congestion management backoff timer associated with specific [S-NSSAI, DNN], or in a case that the third congestion management backoff timer associated with specific [S-NSSAI, DNN] is deactivated, the UE_A 10 may be configured to be able to perform the ESM procedure by using the APN equivalent to this specific DNN in the S1 mode in the modification of the system. Accordingly, based on this configuration, the UE_10 may transmit a PDN connectivity establishment request message using this specific APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for specific [S-NSSAI, DNN] may be associated with the system.

Next, a process in a case that the UE_A 10 changes the system, in a state in which the third congestion management associated with [no S-NSSAI, DNN] is being applied will be described. Processing in a case that the UE_A 10 changes the system in a case that the third congestion management backoff timer associated with [no S-NSSAI, DNN] is running or the third congestion management backoff timer associated with [no S-NSSAI, DNN] is deactivated will be described.

Here, the third congestion management associated with [no S-NSSAI, DNN] and the processing restricted in a case that the third congestion management associated with [no S-NSSAI, DNN] is applied may be as described above.

In the third congestion management associated with [no S-NSSAI, DNN], even in a case that the UE-initiated session management request does not include S-NSSAI, the default S-NSSAI may be selected initiated by the NW for the congestion management target. In other words, the third congestion management may be congestion management to apply to the UE_A 10 by the NW based on a message rejecting a UE-initiated session management request, in a case that the NW receives the UE-initiated session management request using [no S-NSSAI, DNN] from the UE_A 10, and congestion for a combination of the default S-NSSAI and a specific DNN is detected in the NW. In this case, in the application of the third congestion management, the UE_A 10 may be configured to start counting the backoff timer corresponding to the third congestion management received from the NW and not to transmit the UE-initiated session management request using [no S-NSSAI, DNN] until the backoff timer expires. Note that the use of [no S-NSSAI, DNN] may be not to include S-NSSAI information but to include DNN information in a UE-initiated session management request such as a PDU session establishment request message.

Here, for description, the third congestion management for the default S-NSSAI and a specific DNN is expressed as "congestion management for [no S-NSSAI, DNN]" to distinguish from the third congestion management for a specific S-NSSAI and DNN because the third congestion management for the default S-NSSAI and a specific DNN is applied based on a UE-initiated session management request not using S-NSSAI information. Furthermore, a UE-initiated session management request such as a PDU session establishment request message not using S-NSSAI but using DNN is expressed as a UE-initiated session management request using [no S-NSSAI, DNN]. In addition, a backoff timer corresponding to such third congestion management is represented as a "third congestion management backoff timer associated with [no S-NSSAI, DNN]".

The UE_A 10 may perform a 23rd procedure example described below as the sixth process example in the present embodiment.

Specifically, in a case that the UE_A 10 performs the counting of the third congestion management backoff timer associated with [no S-NSSAI, DNN], or in a case that the third congestion management backoff timer associated with [no S-NSSAI, DNN] is deactivated, the UE_A 10 may be configured to be able to perform an ESM procedure not including the APN in the S1 mode in the modification of the system. Accordingly, based on this configuration, the UE_10 may transmit a PDN connectivity establishment request message not including the APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for [no S-NSSAI, DNN] may be associated with the system.

Next, a process in a case that the UE_A 10 changes the system, in a state in which the third congestion management associated with [S-NSSAI, no DNN] is being applied will be described. Processing in a case that the UE_A 10 changes the system in a case that the third congestion management backoff timer associated with [S-NSSAI, no DNN] is running or the third congestion management backoff timer associated with [S-NSSAI, no DNN] is deactivated will be described.

Here, the third congestion management associated with [S-NSSAI, no DNN] and the processing restricted in a case that the third congestion management associated with [S-NSSAI, no DNN] is applied may be as described above.

In the third congestion management associated with [S-NSSAI, no DNN], even in a case that the UE-initiated session management request does not include DNN, the default DNN may be selected initiated by the NW for the congestion management target. In other words, the third congestion management may be congestion management to apply to the UE_A 10 by the NW based on a message rejecting a UE-initiated session management request, in a case that the NW receives the UE-initiated session management request using [S-NSSAI, no DNN] from the UE_A 10, and congestion for a combination of the default DNN and a specific S-NSSAI is detected in the NW. In this case, in the application of the third congestion management, the UE_A 10 may be configured to start counting the backoff timer corresponding to the third congestion management received from the NW and not to transmit the UE-initiated session management request using [S-NSSAI, no DNN] until the backoff timer expires. Note that the use of [S-NSSAI, no DNN] may be not to include S-NSSAI information but to include DNN information in a UE-initiated session management request such as a PDU session establishment request message.

Here, for description, the third congestion management for the default DNN and a specific S-NSSAI is expressed as "congestion management for [S-NSSAI, no DNN]" to distinguish from the third congestion management for a specific S-NSSAI and DNN because the third congestion management for the default DNN and a specific S-NSSAI is applied based on a UE-initiated session management request not using DNN information. Furthermore, a UE-initiated session management request such as a PDU session establishment request message not using DNN but using S-NSSAI is expressed as a UE-initiated session management request using [S-NSSAI, no DNN]. In addition, a backoff timer corresponding to such third congestion management is represented as a "third congestion management backoff timer associated with [S-NSSAI, no DNN]".

The UE_A 10 may perform a 24th procedure example described below as the sixth process example in the present embodiment.

Specifically, in a case that the UE_A 10 performs the counting of the third congestion management backoff timer associated with [S-NSSAI, no DNN], or in a case that the third congestion management backoff timer associated with [S-NSSAI, no DNN] is deactivated, the UE_A 10 may be configured to be able to perform an ESM procedure not including the APN in the S1 mode in the modification of the system. Accordingly, based on this configuration, the UE_10 may transmit a PDN connectivity establishment request message not including the APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for [S-NSSAI, no DNN] may be associated with the system.

Next, a process in a case that the UE_A 10 changes the system, in a state in which the third congestion management associated with [no S-NSSAI, no DNN] is being applied will be described. Processing in a case that the UE_A 10 changes the system in a case that the third congestion management backoff timer associated with [no S-NSSAI, no DNN] is running or the third congestion management backoff timer associated with [no S-NSSAI, no DNN] is deactivated will be described.

Here, the third congestion management associated with [no S-NSSAI, no DNN] and the processing restricted in a case that the third congestion management associated with [no S-NSSAI, no DNN] is applied may be as described above.

In the third congestion management associated with [no S-NSSAI, no DNN], even in a case that the UE-initiated session management request does not include S-NSSAI and DNN, the default S-NSSAI and the default DNN may be selected initiated by the NW for the congestion management target. In other words, the third congestion management may be congestion management to apply to the UE_A 10 by the NW based on a message rejecting a UE-initiated session management request, in a case that the NW receives the UE-initiated session management request using [no S-NSSAI, no DNN] from the UE_A 10, and congestion for a combination of the default DNN and default S-NSSAI is detected in the NW. In this case, in the application of the third congestion management, the UE_A 10 may be configured to start counting the backoff timer corresponding to the third congestion management received from the NW and not to transmit the UE-initiated session management request using [no S-NSSAI, no DNN] until the backoff timer expires. Note that the use of [no S-NSSAI, no DNN] may be not to include S-NSSAI information and DNN information in a UE-initiated session management request such as a PDU session establishment request message.

Here, for description, the third congestion management for a combination of the default DNN and the default S-NSSAI and a combination of a specific DNN and a specific S-NSSAI is expressed as "congestion management for [no S-NSSAI, no DNN]" to distinguish from the third congestion management for a combination of a specific S-NSSAI and DNN because the third congestion management for a combination of the default DNN and the default S-NSSAI and a combination of a specific DNN and a specific S-NSSAI is applied based on a UE-initiated session management request not using DNN information and S-NSSAI information.

Furthermore, a UE-initiated session management request such as a PDU session establishment request message not using DNN nor S-NSSAI is expressed as a UE-initiated session management request using [no S-NSSAI, no DNN]. In addition, a backoff timer corresponding to such third congestion management is represented as a "third congestion management backoff timer associated with [no S-NSSAI, no DNN]".

The UE_A 10 may perform a 25th procedure example described below as the sixth process example in the present embodiment.

Specifically, in a case that the UE_A 10 performs the counting of the third congestion management backoff timer associated with [no S-NSSAI, no DNN], or in a case that the third congestion management backoff timer associated with [no S-NSSAI, no DNN] is deactivated, the UE_A 10 may be configured to be able to perform an ESM procedure not including the APN in the S1 mode in the modification of the system. Accordingly, based on this configuration, the UE_10 may transmit a PDN connectivity establishment request message not including the APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for [no S-NSSAI, no DNN] may be associated with the system.

Heretofore, a processing example of the third congestion management associated with the system in the system modification has been described, but the present invention is not limited thereto. That is, in the system modification, the third congestion management may not be associated with the system.

Here, a process in a case that the UE_A 10 changes the system, in a state in which the third congestion management associated with specific [S-NSSAI, DNN] is being applied will be described. Processing in a case that the UE_A 10 changes the system in a case that the third congestion management backoff timer associated with specific [S-NSSAI, DNN] is running or the third congestion management backoff timer associated with specific [S-NSSAI, DNN] is deactivated will be described.

The UE_A 10 may perform a 33rd procedure example described below as the sixth process example in the present embodiment.

Specifically, in a case that the UE_A 10 performs the counting of the third congestion management backoff timer associated with specific [S-NSSAI, DNN], or in a case that the third congestion management backoff timer associated with specific [S-NSSAI, DNN] is deactivated, the UE_A 10 may be configured to inhibit the implementation of the ESM procedure by using the APN equivalent to this specific DNN in the S1 mode in the modification of the system. Accordingly, the UE_10 may inhibit the transmission of the PDN connectivity establishment request message using this specific APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for specific [S-NSSAI, DNN] may also be applied in different systems.

Next, a process in a case that the UE_A 10 changes the system, in a state in which the third congestion management associated with [no S-NSSAI, DNN] is being applied will be described. Processing in a case that the UE_A 10 changes the system in a case that the third congestion management backoff timer associated with [no S-NSSAI, DNN] is running or the third congestion management backoff timer associated with [no S-NSSAI, DNN] is deactivated will be described.

The UE_A 10 may perform a 34th procedure example described below as the sixth process example in the present embodiment.

Specifically, in a case that the UE_A 10 performs the counting of the third congestion management backoff timer associated with specific [no S-NSSAI, DNN], or in a case that the third congestion management backoff timer associated with specific [no S-NSSAI, DNN] is deactivated, the UE_A 10 may be configured to inhibit the implementation of the ESM procedure by using the APN equivalent to this specific DNN in the S1 mode in the modification of the system. Accordingly, the UE_10 may inhibit the transmission of the PDN connectivity establishment request message using this specific APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for specific [no S-NSSAI, DNN] may also be applied in different systems.

Next, a process in a case that the UE_A 10 changes the system, in a state in which the third congestion management associated with [S-NSSAI, no DNN] is being applied will be described. Processing in a case that the UE_A 10 changes the system in a case that the third congestion management backoff timer associated with [S-NSSAI, no DNN] is running or the third congestion management backoff timer associated with [S-NSSAI, no DNN] is deactivated will be described.

The UE_A 10 may perform a 35th procedure example described below as the sixth process example in the present embodiment.

Specifically, in a case that the UE_A 10 performs the counting of the third congestion management backoff timer associated with [S-NSSAI, no DNN], or in a case that the third congestion management backoff timer associated with [S-NSSAI, no DNN] is deactivated, the UE_A 10 may be configured to inhibit the implementation of the ESM procedure not including the APN in the S1 mode in the modification of the system. Accordingly, the UE_10 may inhibit the transmission of the PDN connectivity establishment request message not including the APN.

Here, the UE_A 10 may not stop the counting backoff timer and may continue counting until the timer expires. Alternatively, the UE_A 10 may continue to hold the deactivated backoff timer in the deactivated state.

Furthermore, the UE_A 10 may perform a 36th procedure example described below as the sixth process example in the present embodiment.

Specifically, in a case that the UE_A 10 performs the counting of the third congestion management backoff timer associated with [S-NSSAI, no DNN], or in a case that the third congestion management backoff timer associated with [S-NSSAI, no DNN] is deactivated, the UE_A 10 may be configured to inhibit the implementation of the ESM procedure not including the APN other than for the emergency call in the S1 mode in the modification of the system, but may be configured to be able to perform the ESM procedure for the emergency call in the modification of the system. Accordingly, based on this configuration, the UE_10 may transmit the PDN connectivity establishment request message not including (request type="emergency") APN which configures the request type as an emergency call, but may be inhibited to transmit the PDN connectivity establishment request message not including (other than the request type="emergency") APN which does not configure the request type as an emergency call.

Here, the UE_A 10 may not stop the counting backoff timer and may continue counting until the timer expires. Alternatively, the UE_A 10 may continue to hold the deactivated backoff timer in the deactivated state.

Thus, the third congestion management for specific [S-NSSAI, no DNN] may also be applied in different systems.

Next, a process in a case that the UE_A 10 changes the system, in a state in which the third congestion management associated with [no S-NSSAI, no DNN] is being applied will be described. Processing in a case that the UE_A 10 changes the system in a case that the third congestion management backoff timer associated with [no S-NSSAI, no DNN] is running or the third congestion management backoff timer associated with [no S-NSSAI, no DNN] is deactivated will be described.

The UE_A 10 may perform a 37th procedure example described below as the sixth process example in the present embodiment.

Specifically, in a case that the UE_A 10 performs the counting of the third congestion management backoff timer associated with [no S-NSSAI, no DNN], or in a case that the third congestion management backoff timer associated with [no S-NSSAI, no DNN] is deactivated, the UE_A 10 may be configured to inhibit the implementation of the ESM procedure not including the APN in the S1 mode in the modification of the system. Accordingly, the UE_10 may inhibit the transmission of the PDN connectivity establishment request message not including the APN.

Here, the UE_A 10 may not stop the counting backoff timer and may continue counting until the timer expires. Alternatively, the UE_A 10 may continue to hold the deactivated backoff timer in the deactivated state.

Furthermore, the UE_A 10 may perform a 38th procedure example described below as the sixth process example in the present embodiment.

Specifically, in a case that the UE_A 10 performs the counting of the third congestion management backoff timer associated with [no S-NSSAI, no DNN], or in a case that the third congestion management backoff timer associated with [no S-NSSAI, no DNN] is deactivated, the UE_A 10 may be configured to inhibit the implementation of the ESM procedure not including the APN other than for the emergency call in the S1 mode in the modification of the system, but may be configured to be able to perform the ESM procedure for the emergency call in the modification of the system. Accordingly, based on this configuration, the UE_10 may transmit the PDN connectivity establishment request message not including (request type="emergency") APN which configures the request type as an emergency call, but may be inhibited to transmit the PDN connectivity establishment request message not including (other than the request type="emergency") APN which does not configure the request type as an emergency call.

Here, the UE_A 10 may not stop the counting backoff timer and may continue counting until the timer expires. Alternatively, the UE_A 10 may continue to hold the deactivated backoff timer in the deactivated state.

Thus, the third congestion management for specific [no S-NSSAI, no DNN] may also be applied in different systems.

Next, a process in a case that the UE_A 10 changes the system, in a state in which the second congestion management associated with a specific S-NSSAI is being applied will be described. Processing in a case that the UE_A 10 changes the system in a case that the second congestion management backoff timer associated with a specific S-NSSAI is running or the second congestion management backoff timer associated with a specific S-NSSAI is deactivated will be described.

Here, the second congestion management associated with a specific S-NSSAI and the processing restricted in a case that the second congestion management associated with a specific S-NSSAI is applied may be as described above.

Again, the second congestion management associated with a specific S-NSSAI may be an S-NSSAI based congestion management. For example, the second congestion management may be congestion management to apply to the UE_A 10 by the NW based on a message rejecting a UE-initiated session management request, in a case that the NW receives the UE-initiated session management request using S-NSSAI #A from the UE_A 10, and congestion for a specific S-NSSAI, for example, S-NSSAI #A is detected in the NW. In this case, in the application of the second congestion management, the UE_A 10 may be configured to start counting the backoff timer corresponding to the second congestion management received from the NW and not to transmit the UE-initiated session management request using S-NSSAI #A until the backoff timer expires. Note that the use of S-NSSAI may be to include S-NSSAI information in a UE-initiated session management request such as a PDU session establishment request message.

Here, for description, such second congestion management is represented as a "second congestion management for a specific S-NSSAI". In addition, a backoff timer corresponding to such second congestion management is represented as a "second congestion management backoff timer associated with a specific S-NSSAI".

The UE_A 10 may perform a 26th procedure example described below as the sixth process example in the present embodiment.

Specifically, in a case that the UE_A 10 performs the counting of the second congestion management backoff timer associated with a specific S-NSSAI, or in a case that the second congestion management backoff timer associated with a specific S-NSSAI is deactivated, the UE_A 10 may perform the ESM procedure using any APN in the S1 mode, or may perform the ESM procedure not including the APN in the modification of the system.

Next, a process in a case that the UE_A 10 changes the system, in a state in which the second congestion management associated with No S-NSSAI is being applied will be described. Processing in a case that the UE_A 10 changes the system in a case that the second congestion management backoff timer associated with No S-NSSAI is running or the second congestion management backoff timer associated with No S-NSSAI is deactivated will be described.

Here, the second congestion management associated with No S-NSSAI and the processing restricted in a case that the second congestion management associated with No S-NSSAI is applied may be as described above.

Again, in the second congestion management associated with No S-NSSAI, even in a case that the UE-initiated session management request does not include S-NSSAI information, the default S-NSSAI may be selected initiated by the NW for the congestion management target. In other words, the second congestion management may be congestion management to apply to the UE_A 10 by the NW based on a message rejecting a UE-initiated session management request, in a case that the NW receives the UE-initiated session management request not using S-NSSAI information from the UE_A 10, and congestion for default S-NSSAI is detected in the NW. In this case, in the application of the second congestion management, the UE_A 10 may be configured to start counting the backoff timer corresponding to the second congestion management received from the NW and not to transmit the UE-initiated session management request not using S-NSSAI until the backoff timer expires. Note that not using S-NSSAI may be not to include S-NSSAI information in a UE-initiated session management request such as a PDU session establishment request message.

Here, for description, the second congestion management for the default S-NSSAI is expressed as "congestion management for No S-NSSAI" to distinguish from the second congestion management for a specific S-NSSAI because the second congestion management for the default S-NSSAI is applied based on a UE-initiated session management request not using S-NSSAI information. Furthermore, a UE-initiated session management request such as a PDU session establishment request message not using S-NSSAI is expressed as a UE-initiated session management request using No S-NSSAI. For example, a PDU session establishment request message using No S-NSSAI is a PDU session establishment request message not using S-NSSAI. In addition, a backoff timer corresponding to such second congestion management is represented as a "second congestion management backoff timer associated with No S-NSSAI".

The UE_A 10 may perform a 27th procedure example described below as the sixth process example in the present embodiment.

Specifically, in a case that the UE_A 10 performs the counting of the second congestion management backoff timer associated with No S-NSSAI, or in a case that the second congestion management backoff timer associated with No S-NSSAI is deactivated, the UE_A 10 may perform the ESM procedure using any APN in the S1 mode, or may perform the ESM procedure not including the APN in the modification of the system.

Note that, as described above, the UE_A 10 may be configured to associate the first congestion management with the system, as described in the 20th procedure example and the 21st procedure example, regardless of whether the first congestion management is for a specific DNN or No DNN. The UE_A 10 may be configured to associate the third congestion management with the system, as described in the 22nd procedure example to the 25th procedure example, regardless of whether the third congestion management is for a specific DNN or No DNN. In other words, for a UE configured to associate congestion management to a system, congestion management applied before system modification is not applied after system modification, regardless of whether the congestion management being applied is for a specific DNN or No DNN.

Meanwhile, the UE_A 10 may be configured to apply the first congestion management in different systems, as described in the 30th procedure example to the 32nd procedure example, regardless of whether the first congestion management is for a specific DNN or No DNN. The UE_A 10 may be configured to apply the third congestion management in different systems, as described in the 34th procedure example to the 38th procedure example, regardless of whether the third congestion management is for a specific DNN or No DNN. In other words, for a UE configured not to associate congestion management to a system, congestion management applied before system modification is applied after system modification, regardless of whether the congestion management being applied is for a specific DNN or No DNN.

Alternatively, the UE_A 10 may perform different processing depending on whether the first congestion management is for a specific DNN or for No DNN.

In a case that the UE_A 10 performs the counting of the backoff timer associated with the first congestion management for a specific DNN, or in a case that the backoff timer associated with the first congestion management for a specific DNN is deactivated, the UE_A 10 may be configured not to transmit a PDN connectivity establishment request message using the APN equivalent to this specific DNN in the S1 mode in the modification of the system. Accordingly, based on this configuration, the UE_10 may restrict the PDN connectivity establishment request message using the APN equivalent to this specific DNN.

Here, the UE_A 10 may not stop the counting backoff timer and may continue counting until the timer expires. Alternatively, the UE_A 10 may continue to hold the deactivated backoff timer in the deactivated state.

Thus, the first congestion management for a specific DNN may also be applied in different systems.

Meanwhile, in a case that the UE_A 10 performs the counting of the backoff timer associated with the first congestion management for No DNN, or in a case that the backoff timer associated with the first congestion management for No DNN is deactivated, the UE_A 10 may be configured to be able to transmit a PDN connectivity establishment request message not using APN in the S1 mode in the modification of the system. Accordingly, based on this configuration, the UE_10 may transmit a PDN connectivity establishment request message not using this APN.

Here, the UE_A 10 may not stop the counting backoff timer and may continue counting until the timer expires. Alternatively, the UE_A 10 may continue to hold the deactivated backoff timer in the deactivated state.

Thus, the first congestion management for No DNN may be associated with the system.

Alternatively, the UE_A 10 may perform different processing depending on whether the third congestion management is for a specific DNN or for No DNN.

In a case that the UE_A 10 performs the counting of the backoff timer associated with the third congestion management for [S-NSSAI, DNN] or [no S-NSSAI, DNN], or in a case that the backoff timer associated with the third congestion management for [S-NSSAI, DNN] or [no S-NSSAI, DNN] is deactivated, the UE_A 10 may be configured not to transmit a PDN connectivity establishment request message using the APN equivalent to this specific DNN in the S1 mode in the modification of the system. Accordingly, based on this configuration, the UE_10 may restrict the PDN connectivity establishment request message using the APN equivalent to this specific DNN.

Here, the UE_A 10 may not stop the counting backoff timer and may continue counting until the timer expires. Alternatively, the UE_A 10 may continue to hold the deactivated backoff timer in the deactivated state.

Thus, the third congestion management for [S-NSSAI, DNN] or [no S-NSSAI, DNN] may also be applied in different systems.

Meanwhile, in a case that the UE_A 10 performs the counting of the backoff timer associated with the third congestion management for [S-NSSAI, no DNN] or [no S-NSSAI, no DNN], or in a case that the backoff timer associated with the third congestion management for [S-NSSAI, no DNN] or [no S-NSSAI, no DNN] is deactivated, the UE_A 10 may be configured to be able to transmit a PDN connectivity establishment request message not using APN in the S1 mode in the modification of the system. Accordingly, based on this configuration, the UE_10 may transmit a PDN connectivity establishment request message not using this APN.

Here, the UE_A 10 may not stop the counting backoff timer and may continue counting until the timer expires. Alternatively, the UE_A 10 may continue to hold the deactivated backoff timer in the deactivated state.

Thus, the third congestion management for [S-NSSAI, no DNN] or [no S-NSSAI, no DNN] may be associated with the system.

2. MODIFIED EXAMPLES

A program running on an apparatus according to the present invention may serve as a program that controls a Central Processing Unit (CPU) and the like to cause a computer to operate in such a manner as to realize the functions of the above-described embodiment according to the present invention. Programs or information handled by the programs are temporarily stored in a volatile memory such as a Random Access Memory (RAM), a non-volatile memory such as a flash memory, a Hard Disk Drive (HDD), or another storage device system.

Note that a program for realizing such functions of the embodiment according to the present invention may be recorded on a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of a known type, a controller, a micro-controller, or a state machine instead. The above-mentioned electric circuit may include a digital circuit, or may include an analog circuit. Furthermore, in a case that a circuit integration technology that replaces the present integrated circuit appears with advances in semiconductor technology, one or more aspects of the present invention can also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

The invention claimed is:

1. A User Equipment (UE) comprising:
a controller; and
transmission and reception circuitry,
wherein
in a case that a first 5GS session management timer on a per Single Network Slice Selection Assistance information (S-NSSAI) and Data Network Name (DNN) basis is running for an S-NSSAI and no DNN combination, the controller is able to initiate Evolved Packet System (EPS) Session Management (ESM) procedures in EPS without Access Point Name (APN), and
the transmission and reception circuitry is configured to receive a value for the first 5GS session management timer associated with no DNN and an S-NSSAI in Protocol Data Unit (PDU) SESSION ESTABLISHMENT REJECT message.

2. A communication control method performed by a User Equipment (UE), the communication control method comprising;
in a case that a first 5GS session management timer on a per Single Network Slice Selection Assistance information (S-NSSAI) and Data Network Name (DNN) basis is running for an S-NSSAI and no DNN combination, initiating Evolved Packet System (EPS) Session Management (ESM) procedures in EPS without Access Point Name (APN); and
receiving a value for the first 5GS session management timer associated with no DNN and an S-NSSAI in Protocol Data Unit (PDU) SESSION ESTABLISHMENT REJECT message.

* * * * *